United States Patent
Nashida et al.

(10) Patent No.: US 7,426,467 B2
(45) Date of Patent: Sep. 16, 2008

(54) SYSTEM AND METHOD FOR SUPPORTING INTERACTIVE USER INTERFACE OPERATIONS AND STORAGE MEDIUM

(75) Inventors: Tatsushi Nashida, Kanagawa (JP); Naoto Ozaki, Tokyo (JP)

(73) Assignee: Sony Corporation, Tokyo (JP)

( * ) Notice: Subject to any disclaimer, the term of this patent is extended or adjusted under 35 U.S.C. 154(b) by 606 days.

(21) Appl. No.: 09/911,109

(22) Filed: Jul. 23, 2001

(65) Prior Publication Data

US 2002/0010589 A1    Jan. 24, 2002

(30) Foreign Application Priority Data

Jul. 24, 2000 (JP) ............................ P2000-222895

(51) Int. Cl.
G10L 21/00 (2006.01)
G10L 15/22 (2006.01)
H04N 5/445 (2006.01)

(52) U.S. Cl. ........................ 704/275; 704/270; 704/272; 725/37; 725/38

(58) Field of Classification Search ................ 704/275, 704/231, 260, 270, 272, 251; 348/563–565; 345/473; 725/37–39
See application file for complete search history.

(56) References Cited

U.S. PATENT DOCUMENTS

| | | | | |
|---|---|---|---|---|
| 5,262,760 A | * | 11/1993 | Iwamura et al. | 715/861 |
| 5,367,454 A | * | 11/1994 | Kawamoto et al. | 715/706 |
| 5,566,271 A | * | 10/1996 | Tomitsuka et al. | 704/275 |
| 5,583,560 A | * | 12/1996 | Florin et al. | 704/275 |
| 5,682,469 A | * | 10/1997 | Linnett et al. | 345/473 |
| 5,687,331 A | * | 11/1997 | Volk et al. | 715/840 |
| 5,758,079 A | * | 5/1998 | Ludwig et al. | 709/204 |
| 5,774,859 A | * | 6/1998 | Houser et al. | 704/275 |
| 5,874,954 A | * | 2/1999 | Kilmer et al. | 345/834 |
| 5,923,337 A | * | 7/1999 | Yamamoto | 345/473 |
| 5,953,700 A | | 9/1999 | Kanevsky et al. | |

(Continued)

FOREIGN PATENT DOCUMENTS

EP    0 626 635 A    4/1994

(Continued)

OTHER PUBLICATIONS

Beskow et al. "OLGA—A Dialogue System with an Animated Talking Agent". In Proceed-ings of the Eurospeech '97, 1997, pp. 1651-1654.*

(Continued)

Primary Examiner—Patrick N. Edouard
Assistant Examiner—James S. Wozniak
(74) Attorney, Agent, or Firm—Frommer Lawrence & Haug LLP; William S. Frommer; Thomas F. Presson

(57) ABSTRACT

There is provided a system for supporting interactive operations for inputting user commands to a household electric apparatus such as a television set/monitor and information apparatuses. According to the system for supporting interactive operations applying an animated character called a personified assistant interacting with a user based on speech synthesis and animation, realizing a user-friendly user interface and simultaneously making it possible to meet a demand for complex commands or providing an entry for services. Further, since the system is provided with a command system producing an effect close to human natural language, the user can easily operate the apparatus with a feeling close to ordinary human conversation.

42 Claims, 39 Drawing Sheets

U.S. PATENT DOCUMENTS

| | | | | |
|---|---|---|---|---|
| 5,983,190 A | * | 11/1999 | Trower et al. | 704/275 |
| 6,026,416 A | * | 2/2000 | Kanerva et al. | 715/515 |
| 6,081,780 A | * | 6/2000 | Lumelsky | 704/275 |
| 6,173,266 B1 | * | 1/2001 | Marx et al. | 704/270 |
| 6,211,921 B1 | * | 4/2001 | Cherian et al. | 348/565 |
| 6,262,724 B1 | * | 7/2001 | Crow et al. | 345/723 |
| 6,266,098 B1 | * | 7/2001 | Cove et al. | 348/563 |
| 6,433,784 B1 | * | 8/2002 | Merrick et al. | 345/473 |
| 6,513,160 B2 | * | 1/2003 | Dureau | 725/9 |
| 6,538,666 B1 | * | 3/2003 | Ozawa et al. | 704/275 |
| 6,570,555 B1 | * | 5/2003 | Prevost et al. | 345/156 |

FOREIGN PATENT DOCUMENTS

| | | |
|---|---|---|
| EP | 0 849 691 A | 6/1998 |
| EP | 0 893 308 A | 1/1999 |
| JP | 62168263 | 7/1987 |

OTHER PUBLICATIONS

Rist et al. "Adding Animated Presentation Agents to the Interface". In Proceedings of the 1997 International Conference on Intelligent User Interfaces, 1997, pp. 79-86.*

Cavazza et al. "The Virtual Interactive Presenter: a Conversational Character for Interactive Television", Virtual Reality, vol. 5, No. 2, Jun. 2000, pp. 82-94.*

* cited by examiner

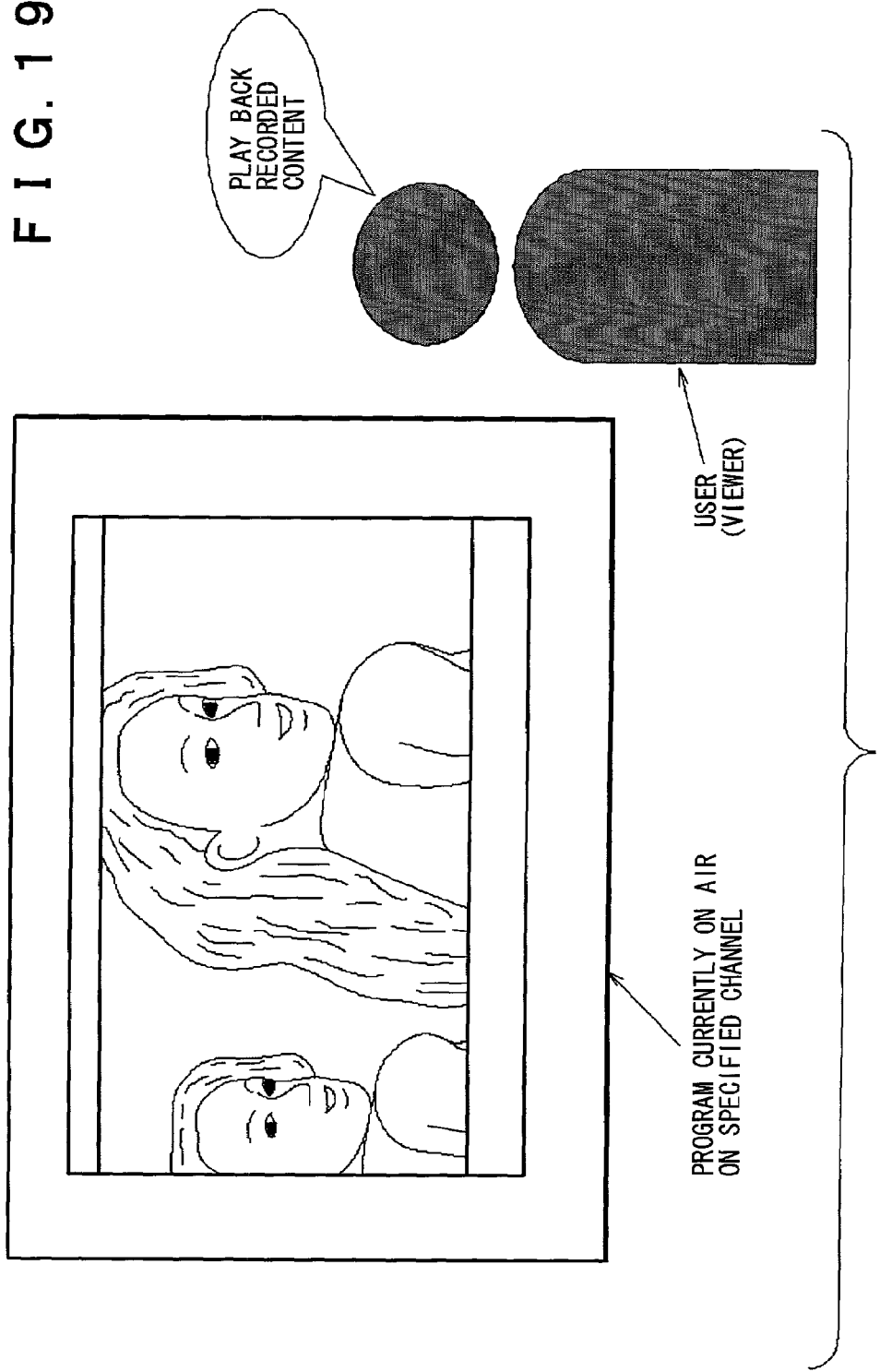

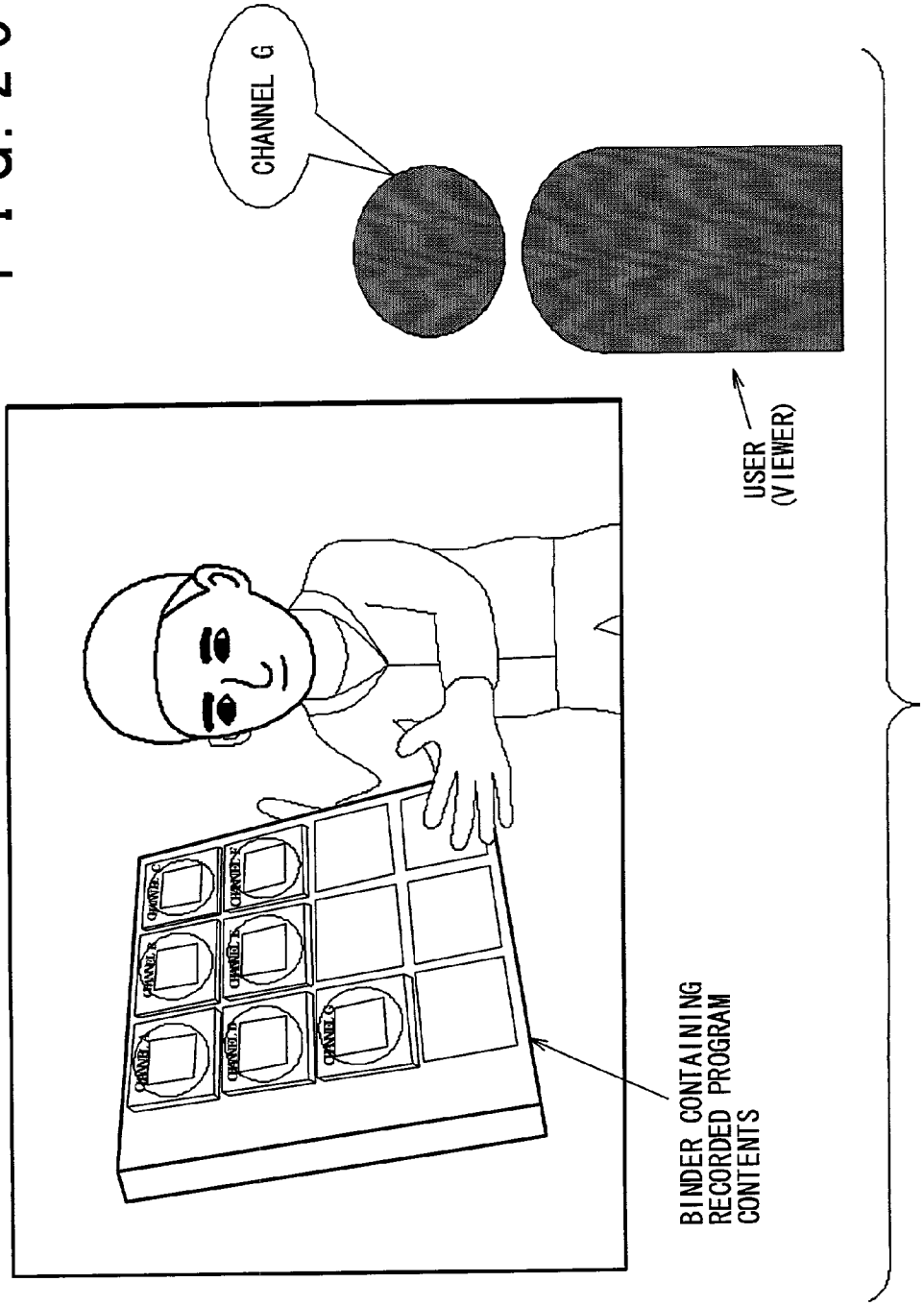

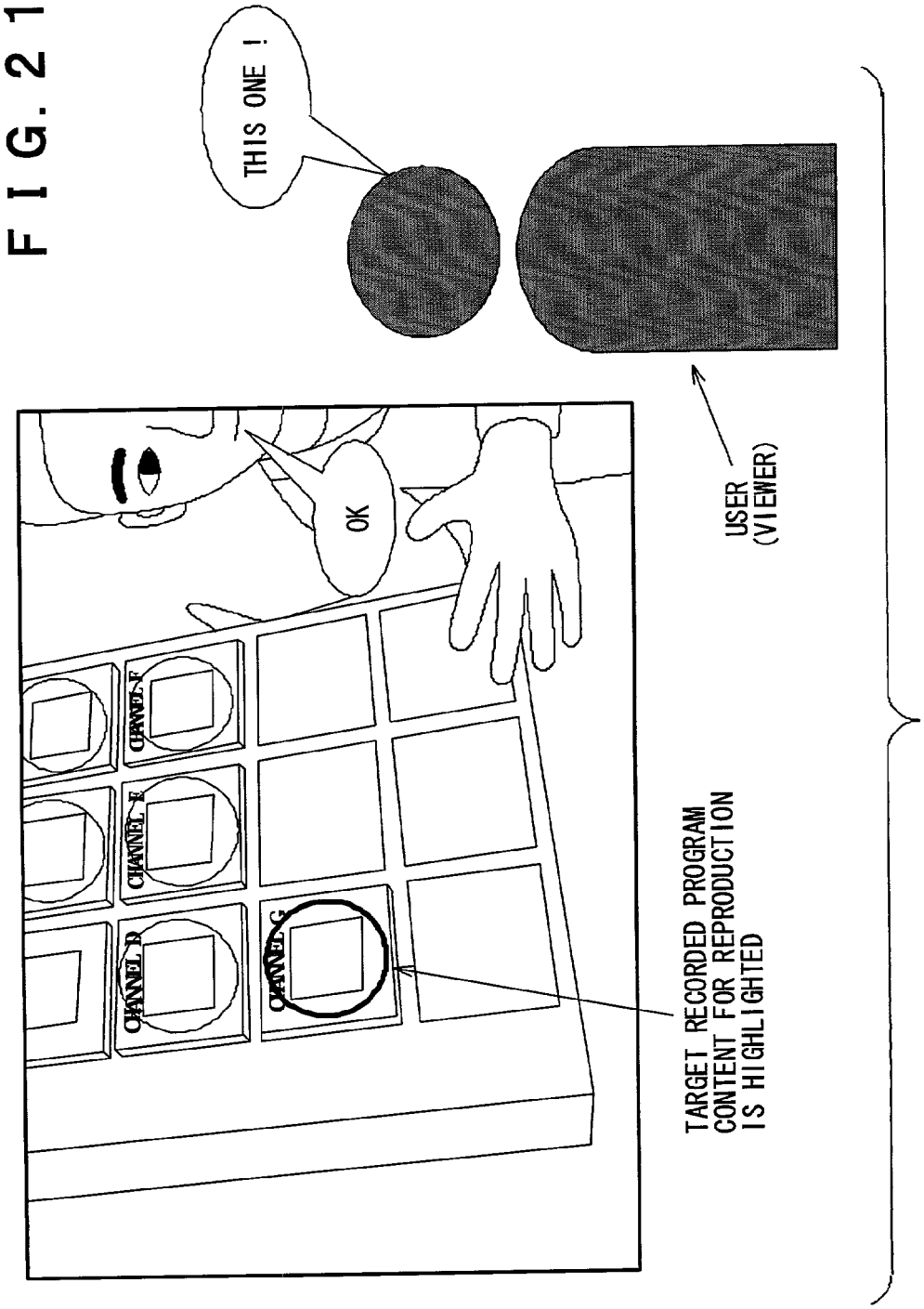

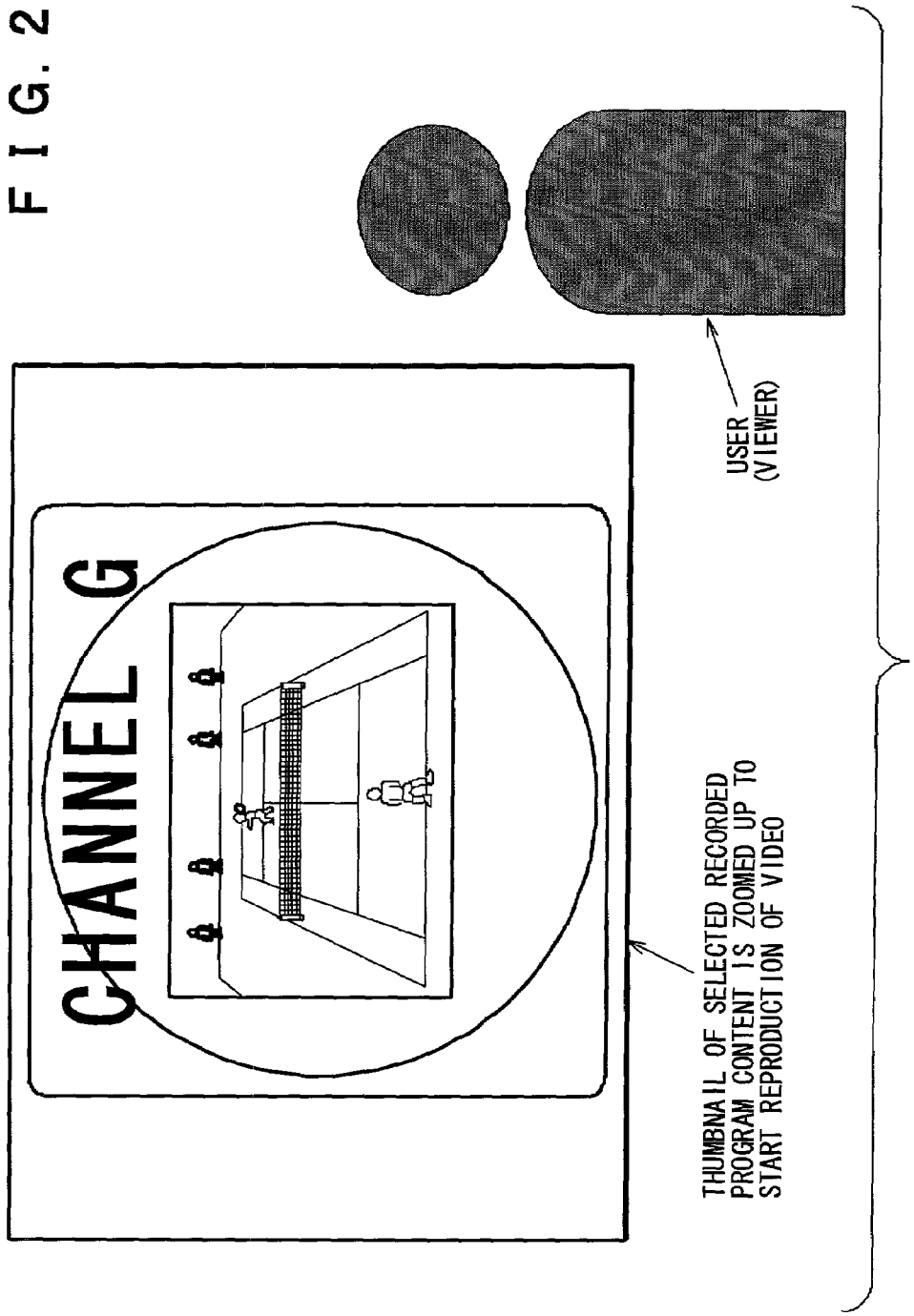

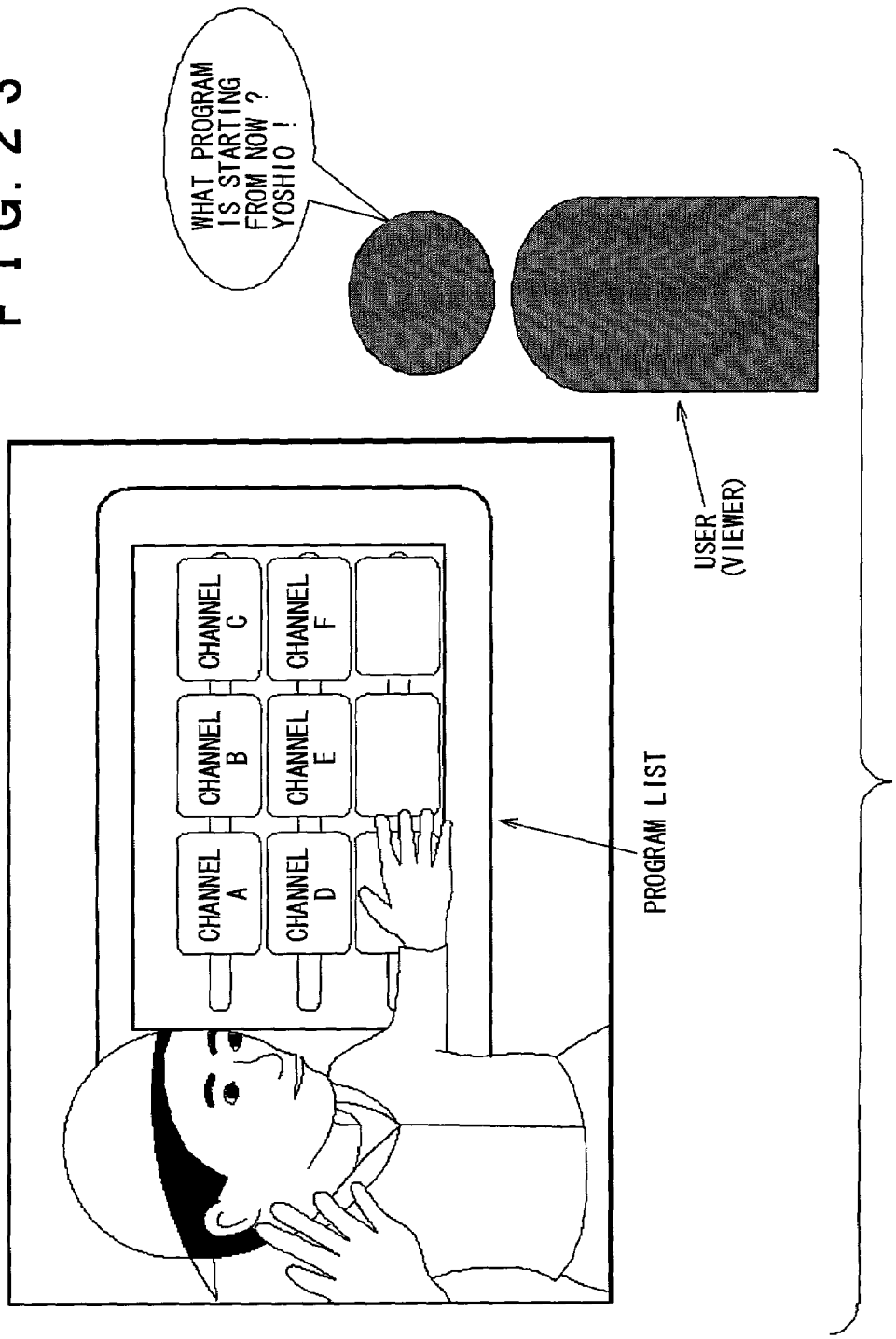

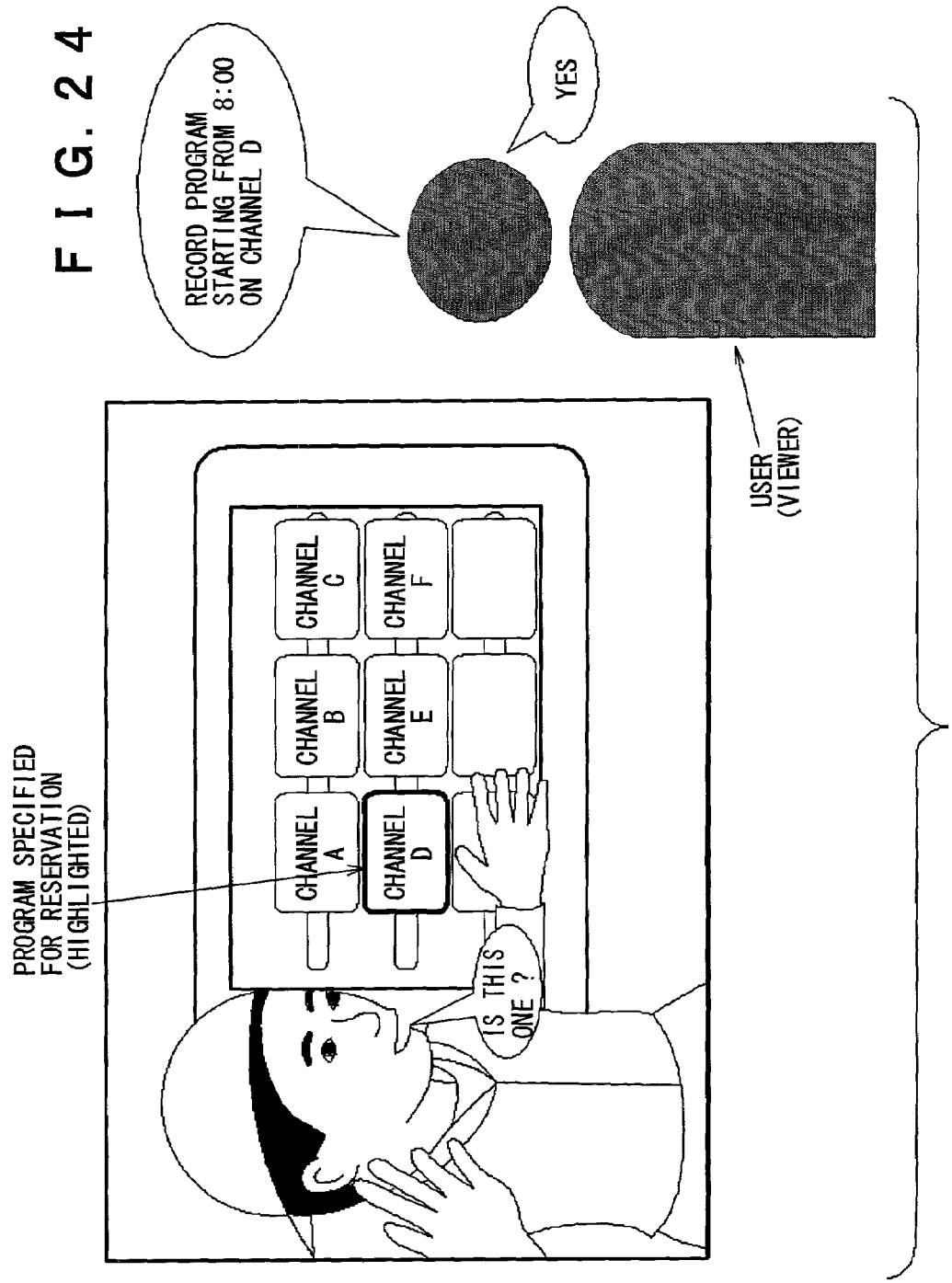

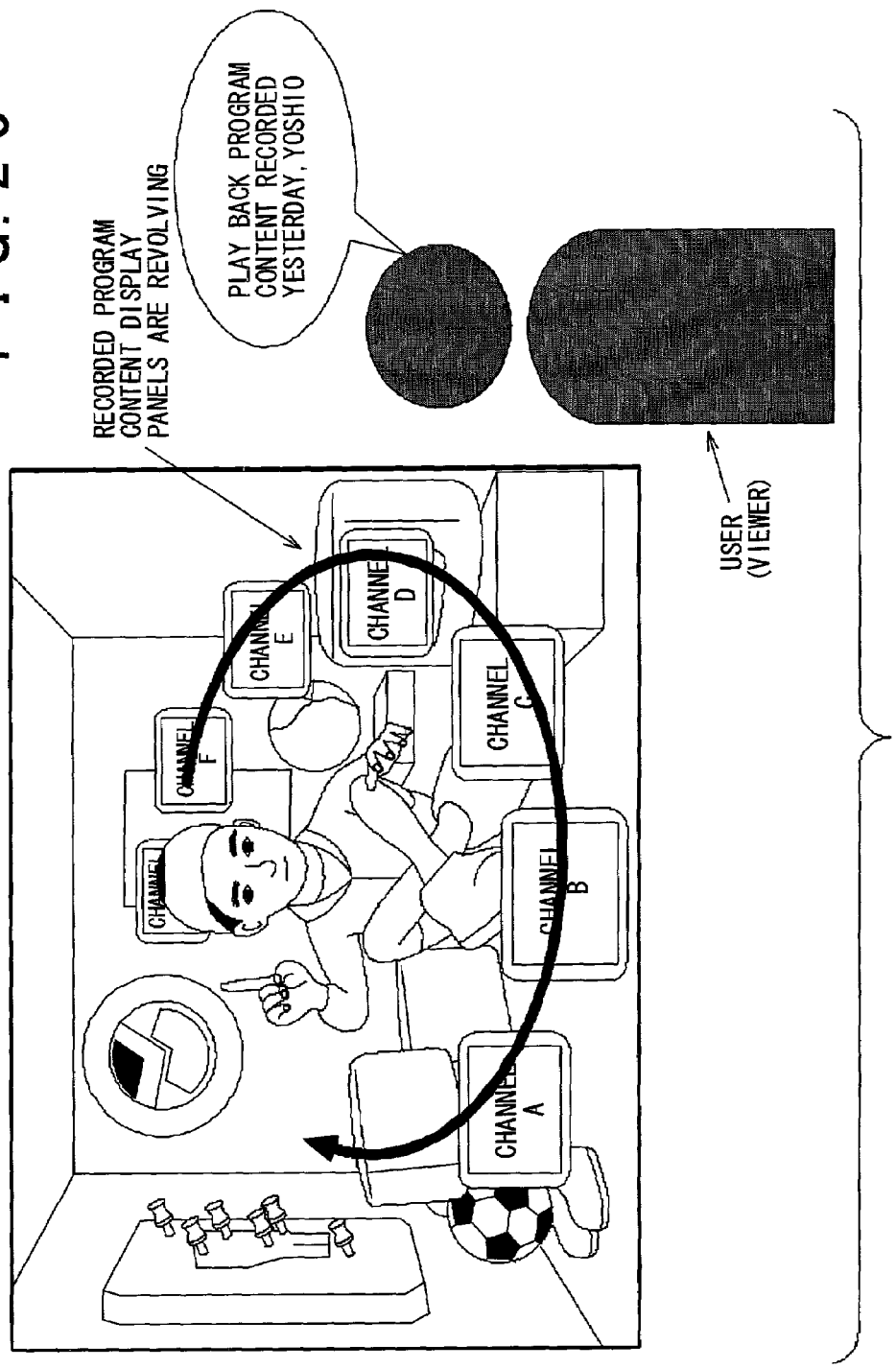

F I G. 3 9
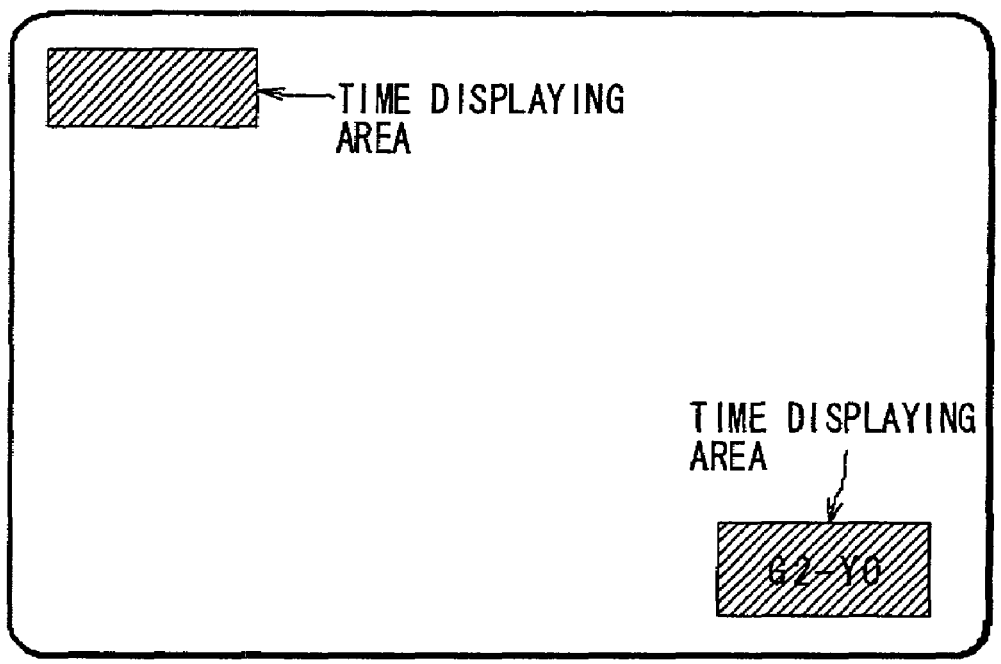

SYSTEM AND METHOD FOR SUPPORTING INTERACTIVE USER INTERFACE OPERATIONS AND STORAGE MEDIUM

CROSS REFERENCES TO RELATED APPLICATIONS

The present document is based on Japanese Priority Document JP 2000-222895, filed in the Japanese Patent Office on Jul. 24, 2000, the contents of which being herein incorporated by reference.

BACKGROUND OF THE INVENTION

1. Field of the Invention

This invention relates to a system and method for supporting operations for input of user commands to household electric appliances such as a television set/monitor and information equipment, and in particular, to an interactive operation support system and a method therefor, which permit input of user commands to various kinds of connected equipment interactively.

More specifically, the present invention is concerned with an interactive operation support system and a method therefor, which are adapted for input of user commands to the equipment in a natural form through a personified assistant, and in particular, to an interactive operation support system and a method therefor, which permit input of user commands by means of interaction with a personified assistant on a speech input base.

2. Description of the Related Art

Conventionally, an operation panel, a keyboard and a mouse or the like of a type requiring manual operation are mainly applied to a user interface, that is, input of commands to various kinds of household electric equipment such as a television set/monitor or information equipment including a personal computer. With the improvement of operation input performance of a processor and the advance of cognitive technology including speech recognition, an interactive speech-based input user interface is now widespread as well.

Since the user interface based on the manual operation permits direct and uniform input of commands to the equipment, a user may put the input operations into practice with certainty. However, the user has to understand and further get skilled in the techniques for operating the equipment to a certain extent, and therefore, an excessive burden is required for the user.

For instance, "a fingertip operation based interfaces" for control a menu with a ten-key or the like is mainly used in a television and other AV equipment. However, it is to be supposed that complicated operations are required for the interface in the user input mode described in the above to deal with network-connected household electric equipment.

While a user interface using a commander is now being generalized, too numerous switches are required to meet demands for multi-channel and multi-control including ground wave band, satellite systems, the Internet and HAVI (Home Audio/Video Interoperability: common command system for digital AV equipment), resulting in an increasing number of switches, thus making operation increasingly complicated. Combination of the above user interface with a multi-function switch and a menu screen permits a reduction in number of switches up to a certain point, however operation becomes very complex.

On the other hand, the user interface on the speech input base makes it possible to specify a command by analyzing a user request based on the result of input speech recognition on the equipment side, resulting in a relief from user's burden on the occasion of operation of the equipment. However, since it is necessary for the user to speak at a microphone in the absence of a partner, such operation hardly can be considered a naturally human action. Besides, the user may be subject to suffering mental anguish when carrying out interaction with such a kind of user interface.

In this connection, there is recently provided an interactive operation support system, which is set to allow a personified assistant to appear on a display screen, permitting the user to perform input of commands to the equipment in the form of carrying out a conversation face to face with an assistant on the screen.

In Japanese Patent Laid-open No. 11-65814, for instance, there is disclosed a user interface, which provides a sharp feeling of presence and actuality for the user by detecting a sound produced from the user or a direction of a sound source to control a visual image of an imaginary creature according to the result of detection (i.e., an imaginary creature is set to follow the source of sound by constantly gazing at the source direction).

Also, in Japanese Patent Laid-open No. 11-37766, there is disclosed an agent device, which provides a personified agent having functions of establishing communication with a driver in a vehicle. According to such agent device, the personified agent is set to make motions fit for the current conditions of the vehicle and the driver according to not only the current conditions of the vehicle and the driver but also the learning effects based on the past history, permitting the vehicle to establish communication with the driver.

Recently, an increase in computer processing power or the like permits a high-level interactive processing and also makes it possible to provide a sort of intelligence to the assistant on the screen. For instance, the assistant may not only operate an input command simple enough to be formed by a single word, such as a channel select command and a recording/reproduction start or stop command, but also perform complicated operations across a plurality of stages in pursuit of a context of the content of conversation with the user.

However, such a system making it possible to present the status conditions in progress related to such operations on the screen through an assistant has not been developed so far, and as a result, there is no other way other than the user having to wait for response from the system with one's eyes fixed on the screen. It is to be even supposed that if the user gives a command to the system to execute a processing requiring a response time, the user would even misunderstand that the equipment is out of order.

Thus, it is preferable that, in order to allow the user to operate the equipment based on interaction with the assistant, an operationally easy input of a command system produces an effect close to natural language is provided.

SUMMARY OF THE INVENTION

The preferred embodiments of the present invention provide a system and/or a method for supporting operations for inputting user commands to household electric equipment such as a television set/monitor and information equipment.

A preferred embodiment of the present invention provides a system and/or method for supporting interactive operations, permitting interactive input of user commands to the equipment.

Another preferred embodiment of the present invention provides a system and/or a method for supporting interactive operations, permitting input of user commands to the equipment in a natural form through a personified assistant.

A further preferred embodiment of the present invention provides a system and/or method for supporting interactive operations, permitting input of user commands by means of speech based interaction with a personified assistant.

A still further embodiment of the present invention provides a system and/or method for supporting interactive operations, permitting feedback of the progress conditions of operations specified by user commands inputted by means of speech based interaction with a personified assistant.

The preferred embodiments of the present invention are provided such that a first preferred embodiment of the present invention relates to a system for supporting interactive operations for input of user commands to electrical appliances or equipment. The system for supporting interactive operations includes a display unit, a speech input unit, a speech output unit and an operation control unit, the operation control unit including an assistant control means for generating a personified assistant to allow the generated assistant to appear on a screen of the display unit, an output speech control means for determining a speech required for the assistant to output the assistant's speech to the outside through the speech output unit after speech synthesis, an input speech recognition means for recognizing a user voice inputted through the speech input unit as a speech, an interaction management means for managing interaction between the user and the assistant according to the assistant's speech determined by the output speech control means and the user speech recognized by the input speech recognition means, and a command interpreting means for specifying the user's intention or the inputted user command based on the content of interaction traced by the interaction management means.

According to such preferred embodiment of the present invention, the assistant control means may also be set to determine a proper animation of the assistant based on the content of interaction managed by the interaction management means and/or the inputted user command specified by the command interpreting means.

The output speech control means may also be set to determine the assistant's speech based on the content of interaction managed by the interaction management means and/or the inputted user command specified by the command interpreting means.

The output speech control means may also be set to determine the assistant's speech suitable for leading the user's intention, when the command interpreting means fails to specify the user's intention or the inputted user command.

The system for supporting interactive operations may further comprise a connection means for connecting the external equipment such as a television set/monitor and a video deck to the system. In this case, the command interpreting means may also be set to interpret commands for control of external equipment functions inclusive of broadcasting program channel selection and recording/reproduction in the video deck or the like.

The system for supporting interactive operations may further comprise a communication means for connecting the system to a communication medium such as an external network and a telephone line. In this case, the input speech recognition means may also be set to recognize audio data received via the communication medium.

The system for supporting interactive operations may further comprise a communication means for connecting the system to a communication medium such as an external network and a telephone line, and a mail exchange means for making an exchange of electronic mails via the communication medium. In this case, the output speech control means may also be set to determine the assistant's speech based on the content of an incoming mail.

The interaction management means may also be set to manage an input speech of one user as a message bound for the other user. In this case, the output speech control means may also be set to determine the words the assistant's speech-will speak based on such message.

The assistant control means may also be set to place a personified assistant in a room (a character room) having various kinds of objects scattered around including links to information resources. For example, in response to an interested of the user in a recording media including a link to a music content placed in the room, the command interpreting means may also be set to interpret an inputted user command as a command to play back the music content.

In response to that the command interpreting means succeeds in interpreting an inputted user command, the assistant control means may also be set to allow the assistant to appear on the screen of the display unit.

The system for supporting interactive operations may further comprise a connection means for connecting a television set/monitor to the system. In this case, in response to the command interpreting means succeeding in interpreting an inputted user command as a channel select command, the assistant control means may also be set to make appear an assistant carrying in one's hand a selected broadcasting program display window.

Otherwise, in response to a command interpreting means interpreting an inputted user command as a channel change command, the assistant control means may also be set to display changeable broadcasting program display windows in the shape of a substantial ring around the assistant. In response to that a desired channel is definitely selected by shifting the display windows in such a way as to revolve on the substantial ring under a channel change command from the user, the assistant control means may also be set to zoom up the selected broadcasting program display window.

Still, the system for supporting interactive operations may further comprise a connection means for connecting a secondary storage device for storing and reproducing a broadcasting program content to the system. The secondary storage device referred in the present invention includes a video deck, a hard disc, DVD-RAM (Digital Versatile Disk—Read Only Memory) drive, CD-R/W (Compact Disc [a trademark]—Read/Write) drive or the like media storage device capable of recording mass media contents, for instance. In this case, in response to the command interpreting means interpreting an inputted user command as a recorded program reproduction command, the assistant control means may also be set to make the assistant have a binder showing a view of recorded broadcasting program contents in one's hand to appear. In response to that, a recorded broadcasting program content selected to be reproduced is definitely selected, the assistant control means may further be set to zoom up the selected recorded broadcasting program content display window.

The system for supporting interactive operations may further comprise a connection means for connecting a television set/monitor to the system. In this case, in response to that the command interpreting means succeeds in interpreting an inputted user command as a channel change command, the assistant control means may also be set to allow the assistant with a list of changeable broadcasting programs arranged in a matrix shape in one's hand to appear. In response to that a desired channel is definitely selected, the assistant control means may further be set to zoom up the selected broadcasting program display window. Further, EPG (Electronic Programming Guide) distributed as a part of data broadcast may be applied to generate the list of broadcasting programs in the matrix shape.

The system for supporting interactive operations may further include a connection means for connecting a television set/monitor to the system, a communication means for connecting the system to a communication medium such as an external network and a telephone line, and a mail exchange means for making an exchange of electronic mails via the communication medium. In this case, the assistant control means may also be set to allow an incoming mail display image to appear on the screen of the display unit, in response to the acceptance of a mail.

The system for supporting interactive operations may further comprise a text or character conversion means for converting ideograms like Japanese Kanji or the like, relating to text data displayed on the screen of the display, unit into phonetic characters like Japanese Kana or the like, or still vice-versa.

The system for supporting interactive operations may further have a communication means for connecting the system to a communication medium such as an external network and a telephone line and a certifying means for certifying an information terminal connected to the system via the communication medium.

The system for supporting interactive operations may further comprise a connection means for connecting a television set/monitor to the system, and an extraction means for extracting text information from a received broadcasting program content. In this case, the text information extracted by the extraction means may also be superimposed on the content of a different broadcasting program now being projected on the screen.

A second preferred embodiment of the present invention relates to a method for supporting interactive operations, and this method is applied to the equipment including a display unit, a speech input unit and a speech output unit for supporting input of user commands to the equipment or other externally connected equipment. The method for supporting interactive operations includes an assistant control step for generating a personified assistant to allow the generated assistant to appear on a screen of the display unit, an output speech control step for determining a speech required for the assistant to output the assistant's speech to the outside through the speech output unit after speech synthesis, an input speech recognition step for recognizing a user voice inputted through the speech input unit as a speech, an interaction management step for managing interaction between the user and the assistant according to the assistant's speech determined by the output speech control step and the user speech recognized by the input speech recognition step, and a command interpreting step for specifying the user's intention or the inputted user command based on the content of interaction traced by the interaction management step.

According to the preferred embodiment of the present invention, the assistant control step may also be set to determine a proper animation of the assistant based on the content of interaction managed by the interaction management step and/or the inputted user command specified by the command interpreting step.

The output speech control step may also be set to determine the assistant's speech based on the content of interaction managed by the interaction management step and/or the inputted user command specified by the command interpreting step.

The output speech control step may also be set to determine the assistant's speech suitable for leading the user's intention, when the command interpreting step fails to specify the user's intention or the inputted user command.

When the equipment further includes a connection means for connecting the external equipment such as a television set/monitor and a video deck to the equipment, the command interpreting step may also be set to interpret commands for controlling of external equipment functions including a broadcasting program channel selection and/or recording/reproduction in the video deck or the like.

When the equipment further includes a communication means for connecting the equipment to a communication medium such as an external network and a telephone line, the input speech recognition step may also be set to recognize audio data received via the communication medium.

When the equipment further includes a communication means for connecting the equipment to a communication medium such as an external network and a telephone line, and a mail exchange means for making an exchange of electronic mails via the communication medium, the output speech control step may also be set to determine the assistant's speech based on the content of an incoming mail.

The interaction management step may also be set to manage an input speech of one user as a message bound for the other user, and the output speech control step may also be set to determine the assistant's speech based on the message.

The assistant control step may also be set to place a personified assistant in a room scattered with various kinds of objects including links to information resources. In response to the interest of the user in a recording media including a link to a music content placed in the room, for instance, the command interpreting step may also be set to interpret an inputted user command as a command to play back the music content.

In response to the command interpreting step succeeding in interpreting an inputted user command, the assistant control step may also be set to allow the assistant to appear on the screen of the display unit.

When the equipment further includes a connection means for connecting a television set/monitor to the equipment, in response to the command interpreting step succeeding in interpreting an inputted user command as a channel select command, the assistant control step may also be set to allow the assistant with the selected broadcasting program display window in one's hand to appear.

Otherwise, in response to the command interpreting step succeeding in interpreting an inputted user command as a channel change command, the assistant control step may also be set to display changeable broadcasting program display windows in a ring-shaped form around the assistant. In response to a desired channel selected by shifting the display window in such a way as to move on the ring-shaped form under a channel change command from the user, the assistant control step may further be set to zoom up the selected broadcasting program display window.

When the equipment further includes a connecting means for connecting a secondary storage device for storing and reproducing a broadcasting program content to the equipment, in response to that the command interpreting step succeeds in interpreting an inputted user command as a recorded program reproduction command, the assistant control step may also be set to allow the assistant with a binder showing a view of recorded broadcasting program contents in one's hand to appear. In response to that a recorded broadcasting program content desired to reproduce is definitely selected, the assistant control step may further be set to zoom up the selected recorded broadcasting program content display window. The secondary storage device referred to the present invention includes a hard disc, DVD-RAM drive, CD-R/W drive or the like media storage device capable of recording of mass media contents, in addition to the video deck.

When the equipment further includes a connection means for connecting a television set/monitor to the equipment, in response to that the command interpreting step succeeds in interpreting an inputted user command as a channel change command, the assistant control step may also be set to allow the assistant with a list of changeable broadcasting programs arranged in a matrix shape in one's hand to appear. In response to that a desired channel is definitely selected, the assistant control step may further be set to zoom up the selected broadcasting program display window. Further, EPG (Electronic Programming Guide) distributed as a part of data broadcast may be applied to generate the list of broadcasting programs in the matrix shape.

When the equipment further includes a connection means for connecting a television set/monitor to the equipment, a communication means for connecting the equipment to a communication medium such as an external network and a telephone line, and a mail exchange means for making an exchange of electronic mails via the communication medium, the assistant control step may also be set to allow an incoming mail display image to appear on the screen of the display unit in response to the acceptance of a mail.

The method for supporting interactive operations may further include a text conversion step for converting, for example, a Japanese ideogram Kanji related to text data displayed on the screen of the display unit into a phonetic symbol, like Japanese Kana. This can be applied for conversion of displayed data of one system or group of characters or codes into another system or group of characters or codes.

The method for supporting interactive operations may further include a communication step for connecting the equipment to a communication medium such as an external network and a telephone line, and a certifying step for certifying an information terminal connected to the equipment via the communication medium.

When the equipment further includes a connection means for connecting a television set/monitor to the equipment, the method for supporting interactive operations may further comprise an extraction step for extracting text information from a received broadcasting program content. The text information extracted by the extraction step may also be superimposed on the content of a different broadcasting program currently projected on the screen.

A third preferred embodiment of the present invention relates to a storage medium, in which computer software describing the interactive operation support processing for execution on a computer system is stored physically in a computer readable form, the interactive operation support processing being applied to equipment including a display unit, a speech input unit and a speech output unit for supporting input of user commands to the equipment or other externally connected equipment. The computer software of the storage medium includes an assistant control step for generating a personified assistant for making the generated assistant to appear on a screen of the display unit, an output speech control step for determining a speech required for the assistant to output the assistant's speech to the outside through the speech output unit after speech synthesis, an input speech recognition step for recognizing a user voice inputted through the speech input unit as a speech, an interaction management step for managing interaction between the user and the assistant according to the assistant's speech determined by the output speech control step and the user speech recognized by the input speech recognition step, and a command interpreting step for specifying the user's intention or the inputted user command based on a content of interaction traced by the interaction management step.

The storage medium according to the third preferred embodiment of the present invention refers to a medium, which provides physically the computer software, in a computer readable form, for a general-purpose computer system permitting various program codes to be executed, for instance. The above storage medium includes CD (Compact Disc—a trademark), FD (Floppy Disc—a trademark), MO (Magneto-optical Disc) or any other detachabe and portable storage medium, for instance. The above storage medium may also technically provide the computer software for a specific computer system in a computer readable form via transmission medium such as a network (no matter whether such network is of a cable or a wireless type) or the like.

The above storage medium is constructed in accordance with definition of the structural or functional cooperative relation between the computer software and the storage medium for the purpose of performing the predetermined computer software functions on the computer system. In other words, installation of the predetermined computer software into the computer system through the storage medium according to the third preferred embodiment of the present invention makes it possible to perform cooperative functions on the computer system and as a result, may produce the functional effects similar to those of the system or method for supporting interactive operations according to the first or second preferred embodiment of the present invention.

According to the system and method for supporting interactive operations of the present invention, applying the animated character called a personified assistant making reactions based on speech analysis and animations to the user interface permits the user to feel friendly toward the user interface and simultaneously makes it possible to meet a demand for complicated commands or to provide an entry into services for the user. Further, since there is provided a command system producing an effect close to natural language, the user may easily operate the equipment with the same feeling as ordinary human conversation.

BRIEF DESCRIPTION OF THE DRAWINGS

The foregoing and other objects and features of the invention will become apparent from the following description of preferred embodiments of the invention with reference to the accompanying drawings, in which:

FIG. 19 is a view showing display on the screen, when reproduction of a recorded program content is performed through the assistant according to a preferred embodiment of the present invention;

FIG. 20 is a view showing display on the screen, when reproduction of a recorded program content is performed through the assistant according to a preferred embodiment of the present invention;

FIG. 21 is a view showing display on the screen, when reproduction of a recorded program content is performed through the assistant according to a preferred embodiment of the present invention;

FIG. 22 is a view showing display on the screen, when reproduction of a recorded program content is performed through the assistant according to a preferred embodiment of the present invention;

FIG. 23 is a view showing display on the screen, when reserved recording is set through the assistant according to a preferred embodiment of the present invention;

FIG. 24 is a view showing display on the screen, when reserved recording is set through the assistant according to a preferred embodiment of the present invention;

FIG. 25 is a view showing display on the screen, when reproduction of a recorded program content is specified on a daily basis through the assistant according to a preferred embodiment of the present invention;

FIG. 39 is a view showing the location of time display areas on the content of a program now being projected on the screen according to a preferred embodiment of the present invention.

DETAILED DESCRIPTION OF THE PREFERRED EMBODIMENTS

Figure 1:
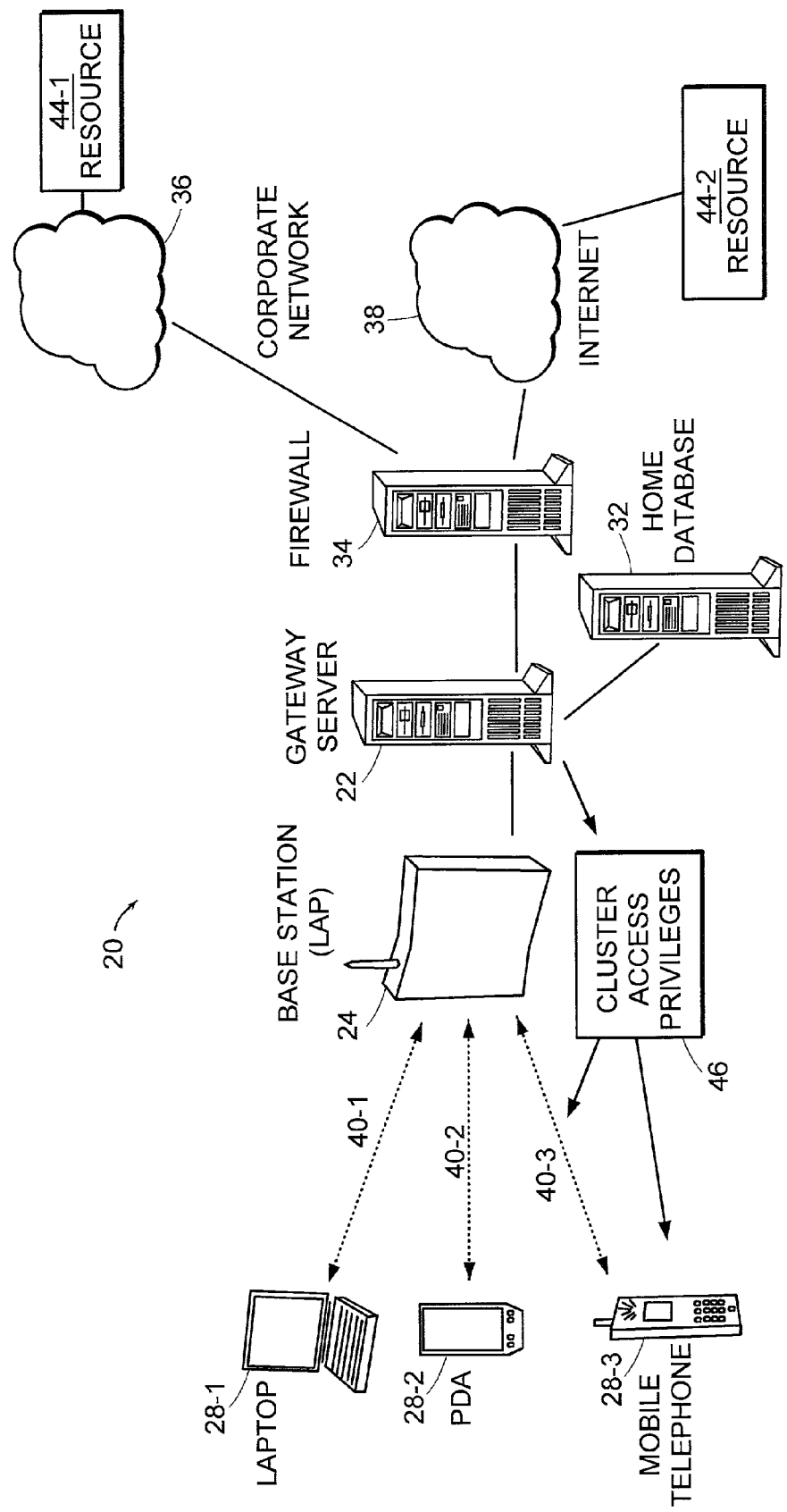
FIG. 1 schematically illustrates the hardware configuration of a system 1 for supporting interactive operations for use in a preferred embodiment of the present invention.

FIG. 1 schematically illustrates a hardware configuration of a system 1 for supporting interactive operations for use in a preferred embodiment of the present invention. The system 1 is configured as a receiving device for a television set/monitor such as STB (Set Top Box), for instance, and is connected to the television set/monitor. The system 1 may provide support services of user operations such as channel selection and recording/reproduction by carrying on interaction with a user through the mediation of an assistant, which will be described later, to interpret explicit or latent user's intention based on the interaction. A description will now be given of each unit with reference to FIG. 1.

A central control unit 11 refers to an operation control unit for controlling the operations in the interactive operation support system 1 generally according to a predetermined control program and performs the processing of generating an assistant as a partner for the user, allowing action patterns of the assistant to appear and managing the interaction between the user and the assistant based on input/output of speeches and images, for instance.

The following functions are contained in the control program executed in the central control unit 11, for instance. That is:

(1) Operational control of each unit in the system 1 according to an inputted user command resulting from recognition of a speech inputted through a microphone 22;
(2) Control of various kinds of external equipment connected to the system through an input/output interface 17;
(3) Control of a tuner 15;
(4) Character control relating to the assistant (generation of the animation corresponding to the input command resulting from speech recognition);
(5) Speech synthesis (conversion of audio data produced from the character into an audio signal. Provided that synchronization of the animation of character lip motions or the like with a speech is required.);
(6) Control of connection or the like of the system to an external network through a communication interface 18;
(7) Control of EPG (Electronic Programming Guide) and other data for data broadcast;
(8) Control of output of a speech through a speaker 21;
(9) Control of display on a screen through a monitor 25;
(10) Control according to the inputted command through a remote controller (not shown);
(11) Processing of text data for use in electronic mails, EPG and a wide area network;
(12) Conversion of text data based on user profiles (for converting Kanji into Kana for children, for example);
(13) Image measurement based on data accompanying a video signal (for extracting information relating to the progress of scoring on the sports programs such as a baseball game and a soccer game and time information from a program content displayed on the screen) and various kinds of services based on image recognition (for informing the user about the information related to the progress of scoring and also to set time information or the like);
(14) Bit map conversion requiring a font selected from a font database based on text data;
(15) Combination of texture selected from a texture database with a font bit map; and
(16) Basic settings of the system (including screen brightness, sound volume and various kinds of input/output operations).

A tuner 15 performs tuning of broadcast wave of a predetermined channel, that is, channel selection according to a command from the central control unit 11. The received broadcast wave is separated into a video data portion and an audio data portion The video data is outputted to the monitor 25 through an image processing unit 16 for display on the screen, while the audio data is outputted to the speaker 21 through a speech synthesis unit 14 for production of sounds (alternatively, line output will be enough as well).

A storage device 12 is used for storage of data required for generation of images and action patterns of the assistant. The following information is included in the data stored, for instance. That is:

(1) 3D-character image information of the assistant and data required for generating the animation of the assistant;
(2) Layout and other information relating to a character room adapted to bring the assistant into action;
(3) User profile information of the user who carries on the interaction with the assistant;
(4) History of user-assistant conversations in the past and other interchanges, and character/feeling and learning data based on the history; and
(5) Advertising contents to be mapped into the assistant or the character room.

The storage device 12 also performs storage of various kinds of databases (not shown) such as a font database and a texture database, in addition to storage of information relating to the assistant. The font database is used for management of various kinds of fonts required for EPG, an electronic message board and an electronic mail or the like. The texture database is used for management of various kinds of textures (2D-bit map data or the like) required for the EPG, the electronic bulletin board and the electronic mail or the like.

While it doesn't matter that the system 1 is set to make only a single assistant to appear, a different assistant may also be provided for each user. That is, a plurality of characters different in age, sex and character are available for the system 1 to automatically select the characters according to the user profile on the occasion of initial log-in or to permit the user to select the characters for making an entry of the selected character in association with the user profile or the like. Otherwise, assistant learning/history data may also be provided for each user, so that the same assistant, even if needed, is set to make different reactions according to each user.

The speech recognition unit 13 performs recognition of an audio signal, i.e., a user speech supplied through a speech input device such as the microphone 22 as text information, before analysis of an inputted user command converted into a text format with the use of a language database (not shown). More specifically, the processing of dividing a text into word units through morpheme analysis to gain language information such as syntactic information and conversational information through syntactic/semantic analysis is performed to understand the inputted user command or the like, which is then outputted to the central control unit 11.

The input/output interface 17 refers to a device for connecting the external equipment such as a video deck 23 and a personal computer (PC) 24 to the system 1. One or more AV equipment and information equipment may be connected externally to the system 1 according to interface specification such as i-link (IEEE1394), for instance.

The communication interface 18 refers to a device for mutually connecting the system 1 to other host computer systems on an external network. The external network is equivalent to a wide area network such as the Internet, for instance. On the network, there are provided various kinds of servers such as a WWW (World Wide Web) server to distribute WWW resources described in HTML format, a mail server to distribute mail exchange services to each user account and an advertising server to distribute advertising contents updated every moment. In the embodiment of the present invention, it is to be understood that at least one of the servers on the network should be a character server to distribute character data of images, animations and character/action models relating to the assistant required for support of interactive operations for free or paid service.

In addition to the above servers, the network also involves an information distribution server such as "Season Database" constructed by collecting public institution services or the like, "Weekly" to distribute a weather report, a broadcasting program guide or the like every week, "Daily" to distribute news and advertisement or the like highly instantaneous information every day and "Timely" to distribute constantly changing information like stock quotations, exchange rate and traffic information, a commerce server to distribute services of physical distribution sales and settlement of accounts (electronic settlement of accounts) and an Internet service provider or the like.

In case of a TCP/IP (Transmission Control Protocol/Internet Protocol) network, for instance, since the resources distributed from each server are identified in URL (Uniform Resource Locator) format, the system 1 may download these information resources according to a predetermined protocol such as HTTP (Hyper Text Transfer Protocol). Thus, the interactive operation support system 1 according to the embodiment of the present invention may update the images and character/functions or the like of the assistant by re-downloading the active character data cyclically or at the desired timing.

Transactions executable by the interactive operation support system 1 via the network are given as follows:

(1) To update a control program for driving each unit in the system 1;
(2) To download a character constituting the assistant;
(3) To download font data;
(4) To download texture data;
(5) To issue a request to substitute program recording for a recording means (video tape or like media, for instance) which is not provided although desired (Refer to "Recording substituting system" disclosed in Japanese Patent Laid-open No. 2000-162320 already assigned to the present applicants);
(6) To analyze a user profile and to user-customize;
(7) To utilize public institution services;
(8) To acquire a weather report, a program guide, news, traffic information and advertisement or the like;
(9) Electronic commercial transactions;
(10) Character control via the network (with the use of a speech, an electronic mail and a control Web page or the like).

A modem 19 refers to a device for transferring digital computer data via a public telephone line such as PSTN (Public Switched Telephone Network) and performs modulation into an analog signal and demodulation into a digital signal.

A telephone installed in each house is connected to the public telephone line through a switchboard, for instance. The public telephone line is also connected to a wireless telephone network. Thus, the interactive operation support system 1 according to the preferred embodiment of the present invention permits exchange of data to and from the installed telephone and a mobile telephone. The assistant automatically generated in the central control unit 11 may also be set to interpret inputted user commands based on the interaction with the user through the mobile telephone.

The central control unit 11 gives effect to perform the interaction between the user and the system 1 by controlling the operations in the system 1 in accordance with the result of speech recognition by the speech recognition unit 13.

When the input user speech is interpreted as a conversation with the assistant, for instance, the central control unit 11 determines assistant reactions based on a speech and animations after determining the motions of the assistant according to learning/history data and the action models relating to the assistant.

The assistant's speech is outputted to the outside through the speaker 41 after being synthesized by the speech synthesis unit 14. When a sound of a program now being on the air is produced, the assistant's speech may also be outputted after being superposed with the sound.

The assistant motion is synthesized with an image by an image processing unit 16 with reference to 3D-character information and animation information. At this event, a background (scene) can be changed over with reference to character room information, when occasion demands. Otherwise, an assistant image or a character room, where the assistant is found, may be displayed in the state of superposition with the contents of one or more programs now being on the air (which will be described later in detail).

When the input user speech is interpreted as a channel change command, the central control unit 11 transfers a channel number to the tuner 15 for channel selection.

When the input user speech is interpreted as a command (start and end of recording and reproduction operations, fast forward, rewind and playback from each head and file transfer, for instance) to the external equipment such as the video deck 23 and the personal computer 24, the central control unit 11 issues a required command to the associated equipment via the input/output interface 17.

When the user input speech is interpreted as a command for access to the wide area network, the central control unit 11 transfers a request for access to a specified host system on the network via the communication interface 18. When the network refers to TCP/IP network such as the Internet, for instance, the request for access is described in URL format. In such a case, the user may read up URL or may utter few words (a home page title, for instance) uniquely related to URL. In the latter case, the speech inputted through the assistant is converted into URL after being recognized.

The system 1 may also be set to accept an inputted user command from a remote controller (not shown), similarly to the conventional AV equipment. In such a case, a unit for receiving wireless (infrared) data transmitted from the remote controller and a decoder for interpreting data received are required, and decoded data and commands are processed in the central control unit 11.

The interactive operation support system 1 according to the preferred embodiment of the present invention is characterized by performing input of commands from the user on a speech base by carrying on the interactive processing through the medium of the assistant generated on the screen of the monitor 25. The assistant referred to the embodiment is a 3D-character having animation functions. The interactive processing is set to involve the processing of interpreting a user-assistant conversation (a daily conversation) to extract user commands and that of providing user feedback through assistant reactions.

According to the interactive operation support system 1 of the preferred embodiment of the present invention, applying the personified assistant making reactions based on speech synthesis and animations to the user interface permits the user to feel friendly toward the user interface, and simultaneously makes it possible to meet a demand for complicated commands or to provide an entry into services for the user. Further, since the interactive operation support system 1 has the command system producing an effect close to natural human language, the user may easily operate the equipment with the same feeling as ordinary conversations.

Figure 2:
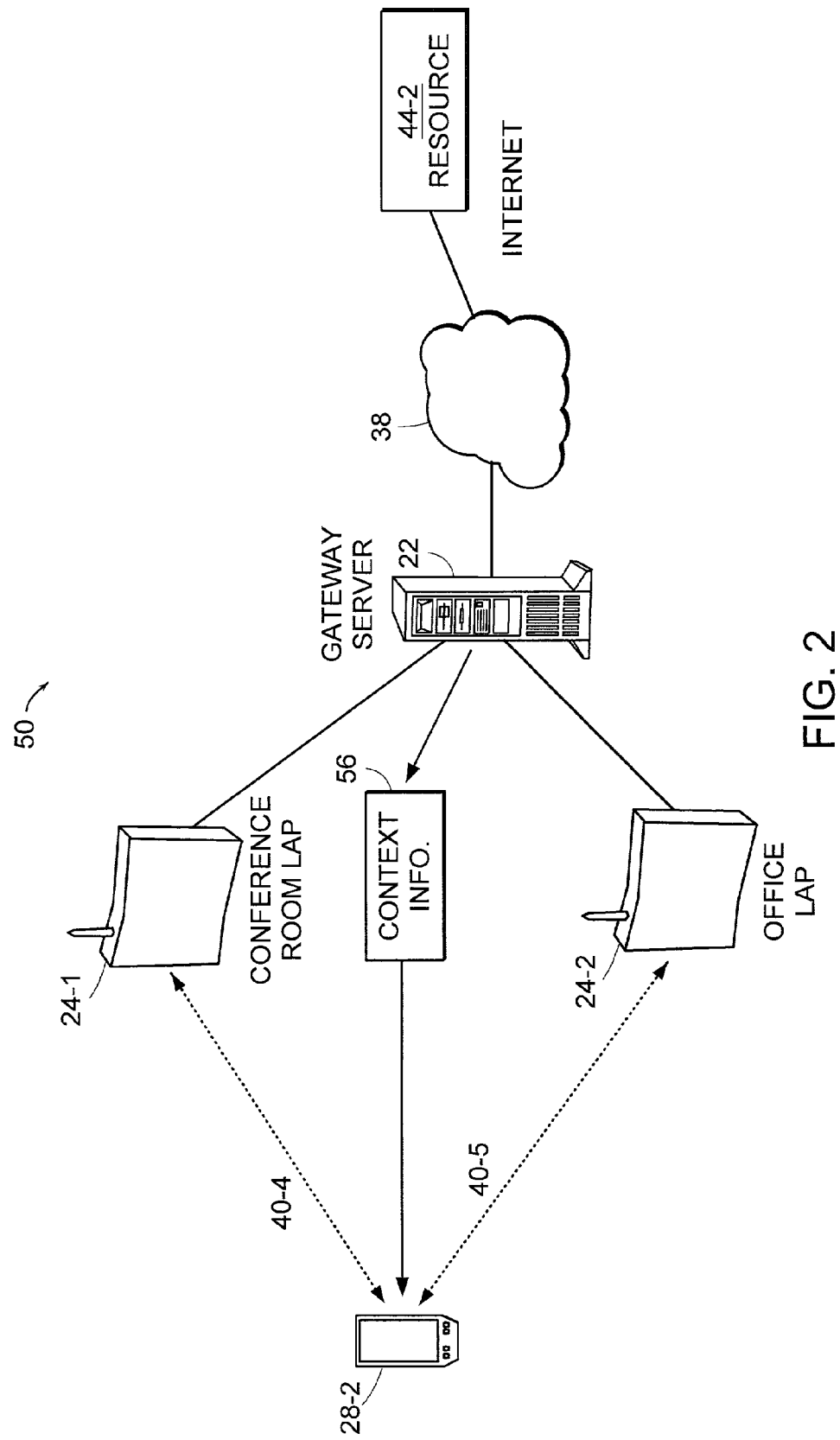
FIG. 2 shows a command processing system in the interactive operation support system 1 according to a preferred embodiment of the present invention.

FIG. 2 shows a command processing system in the interactive operation support system 1 according to the preferred embodiment of the present invention.

In the speech recognition unit 13, the user speech inputted through the microphone is recognized as text information, and further, the inputted user command converted into a text format is analyzed with the use of a language database (not shown).

In the preferred embodiment of the present invention, commands provided as practicable commands include "Character control" for generating assistant motions in response to the inputted user command, "Equipment control" for instructing the video deck and other external equipment connected to the system 1 to operate, "Speech synthesis" for generating an assistant's speech in response to the inputted user command, "Mail" for making an exchange of mails through the network and "Bulletin board" for making an exchange of messages among a plurality of (unspecified) users or the like.

"Character control" refers to a command to control the system 1 and the equipment externally connected thereto in cooperation with the assistant motions (in other words, with the assistant motions as feedback) in response to the inputted user command on a speech base.

Figure 3:
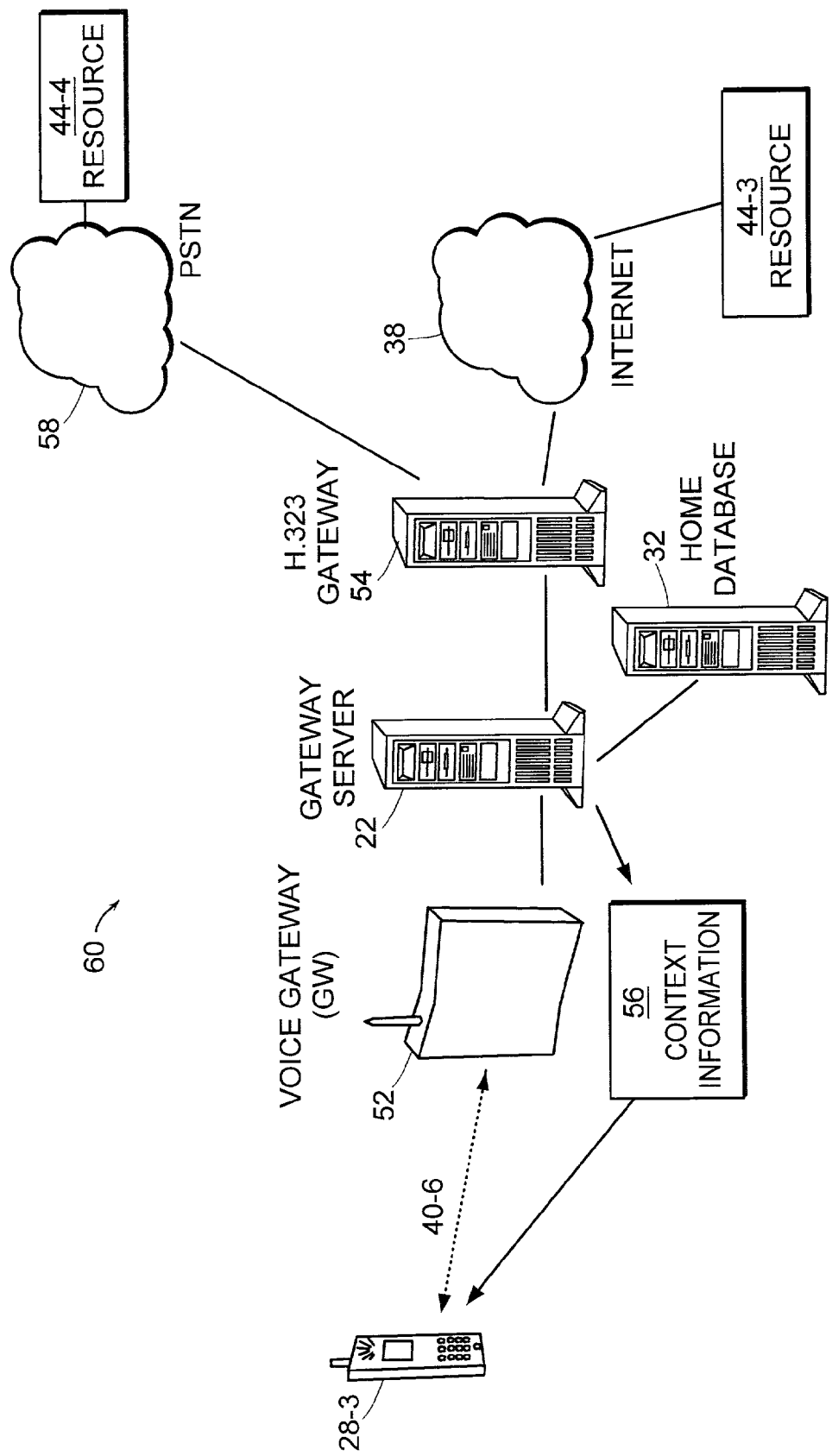
FIG. 3 shows a character control system in the interactive operation support system 1 according to a preferred embodiment of the present invention.

FIG. 3 illustrates a character control system in the interactive operation support system 1 according a the preferred embodiment of the present invention.

As shown in FIG. 3, the system 1 may perform function commands such as "Channel selection", "Channel change", "AV equipment control", "Mail read", "Mail write", "Bulletin board read", "Bulletin board write" and "Ambient" through character control.

In this embodiment, "Ambient" means the functions of setting the character constituting the assistant to make motions in a proper way or to act as if urging the user to input commands by means of speech synthesis when the system is placed in the wait state.

Synchronization of speech with animation for automatic lip sync (pronouncing lip shape) is preferably required for the system 1 to perform "Mail read" and "Bulletin read" or the like functions of setting the character to read up text information.

The procedure of performing the function commands through character control will be described below.

The character is set to inform the user about the current status by means of speech synthesis or the like. The system 1, when remote-controlled by the user via the network or through the mobile telephone, may apply an electronic mail or the like means to inform the user about the status.

Instead of a single character constituting the assistant, characters customized individually every user may also be provided for the same interactive operation support system 1. A type or model and animation of each character can be updated or changed through a communication means such as a network, a recording media or broadcasting, for instance. Further, advertising or other information contents may be dynamically mapped into clothes texture of each character.

Figure 4:
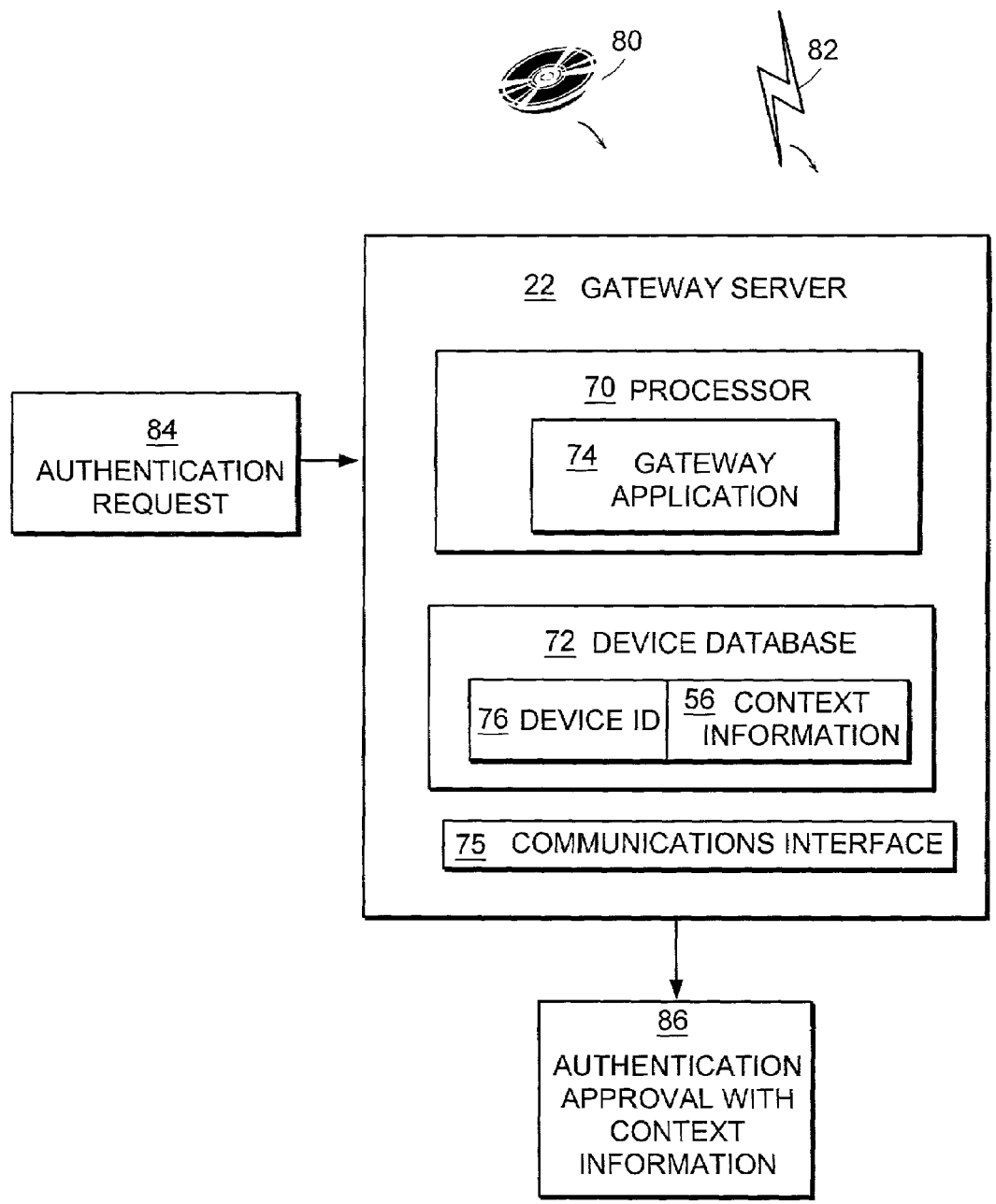
FIG. 4 is a block diagram showing the principle configuration required for the command processing on a speech input base in the interactive operation support system 1 according to a preferred embodiment of the present invention.

FIG. 4 illustrates a basic configuration required for the command processing on a speech base in the interactive operation support system 1 according to a preferred embodiment of the present invention.

The speech inputted through the microphone 22 is converted into text base information after being recognized by the speech recognition unit 13.

The central control unit 11 performs the processing of interaction with the user based on the text information to understand the user command given in the form close to a natural language.

The central control unit 11 then controls the operation of the AV equipment externally connected to the interactive operation support system 1 according to the result of command interpreting. In addition, the central control unit 11 permits user feedback of the conditions of execution of the commands by means of speech synthesis or by generating character animation.

A description will now be given of some embodiments relating to the command interpretive processing carried by the interactive operation support system 1 on the speech input base according to the preferred embodiment of the present invention.

Embodiment 1

An input user speech in Japanese, "Video 1 kara Video 2 ni dubbing shite", which is English equivalent to a command of "Dub a recorded content in Video 1 into Video 2", is processed as follows.

The system 1 converts the input user speech into text and further divides into lexical units of "Video", "1", "kara", "Video", "2","ni", "dubbing" and "shite".

The system 1 further sorts this command form into two kinds of lexical units, that is, one representing two kinds of equipment specified by "Video", "1" and "2" and the other representing a single command specified by "dubbing".

The system 1 then analyses these lexical units to generate an equipment control command of "Video", "1" "kara" "Video" "2" "ni" "dubbing", which is English equivalent to a command of "Dub a recorded content in Video 1 into Video 2".

Embodiment 2

An input user speech in Japanese, "Video wo Dubbing", which is English equivalent to a command of "Dub a recorded content in Video", is processed as follows.

The system 1 divides the input user speech into lexical units of "video", "wo" and "dubbing".

Since the lexical unit representing a command specified by "dubbing" is contained in this command form, it may be supposed that there are two kinds of equipment. Then, the system 1 provides, for the user, a speech representing a question stating that from which video to which video. In response to the question from the system, a command of "Video 1 kara Video 2 e", which is English equivalent to a command of "From Video 1 to Video 2", is given from the user to the system.

The system 1 further divides the above command form into lexical units of "Video", "1", "kara", "Video", "2" and "e".

After reinput of lexical units insufficient for lexical interpretation, the system 1 generates a command of "Video 1 kara Video 2 e dubbing", which is English equivalent to a command of "Dub a recorded content in Video 1 into Video 2".

Embodiment 3

An entry of synonyms is required for lexical interpretation to cope with a wide-ranging mode of expression.

For instance, a lexical unit of "1 channel" covers all the following modes of expression in the Tokyo area.

"Ichi"

"Ichan"

"Ichannel"

"Sogo"
"Sogo TV"
"NHK sogo"
"NHK sogo TV"
"NHK"

Embodiment 4

The command forms are classified into single, double, triple command forms or the like.

The single command form refers to a command formed by a single lexical unit such as "NHK" and "Yon-channel", for instance.

The double command form is composed of lexical units representing the single equipment and a single command form. For instance, a command composed of lexical units of "Television", "rokuga" and "shite" (provided that omission of "shite" is possible), which are English equivalent to a command of "Record a television program" and a command composed of lexical units of "Rokuga", "shitamonoo" and "misete", which are English equivalent to a command of "Playback recorded program content", are involved in the double command form.

The triple command form is composed of lexical units representing two kinds of equipment and a single command form. For instance, a command composed of lexical units of "Video", "1", "kara", "Video" "2", "ni" and "dubbing", which are English equivalent to a command of "Dub a recorded content in Video 1 into Video 2", and a command composed of lexical units of "DVD", "wo", "Video", "1", "ni" and "Copy", which are English equivalent to a command of "Dub a recorded content in DVD into Video 1" and so on are involved in the triple command form.

Figure 5:
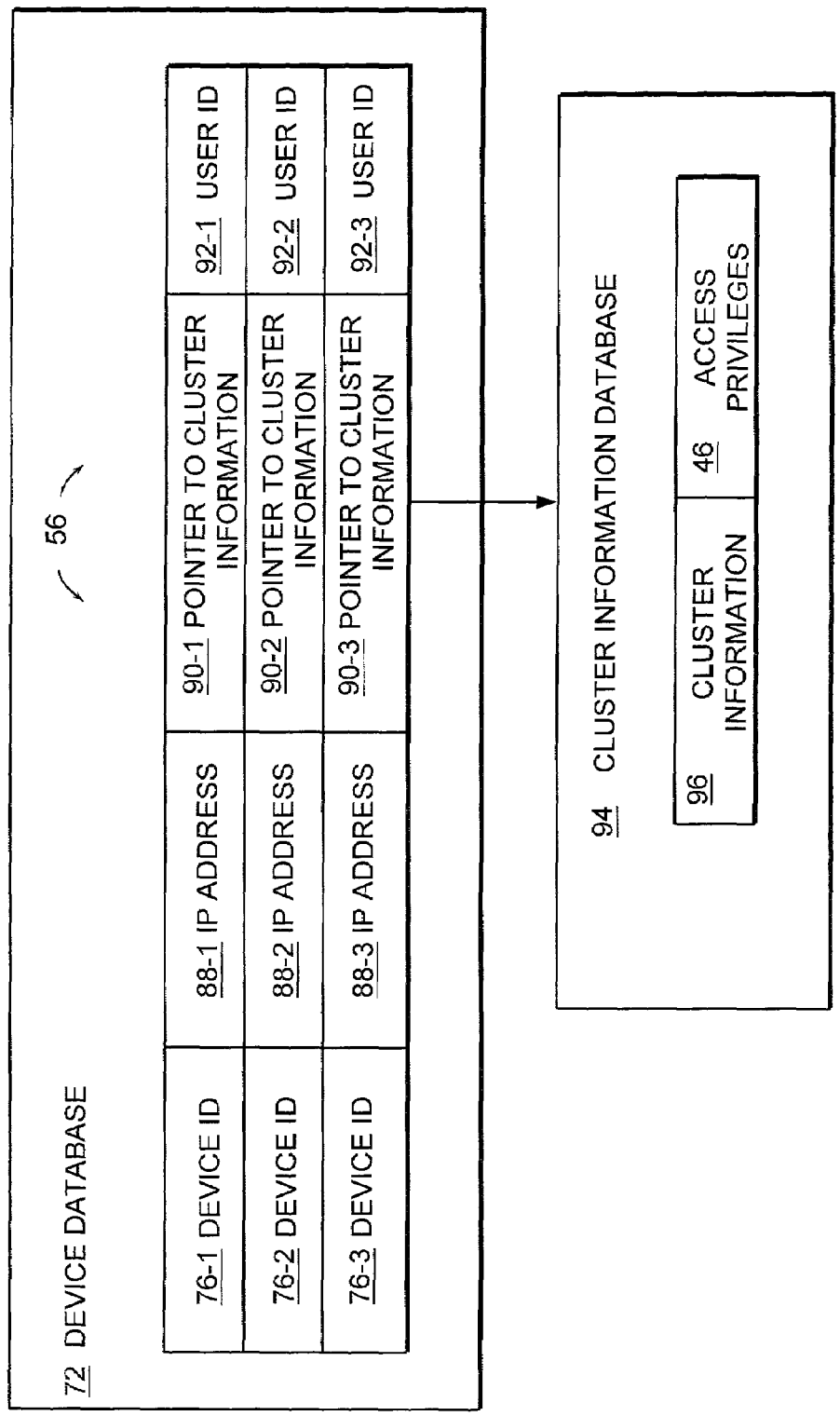
FIG. 5 is a flow chart schematically showing the flow of the character control processing according to a preferred embodiment of the present invention.

FIG. 5 schematically shows a flow of the character control processing.

When the power of the television monitor 25 is turned on, the character constituting the assistant begins operating. The assistant is set to sit and wait in a living room (or one's private room), for instance, for input of function commands such as "Channel change", "Recording of dynamic image", "Reproduction (playback) of recorded content", "Mail write", "Mail read", "Web search (i.e., search of WWW information space), "Message (for writing or reading of a message to or from the bulletin board)" and "Service" from the user.

The user may give a command to the assistant in a natural language form by means of input of a speech through the microphone 22, for instance. Otherwise, the system 1 also permits the user to give a command to the assistant through the mobile telephone from the place where the user is staying. Provided that there is no point in giving function commands such as "Channel selection" and "Reproduction of recorded program content" from the remote environment, and therefore, the functions practicable by commands through the mobile telephone may be limited to "Recording of dynamic image", "Mail read" and "Service" or the like.

Figure 6:
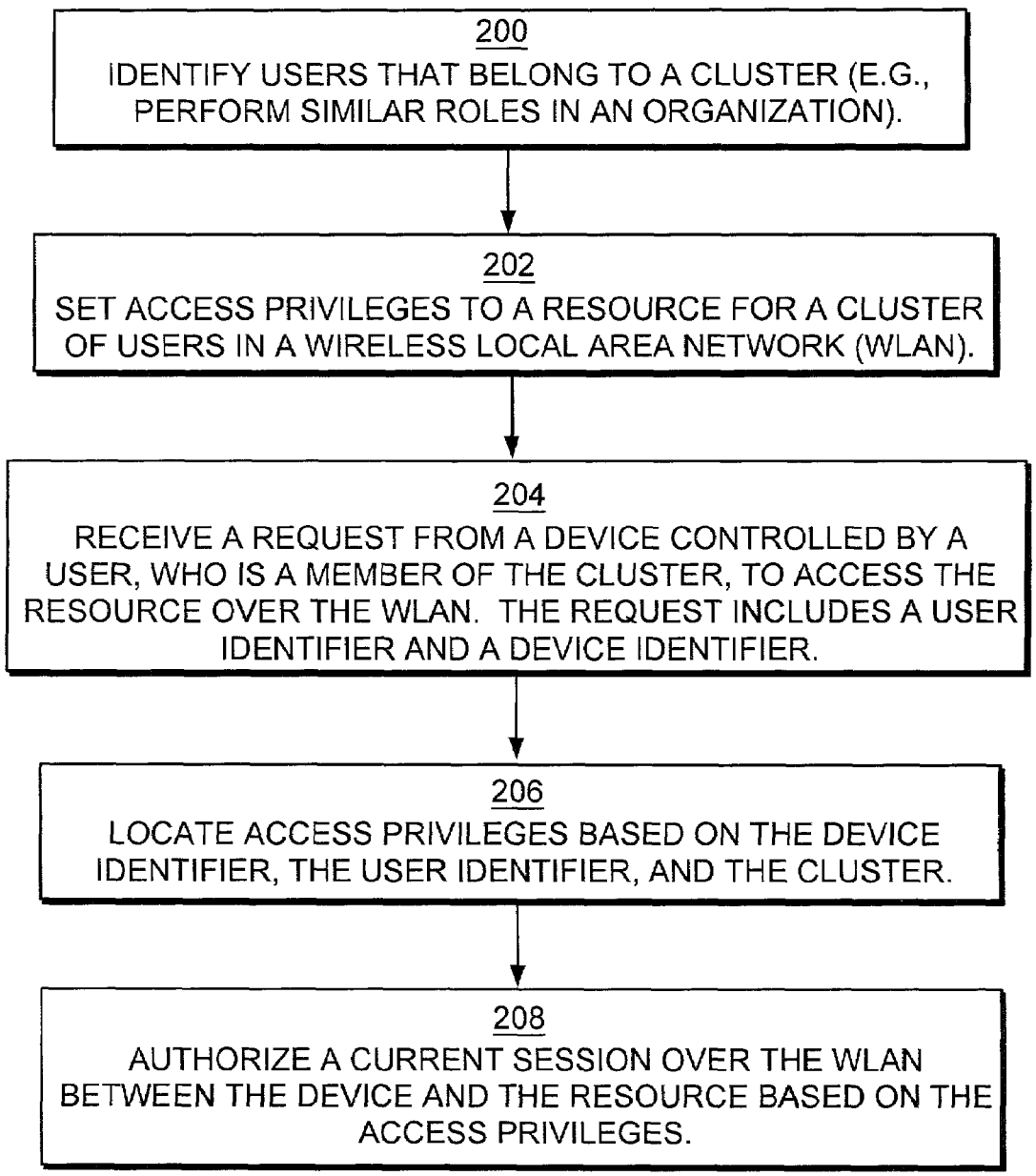
FIG. 6 is a view showing a display screen, which appears immediately after the application of power to a television monitor 25 according to a preferred embodiment of the present invention.

FIG. 6 is a view showing a display screen, which appears immediately after turning the power of the television monitor 25 on.

Immediately after activation of the system, the assistant is put in the "Ambient", that is, the standby state in such a way as to make motions in a proper way or to act as if urging the user to input a command through speech synthesis.

In the illustrated embodiment, an assistant character called "Yoshio" is making an appearance in an assistant room (a character room). Each assistant has a default or user-specified character. "Yoshio" is set to meet the following requirements, for instance.

$$\text{"Yoshio" is - - -} \qquad \text{[Formula 1]}$$

cheerful boy, who lives inside the Television set and is growing up day after day.

Since he inhabits the Television set, he is well acquainted with everything about the Television as a matter of course and also can control most of the equipment connected to the Television.

Since he is a curious boy, various kinds of things are put in his room, and up-to-date information also lies scattered around in his room.

He sometimes makes meaningless motions too. (Well, he must make allowance for his childhood.)

Although it seems that he has friends or companions, persons who succeeded in gaining access to his friends or companions are limited yet.

Well, suppose that he is a good-natured boy, in other words, a pretty interface.

The "Yoshio's" room is scattered with various kinds of objects such as magazines and toys, for instance. These objects have references of links to various services such as advertising and merchandizing services (including distribution of data content and music content in addition to physical shopping). That is, user-accessible objects are scattered about the room, and it comes to this, that the scattered objects suggest that the user may gain access to what kind of things, if speaking something.

The system 1 permits the user to utilize advertising and other information resources by providing the room for the assistant. The assistant, if set to derive the user profile through the interaction with the user, makes it possible to meet a demand for more carefully throughout services. The assistant may also be set to cope with user's peculiar way of expression and speaking or the like.

For instance, if the user speaks to "Yoshio" about one's interested object, the input user speech is recognized and then interpreted as a command, and information resources, to which the target object is link-referred, are called. The objects scattered over in the room or the assistant clothes may be changed everyday.

Figure 7:
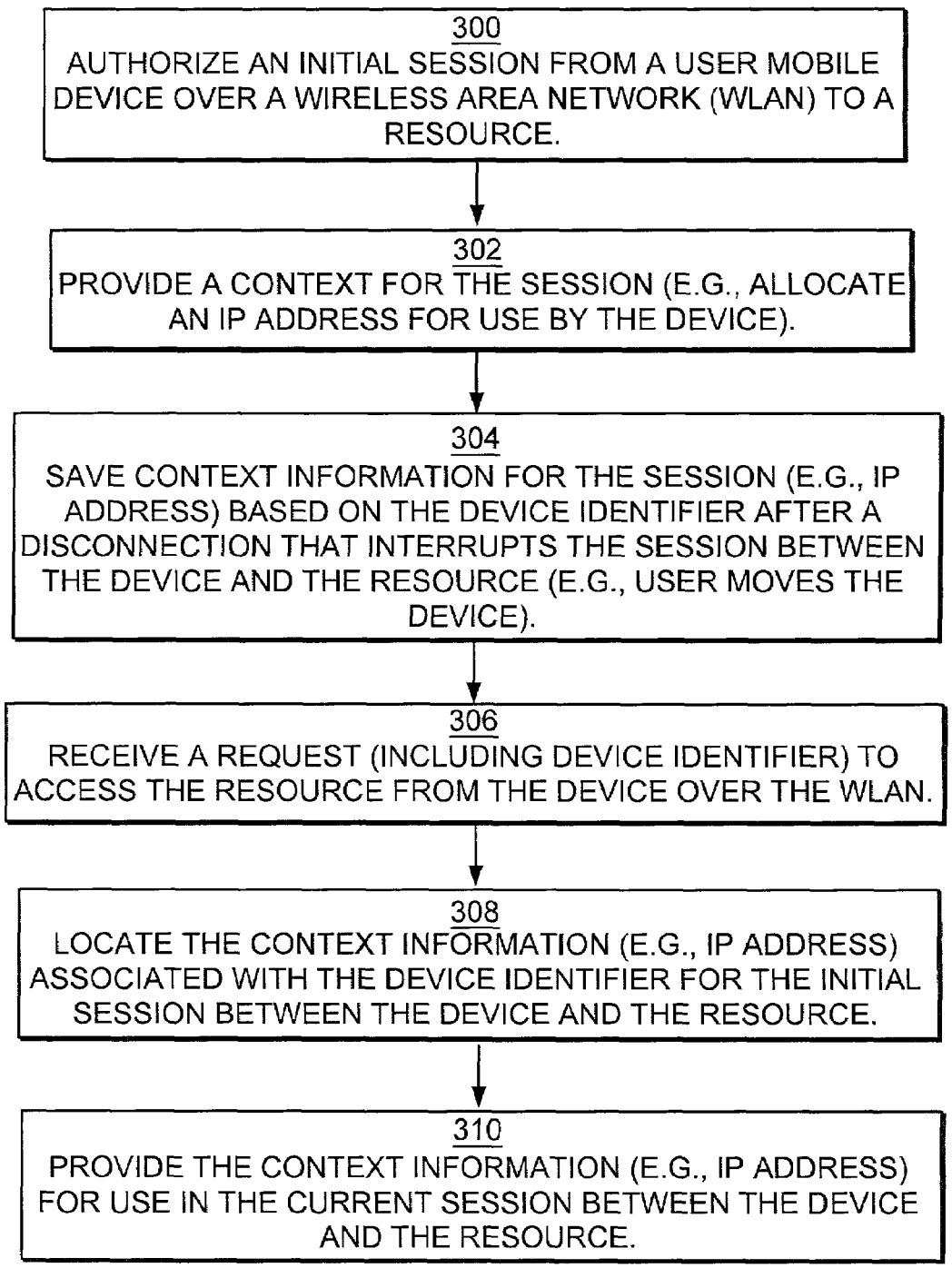
FIG. 7 is a view showing the state, in which a command is given to an assistant by means of input of a speech in a natural language form according to a preferred embodiment of the present invention.
Figure 8:
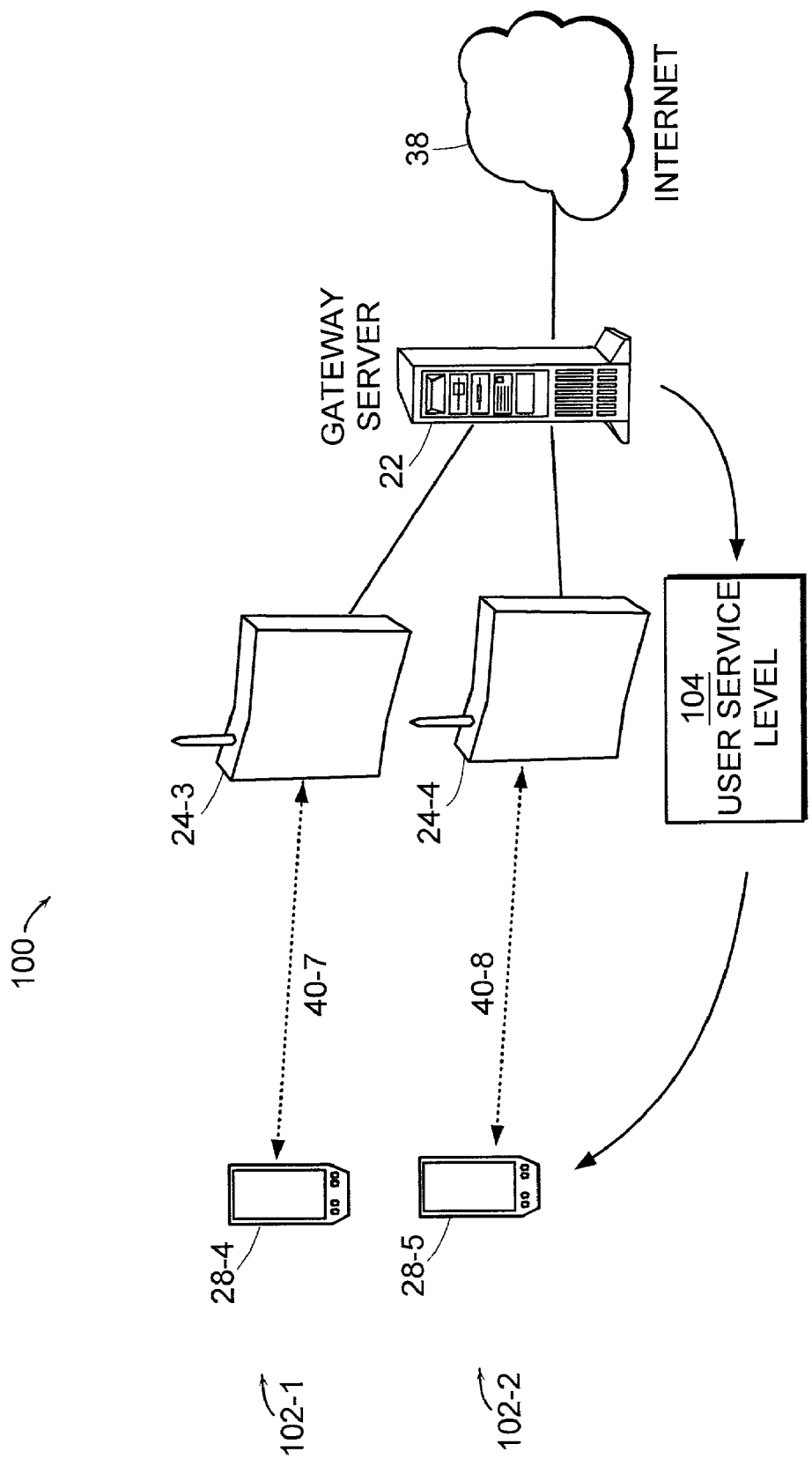
FIG. 8 is a view showing display on the screen, when direct channel select operation is performed through an assistant according to a preferred embodiment of the present invention.
Figure 9:
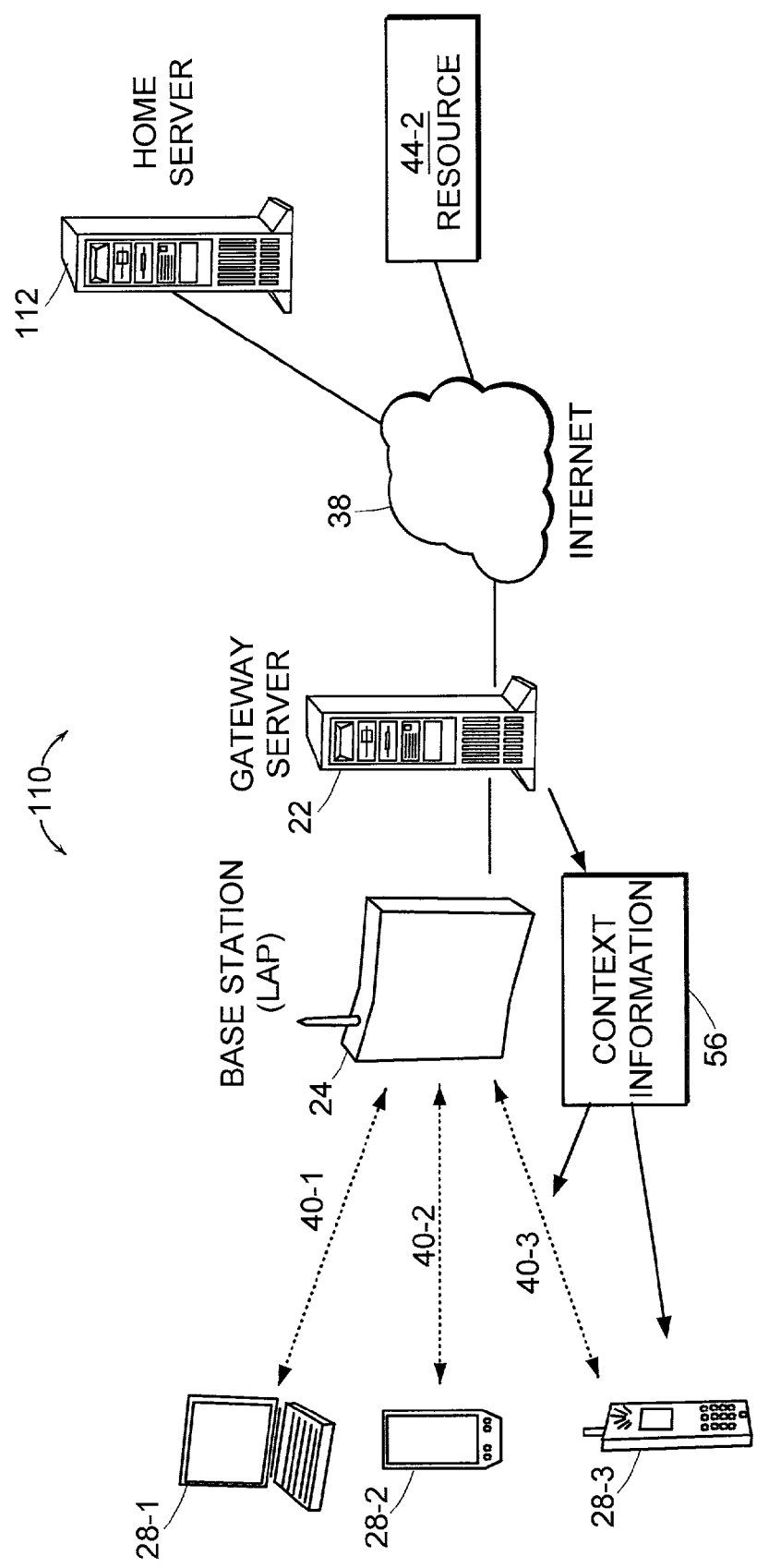
FIG. 9 is a view showing display on the screen, when direct channel select operation is performed through the assistant according to a preferred embodiment of the present invention.

When the system 1 is set to store a performable music content in advance, CDs and a CD player may be provided as the accessible objects in the "Yoshio's" room. In this case, each of scattered CDs (a recording media) has a link to the associated music content. When a question of "What kind of CD is this?" is put to "Yoshio" by the user, the system 1 may make an answer like "This is ○△." through "Yoshio" (Refer to FIG. 7), before starting playback of the music content just as being performed with the use of the CD player displayed on the screen.

Otherwise, in response to a question of "What kind of CD is this" put to "Yoshio" by the user on condition that CDs relating to a hit chart are provided as accessible objects displayed on the floor of the "Yoshio's" room, the system 1 may judge the user to have an interest in musical pieces of the hit chart, before issuing a request for purchase of a CD (on-line shopping) or the like to a predetermined server or downloading the required music content from a predetermined site.

In the embodiment shown in FIG. 6, a poster of an automobile is provided as the accessible object displayed on the wall surface of "Yoshio's" room. The poster provided for the room as described the above refers to an advertising medium or reference of link to the advertising medium. For instance, the system 1 may induce the user to buy or present advertising information to the user by means of speaking to the user through the assistant.

In the embodiment shown in FIG. 6, a globe is also provided as the accessible object displayed in the "Yoshio's" room. An information distribution system developed in a global scale, that is, metaphor called WWW may be provided for the globe. In this case, speaking to "Yoshio" about the terrestrial globe activates a WWW browser (not shown), permitting WWW search.

In the embodiment shown in FIG. 6, a television set/monitor is also provided as the accessible object displayed in the "Yoshio's" room. This television set/monitor has metaphor about the real television monitor 25 and may be set to project a broadcasting program on the last channel (that is, a last selected channel) (in the embodiment shown, a program on "Channel B" as the last selected channel is being projected).

Although not shown in FIG. 6, a mailbox may also be provided as the accessible object displayed in the "Yoshio's" room. The mailbox is metaphor about a tray of accepting electronic mails and may be set to provide a mail display image in the mailbox when accepted mails are stored.

Incidentally, instead of direct access to the display screen showing the "Yoshio's" room after the application of power, the system 1 may be set to permit the user to gain access to "Yoshio's" room in response to an input of a user speech or a remote controller operation.

According to the interactive operation support system 1 in the preferred embodiment of the present invention, applying the assistant called "Yoshio" to the user interface permits the user to feel friendly toward the user interface, and simultaneously makes it possible to meet a demand for complicated commands or to provide an entry into services for the user.

A description will now be given of various kinds of operation support processing according to the interactive operation support system 1, which applies the assistant making reactions based on speech synthesis and 3D-animation to the user interface.

(1) Television power ON/OFF

It is assumed that in the power OFF state of the television (provided that the system 1 is in operation), the user speaks to the assistant in a natural language form, like "Turn on television, Yoshio!".

The input user speech described the above is recognized and then interpreted as a command in the speech recognition unit 13, permitting the turning the power of the television on.

The "Yoshio's" room as shown in FIG. 6, for instance, may be set to appear on the initial screen immediately after the application of power. Or, some kinds of variations of a way to make a "Yoshio's" appearance on the screen may be provided for the user to selectively use an appropriate way for each user or according to the environment of the user or the weather conditions. The following variations of the way for making an assistant's appearance may be given, for instance.

"Yoshio" appears in the "Yoshio's" room with such words as "Hi" and "Jaan".

"Yoshio" is wandering around his room in silence.

"Yoshio" goes into the ambient state delightfully with such words as "Ah" or "Well".

In this stage, a user speech to the effect that "I want to watch television", when further provided to the assistant, is recognized and then interpreted as a command in the speech recognition unit 13. Then, the system 1 makes an affirmative answer such as "OK" and "All right" in a speech output form through "Yoshio", and simultaneously, a program on the last channel (that is, a channel having been selected the last time the power was turned off) is projected in such a way as to be zoomed up. For instance, the system may be set to operate the virtual television set/monitor provided in the "Yoshio's" room in such a way that after the program on the last channel (as described the above) is projected on the virtual television set/monitor, the virtual television monitor screen is gradually zoomed up so as to eventually occupy the whole area of a real monitor screen.

On the other hand, speaking to the assistant in a natural language form, like "Turn off television, Yoshio!" will be enough for the user to turn off the television power.

The input user speech as described the above is recognized and then interpreted as a command in the speech recognition unit 13, permitting disconnection of television power.

For the period between the acceptance of input command and the power turn off, the system 1 may also provide a dramatic presentation for the user in such a way that "Yoshio" appears on the screen, then recedes toward the depth of the screen with his back turned with a somewhat sad look and finally disappears from the screen.

(2) Channel selection

Channel selection is classified into direct channel selection that a specific channel is selected explicitly by the user and zapping channel selection that anything the user likes is selected out of programs being now on the air without explicit selection of a specific channel.

Direct Channel Selection

In direct channel selection, since a desired channel is specified on the bases of input of user speech, operationally easy input of a command system producing en effect close to natural language is preferably required for the user.

According to the preferred embodiment of the present invention, applying the assistant called "Yoshio" to the user interface permits the user to feel friendly toward the user interface and simultaneously makes it possible to meet a demand for complicated commands or to provide an entry into services for the user. A more natural interface may be constructed by means of interaction with the personified assistant, which is set to ask back the user about an uncomprehensible part, when it is not sufficient to interpret the user's intention so far as the first input of the user speech, for instance.

Embodiments of direct channel selection operation are given in the following.

Embodiment 1

User: "Turn on NHK, Yoshio! Channel 1."
"Yoshio": ("Yoshio" appears and asks back.)
   "NHK? Channel 1?"
User: "Yes (an affirmative answer)"
"Yoshio": ("Yoshio" waits for the subsequent input of user speech.)
   "Yoshio" then disappears (in response to that there was no input of user speech for a predetermined period of time).

Embodiment 2

User: "Turn on "Kyoiku", Yoshio! Channel 3."
"Yoshio": ("Yoshio" appears and asks back.)
   "Kyoiku? Channel 3?"
User: "Yes (an affirmative answer)"
"Yoshio": ("Yoshio" waits for the subsequent input of user speech.)
   "Yoshio" then disappears (in response to that there was no input of user speech for a predetermined period of time).

Embodiment 3

User: "Turn on Nihon TV, Yoshio! Channel 4."
"Yoshio": ("Yoshio" appears and asks back.)
   "Nihon TV? Channel 4?"
User: "Yes (an affirmative answer)"
"Yoshio": ("Yoshio" waits for the subsequent input of user speech.)
   "Yoshio" then disappears (in response to that there was no input of user speech for a predetermined period of time).

Embodiment 4

User: "Turn on TBS, Yoshio! Channel 6."
"Yoshio": ("Yoshio" appears and asks back.)
   "TBS? Channel 6?"
User: "Yes (an affirmative answer)"
"Yoshio": ("Yoshio" waits for the subsequent input of user speech.)
   "Yoshio" then disappears (in response to that there was no input of user speech for a predetermined period of time).

Embodiment 5

User: "Turn on Fuji TV, Yoshio! Channel 8."
"Yoshio": ("Yoshio" appears and asks back.)
   "Fuji TV? Channel 8?"
User: "Yes (an affirmative answer)"
"Yoshio": (Yoshio" waits for the subsequent input of user speech.)
   "Yoshio" then disappears (in response to that there was no input of user speech for a predetermined period of time).

Embodiment 6

User: "Turn on TV Asahi, Yoshio! Channel 10."
"Yoshio": ("Yoshio" appears and asks back.)
   "TV Asahi? Channel 10?"
User: "Yes (an affirmative answer)"
"Yoshio": ("Yoshio" waits for the subsequent input of user speech.)
   "Yoshio" then disappears (in response to that there was no input of user speech for a predetermined period of time).

Embodiment 7

User: "Turn on TV Tokyo, Yoshio! Channel 12."
"Yoshio": ("Yoshio" appears and asks back.)
   "TV Tokyo? Channel 12?"
User: "Yes (an affirmative answer)."
"Yoshio": ("Yoshio" waits for the subsequent input of user speech.)
   "Yoshio" then disappears (in response to that there was no input of user speech for a predetermined period of time).

FIG. 8 to FIG. 11 illustrate display of a screen, when direct channel select operation is performed through the assistant.

First, it is assumed that the user of the interactive operation support system 1 is watching a baseball-game relay program now being on the air, as a viewer of the television. (Refer to FIG. 8). While the above program is being projected, the user may put direct channel selection into practice through the assistant by speaking explicitly to the assistant about a desired channel name, like "Turn on Channel 8, Yoshio!", "Turn on Fuji TV, Yoshio!" or "Fuji TV".

The input user speech is recognized and then interpreted as a command in the speech recognition unit 13. Then, "Yoshio" as the assistant with a panel (or a window) displaying the program currently on the air on the specified channel in one's hand appears on the monitor screen (Refer to FIG. 9). In this state, the destination channel is placed in the temporarily selected state yet.

Then, the assistant makes a request for making sure of the user command by means of output of a speech, like "This one?". When an affirmative answer such as "Yes" is given from the user side in response to the request, the destination channel is changed from the temporarily selected state to the definitely selected state.

Figure 10:
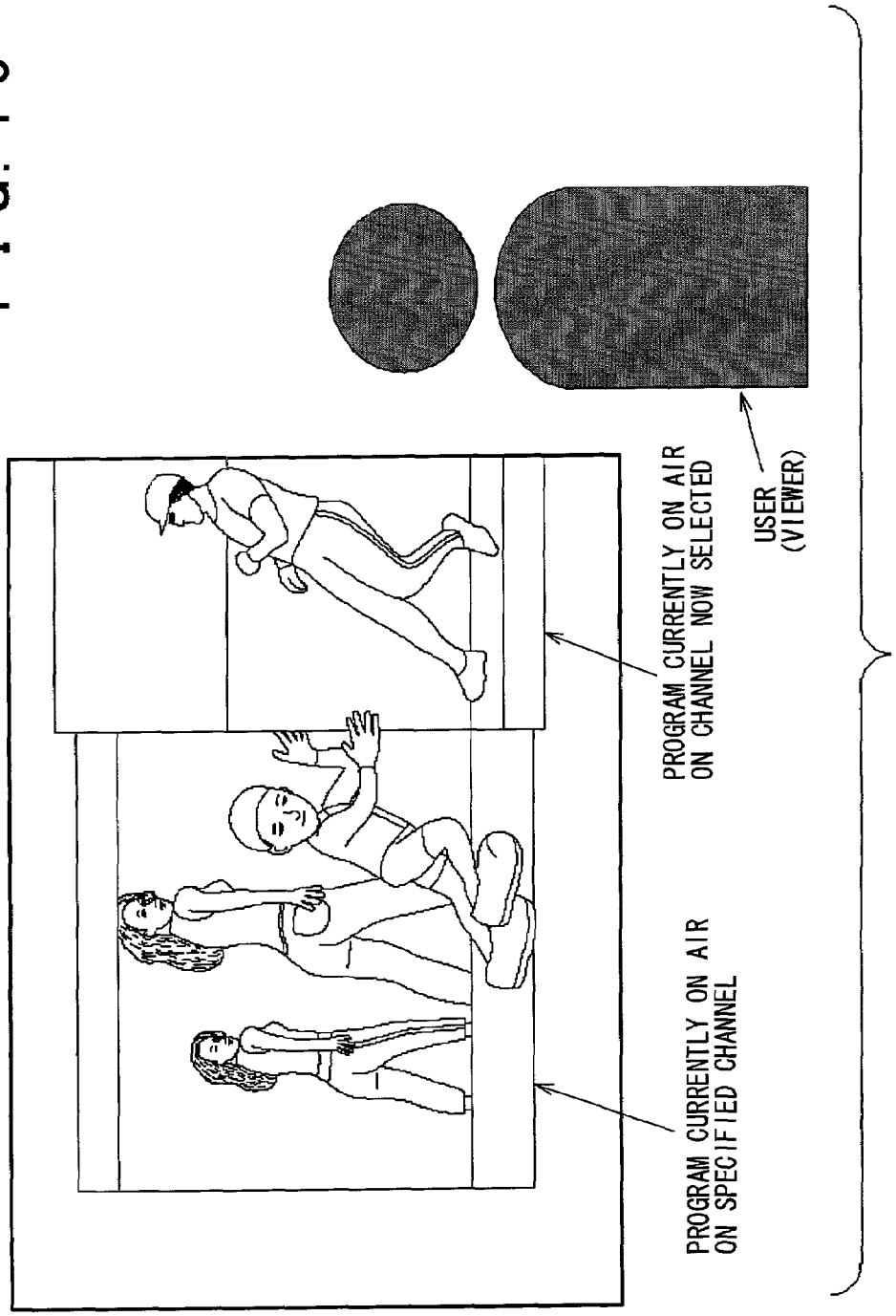
FIG. 10 is a view showing display on the screen, when direct channel select operation is performed through the assistant according to a preferred embodiment of the present invention.
Figure 11:
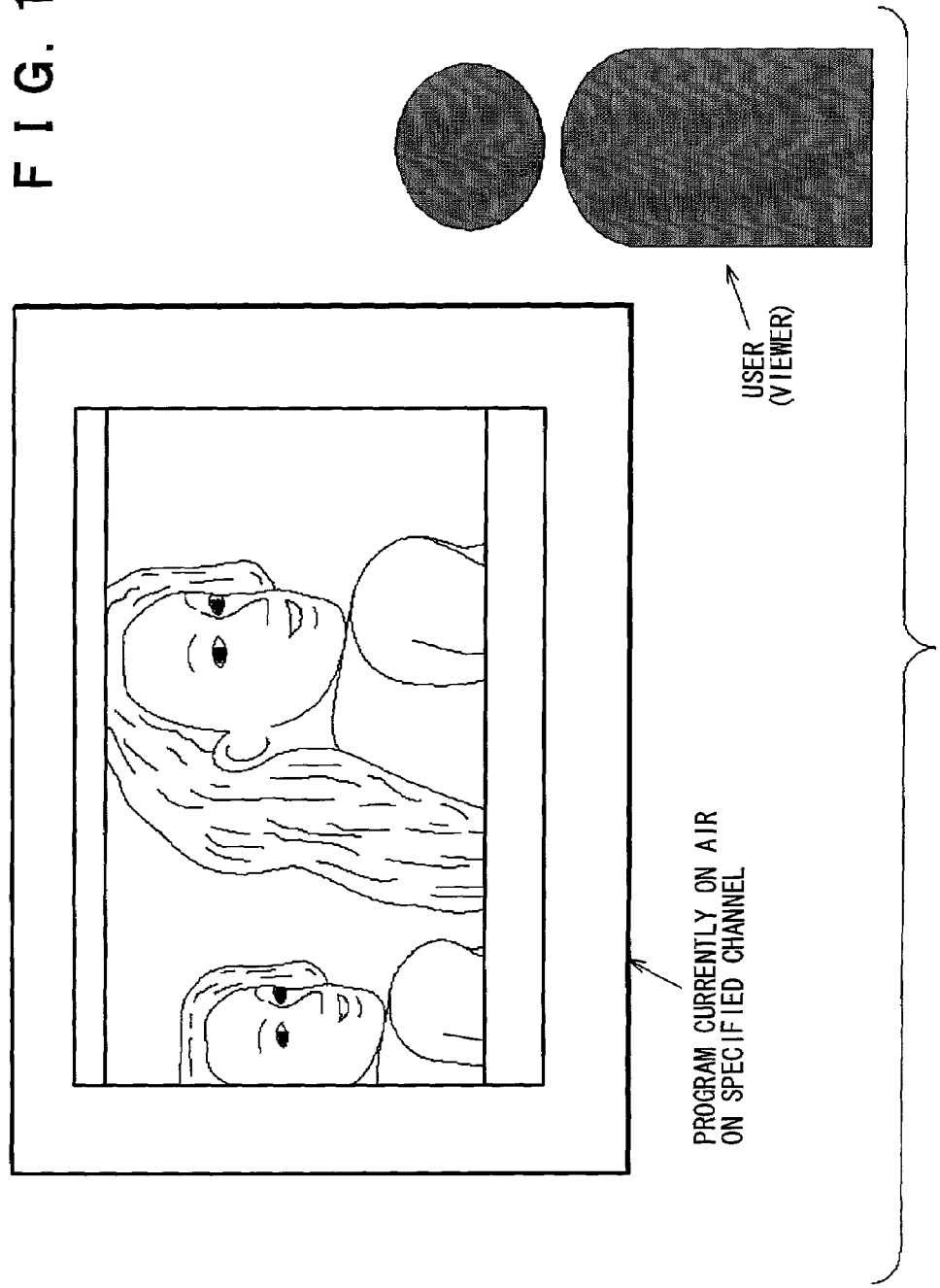
FIG. 11 is a view showing display on the screen, when direct channel select operation is performed through the assistant according to a preferred embodiment of the present invention.

In response to that the desired channel is definitely selected, the screen is scrolled as if the assistant pushes out a panel displaying the program on the source channel (i.e., the baseball-game relay program in this embodiment) to the right in the drawing, so that a panel displaying a program currently on the air on the destination channel (Channel 8, in this embodiment) gradually comes out from behind the previous panel (Refer to FIGS. 10 and 11.).

It is to be understood that a mode of clearing away the display panel of the program on the source channel is not particularly limited to scrolling of the screen in the lateral direction as shown in FIG. 10. For instance, the screen may be scrolled as if "Yoshio" as the assistant pushes the display panel of the program on the source channel downward or upward.

FIGS. 8 to 11 illustrate the direct channel selection in a visually easy style by means of displaying the programs respectively being on the air on the source channel and the destination channel simultaneously on the single monitor screen. A multiple-decoding function may be applied to perform simultaneous display of two or more broadcasting programs.

Incidentally, mapping logo-type and advertising information into the clothes or the like of the assistant making an appearance on the display screen for direct channel selection has an effect on advertising. As a matter of course,the clothes of the assistant may be changed according to the season.

Figure 12:
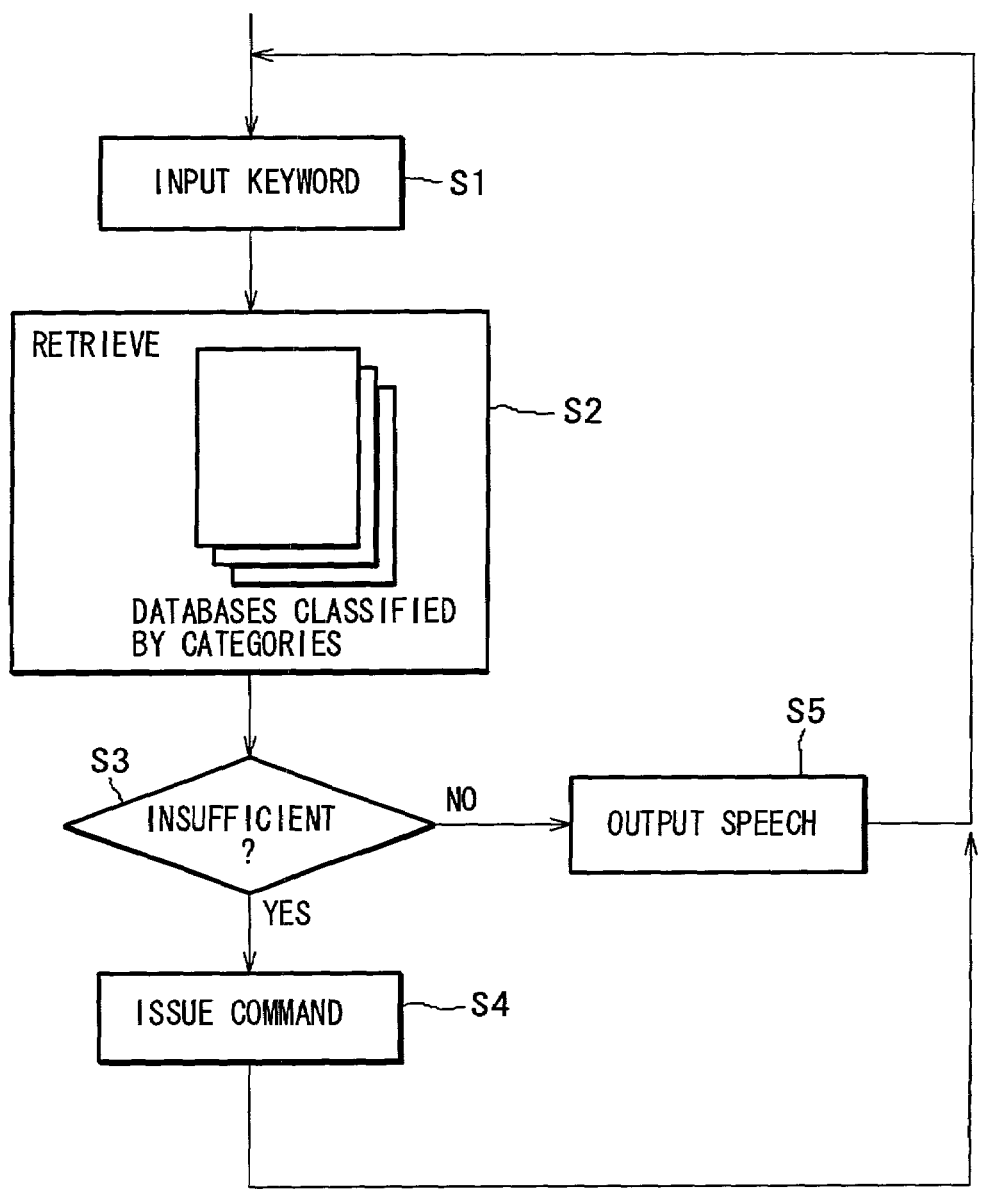
FIG. 12 is a flow chart showing the procedure of implementing a user interface based on a direct command form according to a preferred embodiment of the present invention.

FIG. 12 is a flow chart showing the procedure of implementing the user interface based on a direct command form. According to the above procedure, the interactive operation support system 1 may implement a more natural user interface by means of interaction with the personified assistant, which is set to ask back the user about a part, which is difficult to understand so far as the first input of the user speech. A description will now be given of the procedure with reference to the flow chart of FIG. 12.

Firstly, the user speech inputted through the microphone 22 is recognized in the speech recognition unit 13 to extract an input keyword, in Step S1.

Subsequently, by retrieving the databases provided for each category, a user command corresponding to the input user speech is specified in Step S2. The databases classified by categories are stored in the storage device 12, for instance, and the contents thereof may be updated via the network.

When it is not sufficient to specify the user command so far as the input of the user speech up to now, the decision for block S3 is selected as "NO" in order to asking back the user about insufficient information by outputting a speech through the mediation of the assistant, in Step S5. Then, the processing is returned to Step S1 ir order to wait for the subsequent input of a user speech.

On the other hand, when the user command is specified by the input of the user speech up to now, the system issues a required command to the equipment corresponding to the user command (the television monitor 25 and the video deck 26 or the like, for instance), in Step S4. Then, the processing is returned to Step S1 in order to wait for the subsequent input of a user speech.

Zapping Channel Selection

When zapping channel selection is required, the user puts input of a command, like "Show me programs on all the channels, Yoshio!" or "What program is showing now, Yoshio?" to the assistant into practice without selecting a specific channel.

In response to the user command on the speech base as described the above, the assistant, that is, "Yoshio" makes an appearance on the monitor screen to display a multi-view screen permitting the user to watch all the programs currently on the air in one view.

Figure 13:
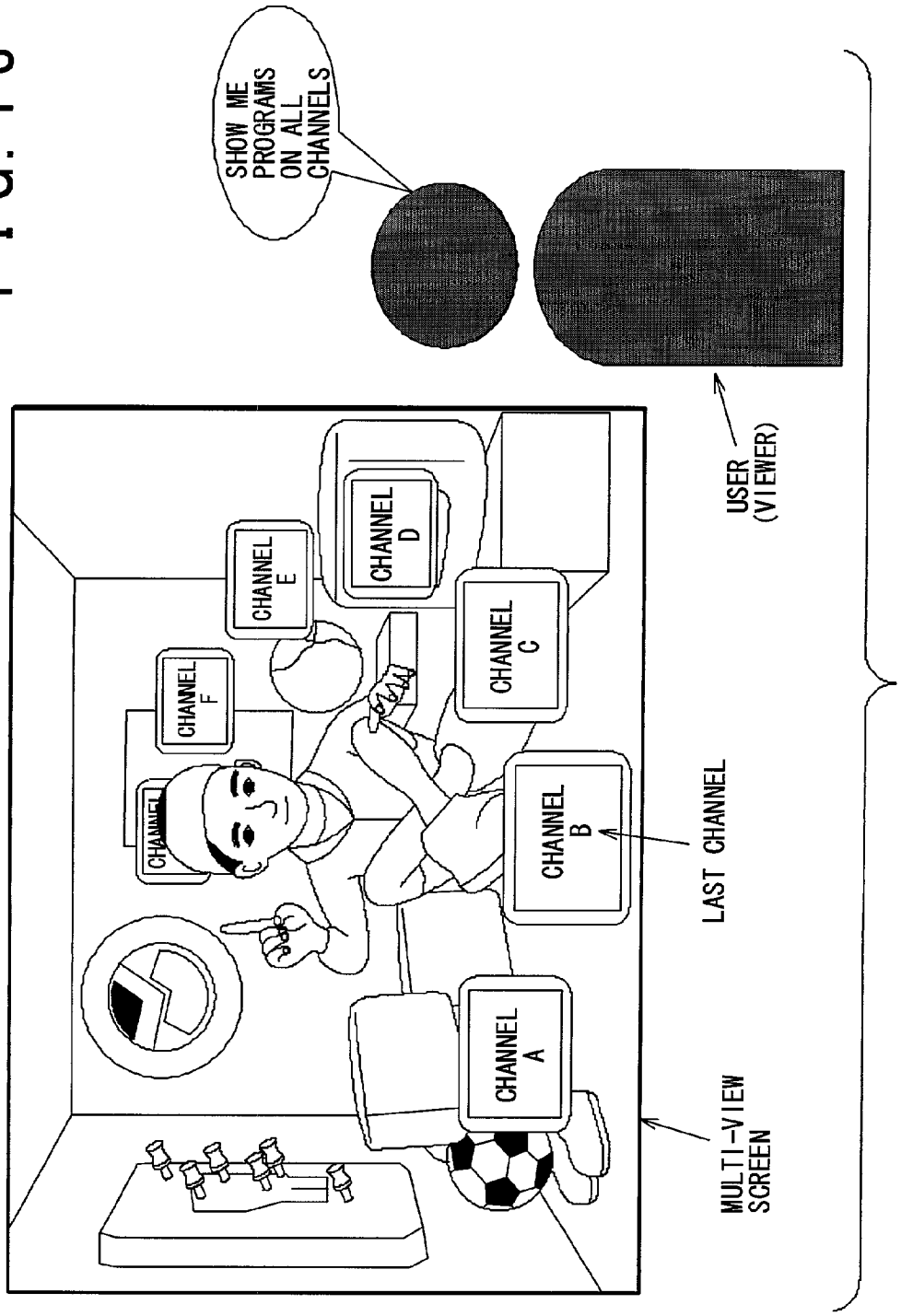
FIG. 13 is a view showing a multi-view screen, which permits the user to watch the whole programs currently on air on the respective channels in one view according to a preferred embodiment of the present invention.

FIG. 13 shows the multi-view screen, which permits the user to watch the programs currently on the air on the respective channels in one view. In the embodiment shown in FIG. 13, panels displaying the programs currently on the air on the respective channels are placed in the shape of a ring in the room of "Yoshio" as the assistant so as to enclose "Yoshio". Immediately after change to the multi-view screen, the leading panel may be set to display the program currently on the air on the last channel (that is, the last selected channel), for instance.

On the multi-view screen as described in the above, the user can give a command by speaking closely to a natural language form to "Yoshio" as the assistant.

Figure 14:
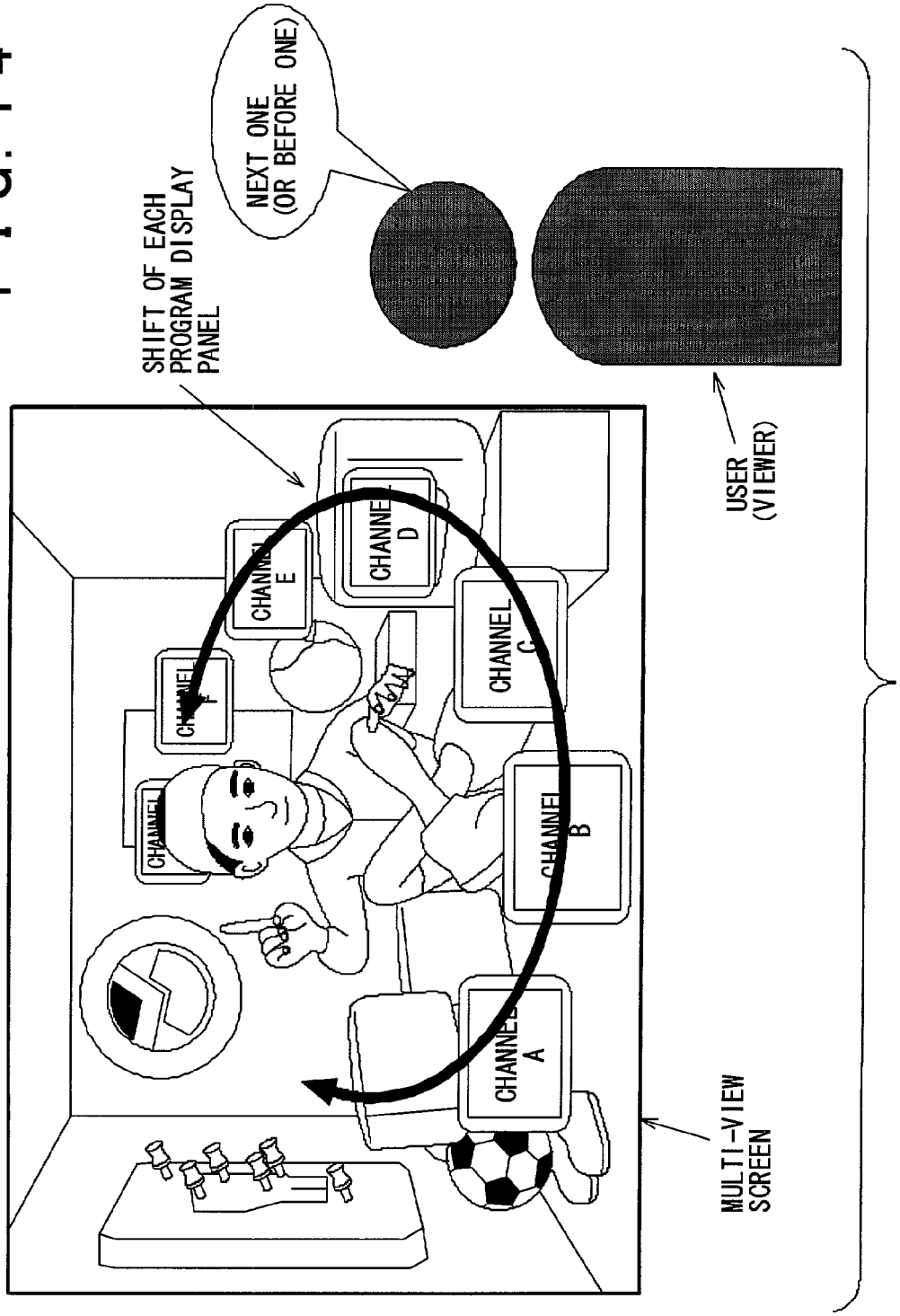
FIG. 14 is a view showing the state, in which each channel display panel on the multi-view screen is shifted in such a way as to revolve on a ring under a channel change command from the user according to a preferred embodiment of the present invention.

The program display panels are set to be shifted in sequence on the ring in such away that in response to a command, which specifies the channel, like "Turn on Channel 12", "Channel 12", "Turn on TV Tokyo" and "TV Tokyo", the display panel of the program on the specified channel may come to the forefront of the monitor screen. Further, in response to a command like "one before (or previous)" and "next one (next)", the program display panels may be shifted forward or backward one by one over the ring (Refer to FIG. 14).

Figure 15:
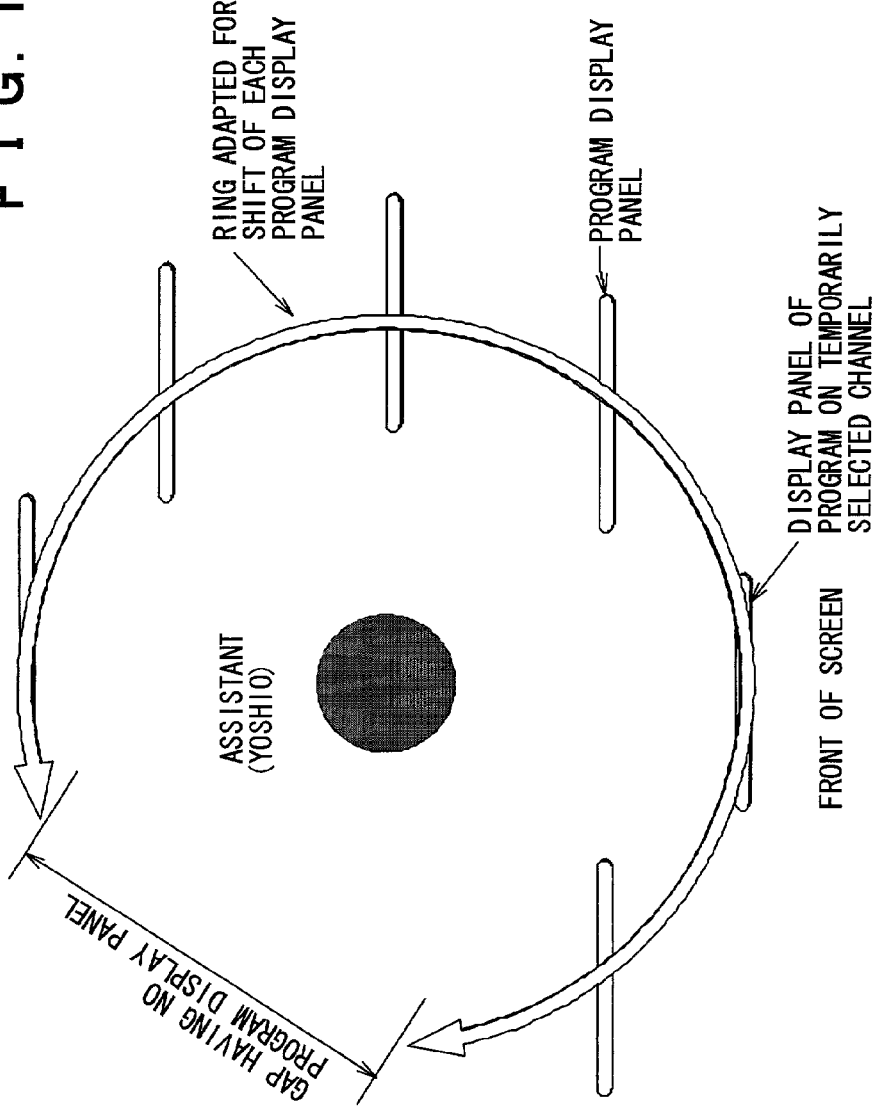
FIG. 15 is a virtual view showing the multi-view screen when viewed from the above according to a preferred embodiment of the present invention.

FIG. 15 shows a virtual view from the above showing the state of the multi-view screen. As shown in FIG. 15, the program display panels are placed at substantially uniform intervals along the ring, which is adapted for shift of the program display panels, in the "Yoshio's" room. The display panel of the program on the channel temporarily selected is placed at the forefront of the ring.

As shown in FIG. 15, a part of the ring has a gap with no program display panels. Since the gap is shifted in sequence together with the program display panels along the ring according to the channel shift command from the user, the user may grasp visually the shift of the channels, while following up the shift position of the gap with one's eyes.

Figure 16:
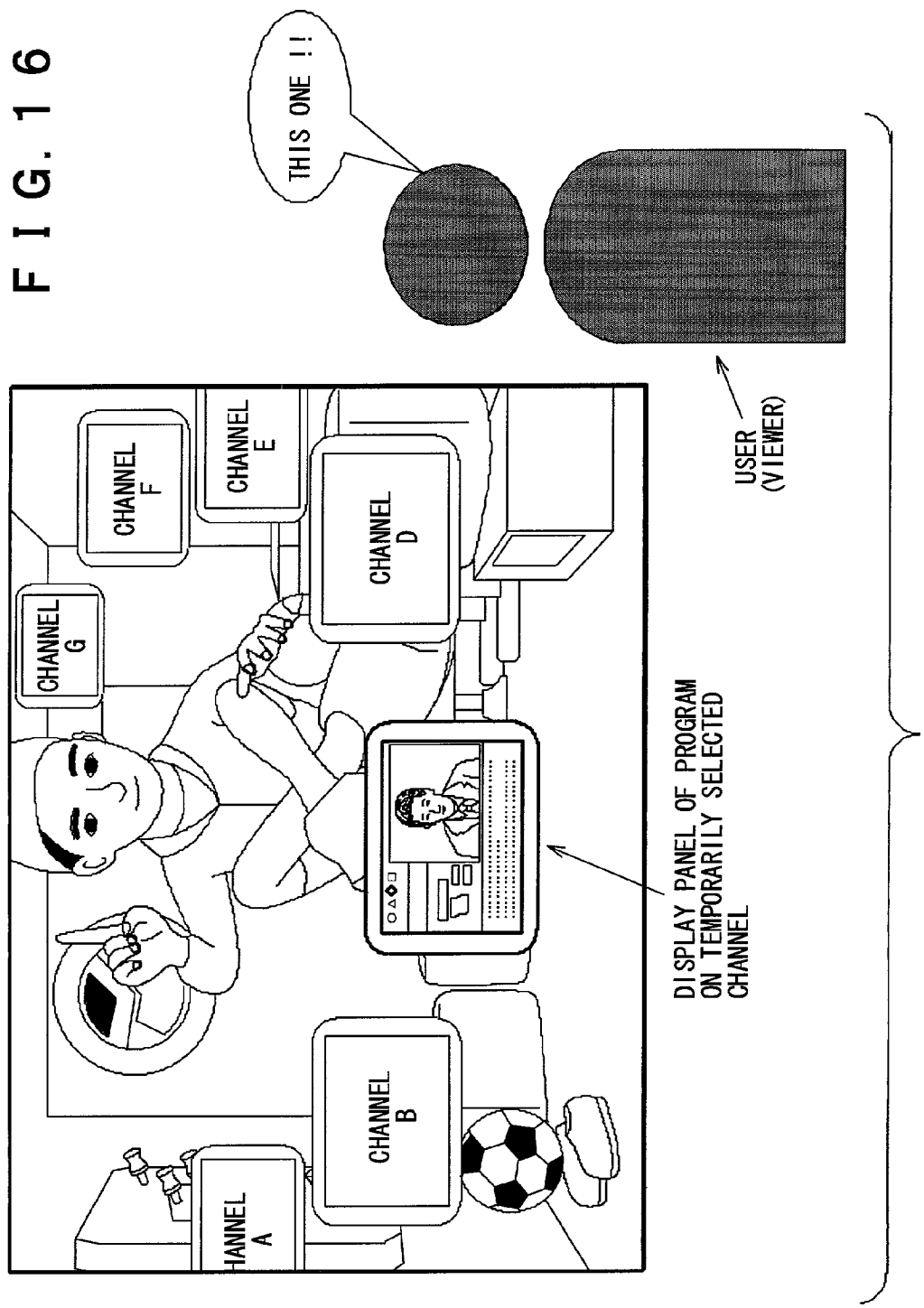
FIG. 16 is a view showing the state, in which a channel C is highlighted after being temporarily selected according to a preferred embodiment of the present invention.

After the lapse of a predetermined period of time (several seconds, for instance) with a certain program display panel staying at the forefront of the screen, the corresponding channel goes into the temporarily selected state, and the display panel of the program on the temporarily selected channel is highlighted. FIG. 16 shows a channel C, which is highlighted after being put in the temporarily selected state.

When the display panel of the program on a desired channel comes to the forefront of the screen, the user may definitely select the temporarily selected channel by emphatically speaking to the assistant about the selected channel, like "That", "That one", "Show me that" and "Show me this one".

After the desired channel is definitely selected, the selected channel is tuned, and simultaneously, the display panel of the program on the selected channel is zoomed up gradually so as to occupy the whole monitor screen in the end.

Figure 17:
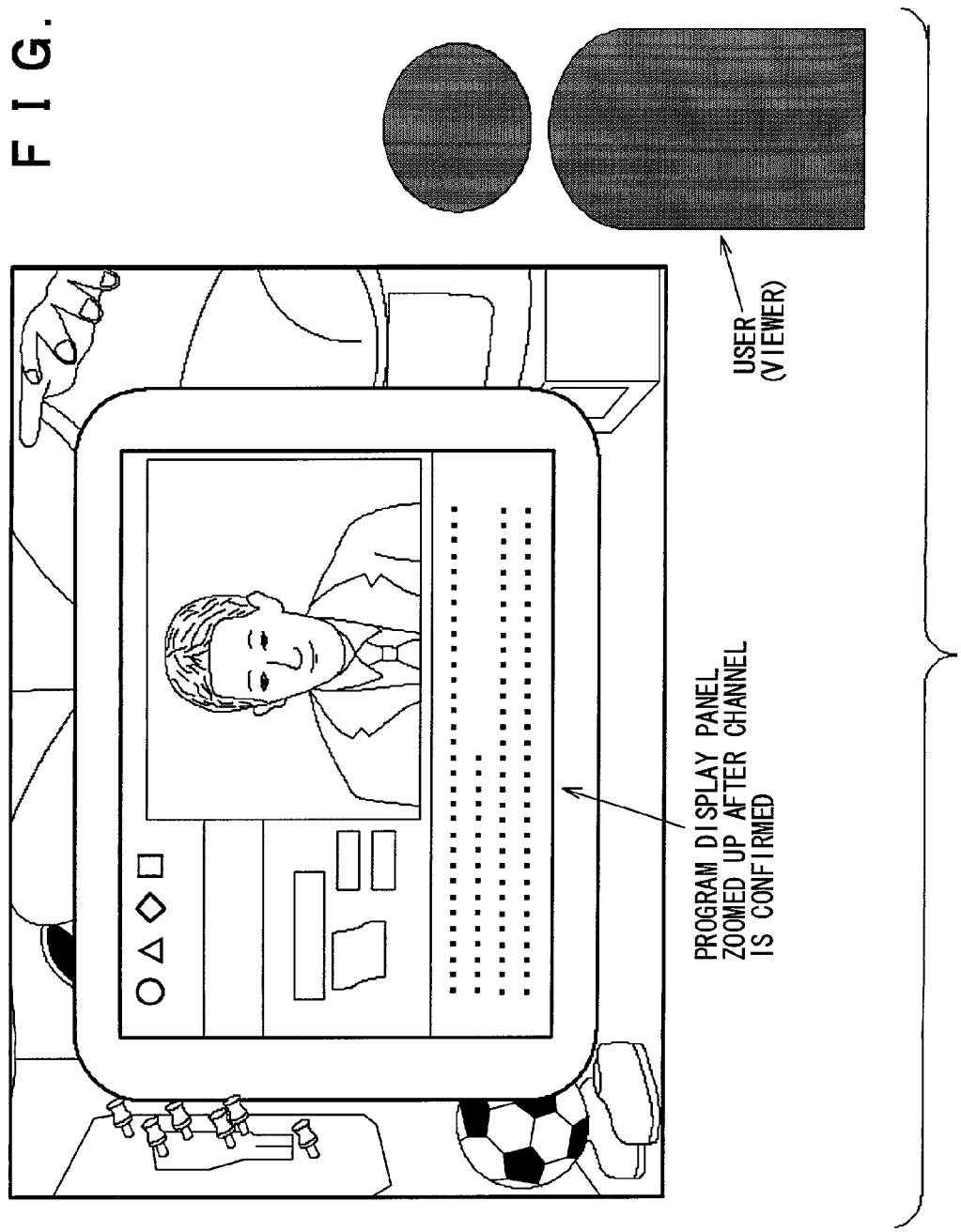
FIG. 17 is a view showing the state, in which after transition of the channel C from the temporarily selected state to the definitely selected state, a selected program display panel is gradually zoomed up according to a preferred embodiment of the present invention.

FIG. 17 shows the state, in which after transition of channel C from the temporarily selected state to the definitely selected state, the display panel of the program on the definitely selected channel is gradually zoomed up.

FIG. 13 illustrates zapping channel selection in a visually easy style on the multi-view screen by means of displaying the programs currently on the air on the respective channels simultaneously on the single monitor screen. A multiple-decoding function may be applied to perform simultaneous display of two or more broadcasting programs.

Incidentally, each program display panel appearing on the multi-view screen is not always necessary to display the program currently on the air. For instance, display of reproduced program contents taken out from recorded data stored in the video deck or other storage device is also applicable.

(3) Recording

The interactive operation support system 1 according to the preferred embodiment of the present invention is connected to one or more video decks 23 as the external equipment and therefore, may specify the video decks as the destination of recording of the received broadcasting program. Also, the internal storage device 12 configured by a hard disc drive may also be specified as the destination of recording.

The interactive operation support system 1 according to the preferred embodiment of the present invention may provide a more natural user interface by means of interaction on a speech base through the mediation of the personified assistant. Thus, the user may give a desired program recording command by speaking to the assistant in a nearly natural language form without depending on conventional equipment operations such as the remote controller or the like.

FIG. 18 shows a state in which a program recording command on a speech basis is given to the assistant.

Figure 18A:
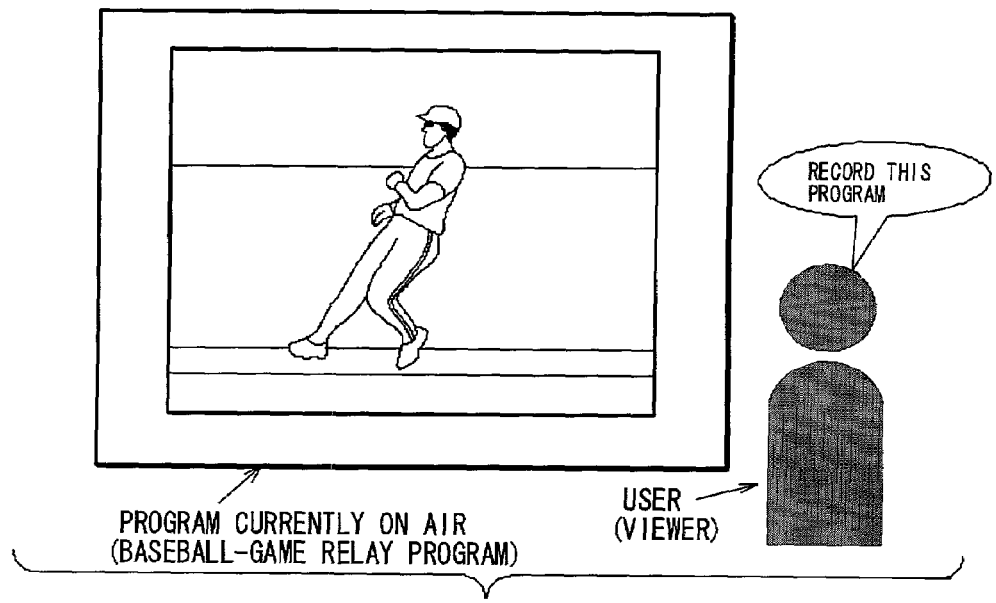
FIGS. 18A and 18B are views showing the state, in which a program recording command is given to the assistant by means of input of a speech according to a preferred embodiment of the present invention.

As shown in FIG. 18A, it is assumed that the user is currently watching the baseball-game relay program, for instance. At any time when making a request for recording the program currently on the air as described in the above, the user can give a command by speaking to the assistant, like "Record this program", or "Record this", etc.

The inputted user speech is recognized and then interpreted as a command in the speech recognition unit 13, and as a result, the system 1 specifies the input command as a request for recording the program currently on the air.

Then, the system 1 searches a free area in the externally connected video deck 23 or the built-in hard disc. After making sure of the destination of recording, the system 1 gives an affirmative answer of "Yes" or the like to the user through the assistant by means of speech synthesis.

Figure 18B:
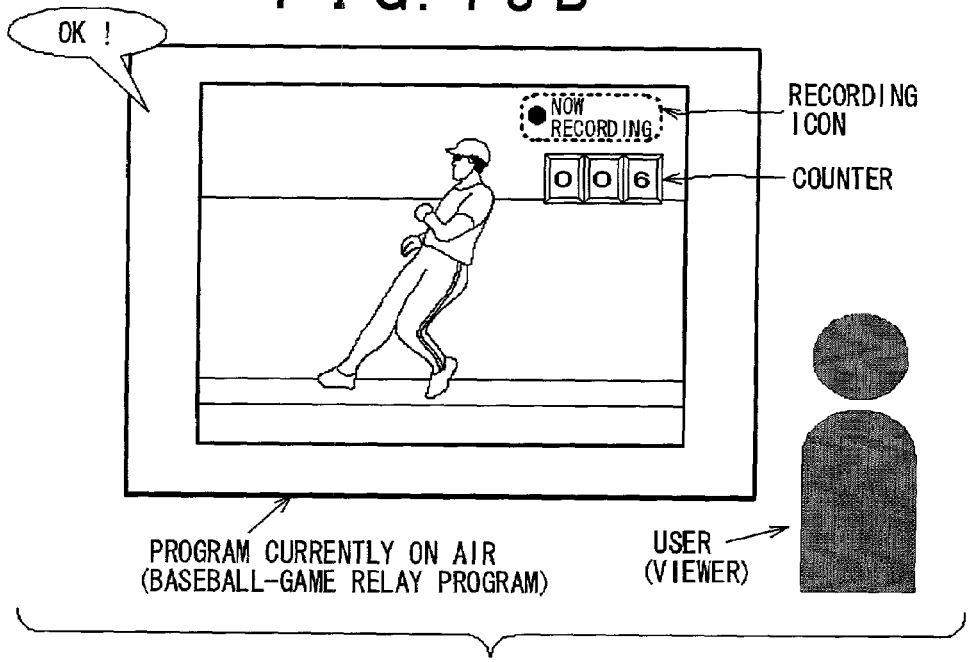

As shown in FIG. 18B, a recording icon representing that a program is now recording is displayed on the monitor screen, together with a counter representing a recording time.

(4) Recording of Programs Scheduled to Broadcast

The interactive operation support system 1 also permits recording of programs scheduled to broadcast, that is, reserved recording, in addition to the programs currently on the air.

The interactive operation support system 1 according to the preferred embodiment of the present invention may provide a more natural user interface by means of interaction on a speech basis through the mediation of a personified assistant. Thus, the user may give a recording reservation command by speaking to the assistant in a nearly natural language form without depending on the remote controller or the like conventional equipment operations.

FIG. 23 and FIG. 24 illustrate display of a screen, when recording reservation is set through the assistant.

It is assumed that the user makes input of speech suitable for deriving information relating to scheduled programs, such as "What program is starting from now? Yoshio!", "What comes next? Yoshio!", "Show me EPG (Electronic Programming Guide), Yoshio!" or "What program is starting from 8:00? Yoshio!" to the system through the assistant.

The input user speech is recognized and then interpreted as a command in the speech recognition unit 13. Then, "Yoshio" as the assistant provides display of a list of programs scheduled to broadcast in the form of a matrix (Refer to FIG. 23). The EPG distributed as data for data broadcast, for instance, may be used to generate the list of programs.

The assistant may also be set to read up the list of programs after being displayed on the monitor screen as shown in FIG. 23.

The user may determine easily a desired program to record from the programs displayed in the form of a list. Then, the user gives a command to the system by speaking to "Yoshio" as the assistant in the natural language form, like "Record a program scheduled to be on the air from 8:00 on Channel D".

The input user speech is recognized and then interpreted as a command in the speech recognition unit 13. Then, the selected channel D is highlighted. "Yoshio" as the assistant outputs a speech suitable for urging the user to make sure of the selected channel, like "Is this one?", while pointing at a column of channel C.

When an affirmative answer is given from the user in response to the request to make sure of or confirm the selected channel, reserved recording is set. In this case, the system 1 may be set not only to highlight the column of the specified program for recording but also to display a recording reserve icon (not shown).

(5) Reproduction of Recorded Program Content

The interactive operation support system 1 according to the embodiment of the present invention may provide a more natural user interface by means of interaction on a speech basis through the mediation of the personified assistant. Thus, the user may give not only a desired program recording command, but also a recorded program reproduction command by speaking to the assistant in the natural language form without depending on the remote controller or the like conventional equipment operations.

When a random-accessible storage device such as a hard disc device is applied to the destination of program recording, an arbitrary recorded program content may be taken out before start of reproduction.

FIG. 19 to FIG. 22 illustrate display of a screen, when reproduction of a recorded program content is performed through the assistant.

Firstly, it is assumed that the user of the interactive operation support system 1 is watching a musical program currently on the air as a viewer of the television (Refer to FIG. 19). While the program is being on the air, the user may give a reproduction command to the system by explicitly speaking to the assistant about reproduction of a recorded program content, like "Reproduce a recorded program" or "Reproduce a recorded video".

The input user speech is recognized and then interpreted as a command in the speech recognition unit 13. "Yoshio" as the assistant provides a display image of a binder having the contents (thumbnail) of the recorded programs (Refer to FIG. 20).

The user may specify a recorded program content desired to reproduce with the thumbnail the recorded program contents displayed in the binder form as a key. Then, reading up the desired program content to reproduce, like "Channel G" is enough.

The input user speech is recognized and then interpreted as a command in the speech recognition unit 13. Then, the thumbnail of a target recorded program content is highlighted, while being zoomed up (Refer to FIG. 21).

The user may make sure of the target recorded program content for reproduction with zoomed-up thumbnail display as a key. Then, the user may give a reproduction start command by speaking to the assistant in the natural language form like "This one" and "That one" to the system through "Yoshio". The input user speech is recognized and then interpreted as a command in the speech recognition unit 13. A speech representing an affirmative answer such as "Yes" is produced from the system through "Yoshio" (Refer to FIG. 22).

Then, the thumbnail of the target recorded program content for reproduction is zoomed up so as to occupy the whole monitor screen, and reproduction of the target recorded program content is started.

Incidentally, the system 1 may also be set to specify reproduction of a recorded program content on a daily basis, in addition to the above recorded program selecting mode. A scenario in such case is given briefly in the following.

Figure 26:
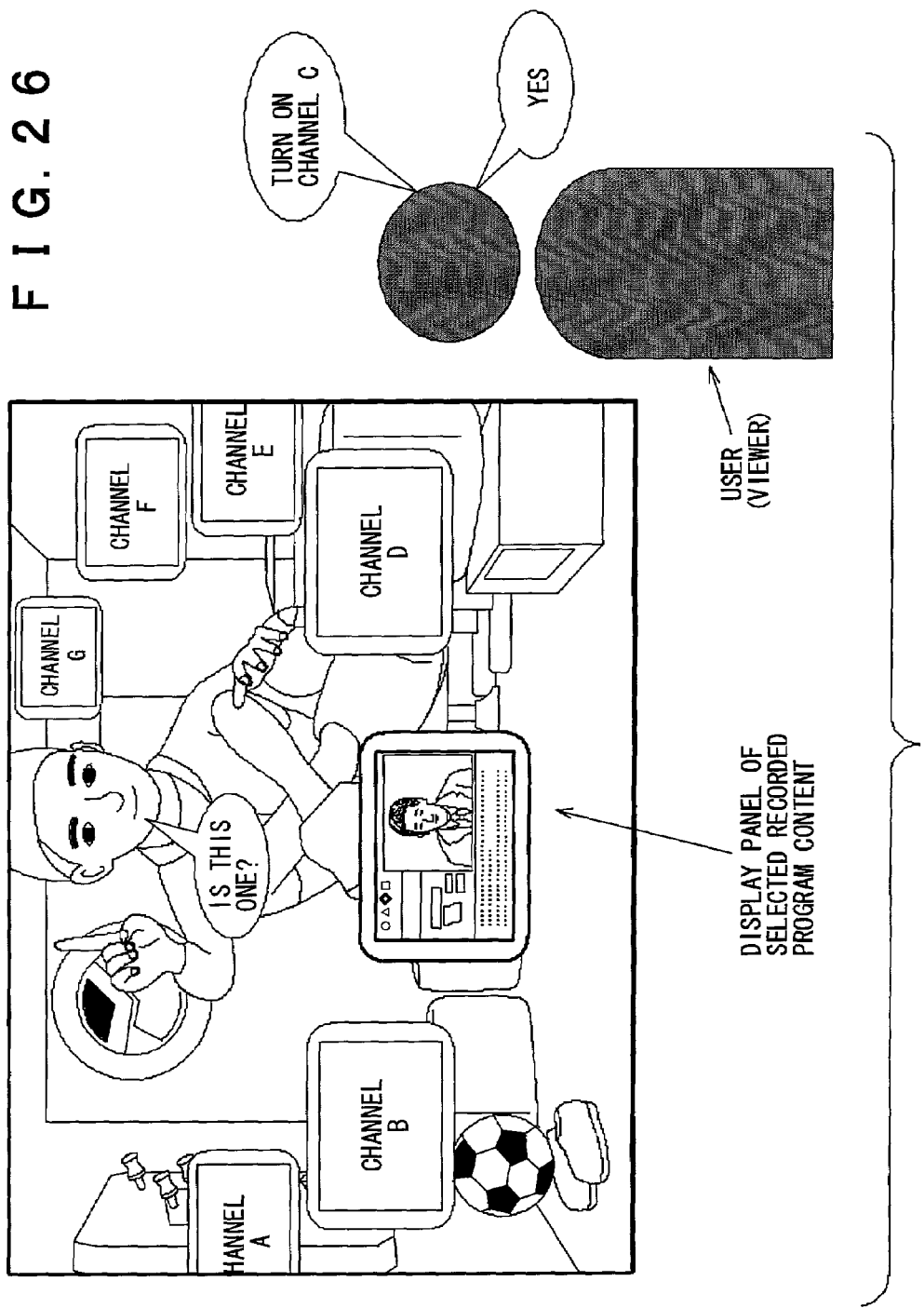
FIG. 26 is a view showing display on the screen, when reproduction of a recorded program content is specified on a daily basis through the assistant according to a preferred embodiment of the present invention.

User: "Reproduce program contents having been recorded yesterday, Yoshio."
   The display panels of the programs contents having been recorded yesterday are revolving around "Yoshio" (Refer to FIG. 25).
User: "Reproduce a program content on Channel C."
"Yoshio": "Is this one?"
User: "Yes" (Refer to FIG. 26).
   The specified program display panel is gradually zoomed up so as to occupy the whole screen, and reproduction of the specified program content is started (not shown).

(6) Mail

As shown in FIG. 1, the interactive operation support system 1 according to the embodiment of the present invention is connected to the external network via the communication interface 18, and therefore, permits exchange of mails by making use of the mail server on the network.

The interactive operation support system 1 according to the embodiment of the present invention also permits exchange of mails by means of interaction on a speech base through the medium of the personified assistant. The acceptance of mails through support by the assistant on a speech base will be described in the following.

Figure 27:
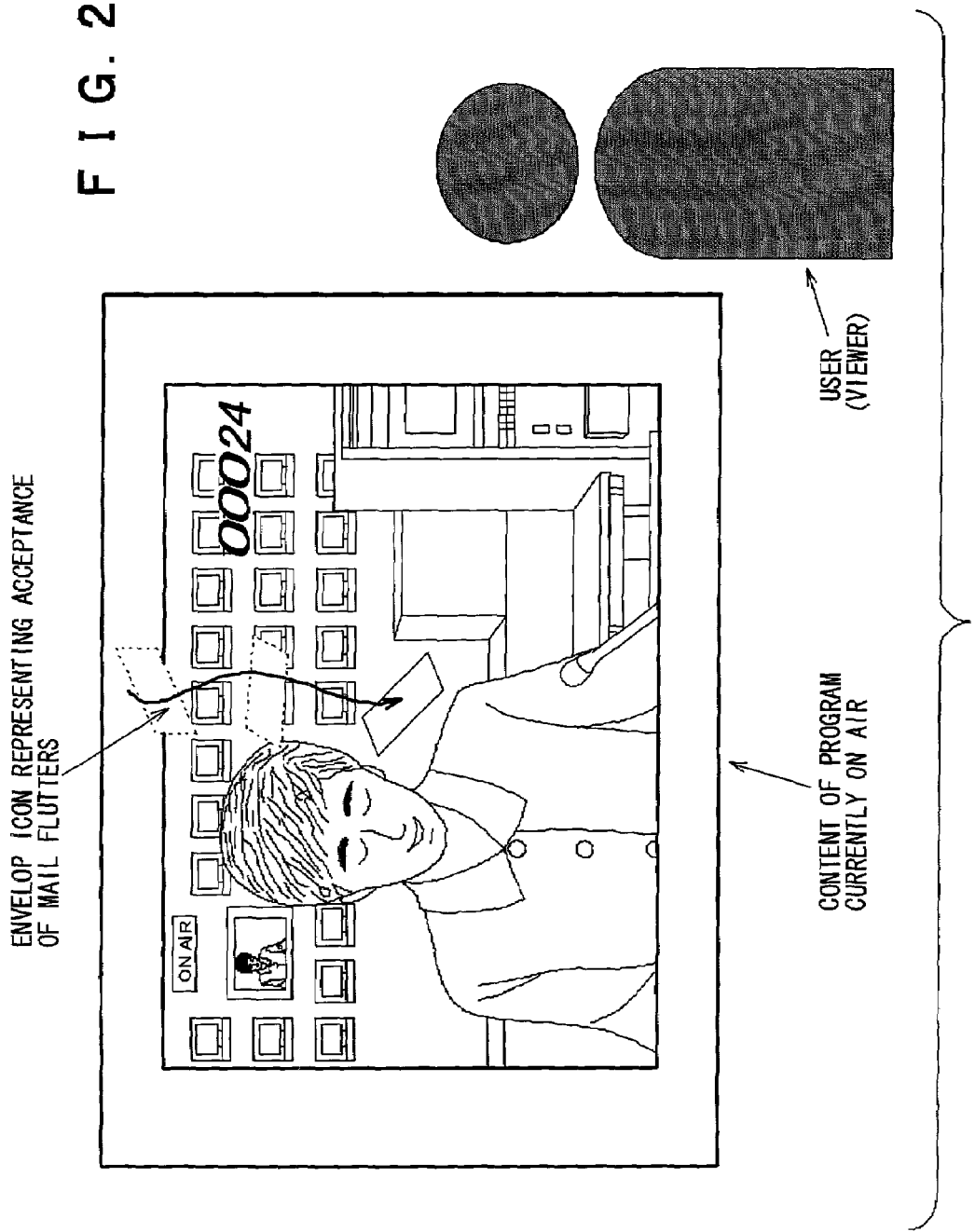
FIG. 27 is a view showing interaction carried on through the medium of the assistant when a mail is accepted.

Upon acceptance of mails while the program is being now on the air, the system 1 displays, on the program content, an envelop icon informing the user that the mail is accepted in such a way as to flutter down through the program content (Refer to FIG. 27).

Figure 28:
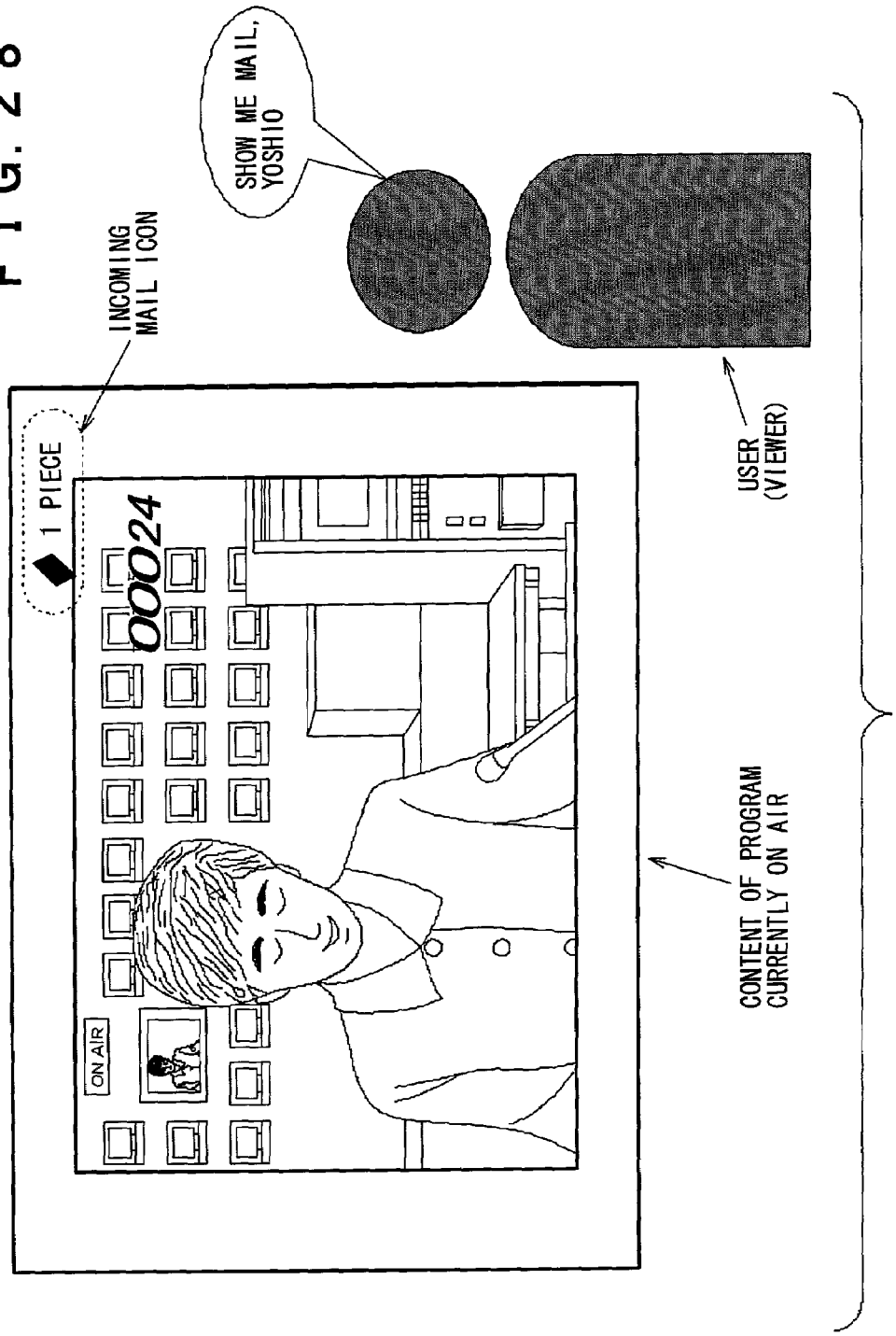
FIG. 28 is a view showing interaction carried on through the medium of the assistant when a mail is accepted according to a preferred embodiment of the present invention.
Figure 29:
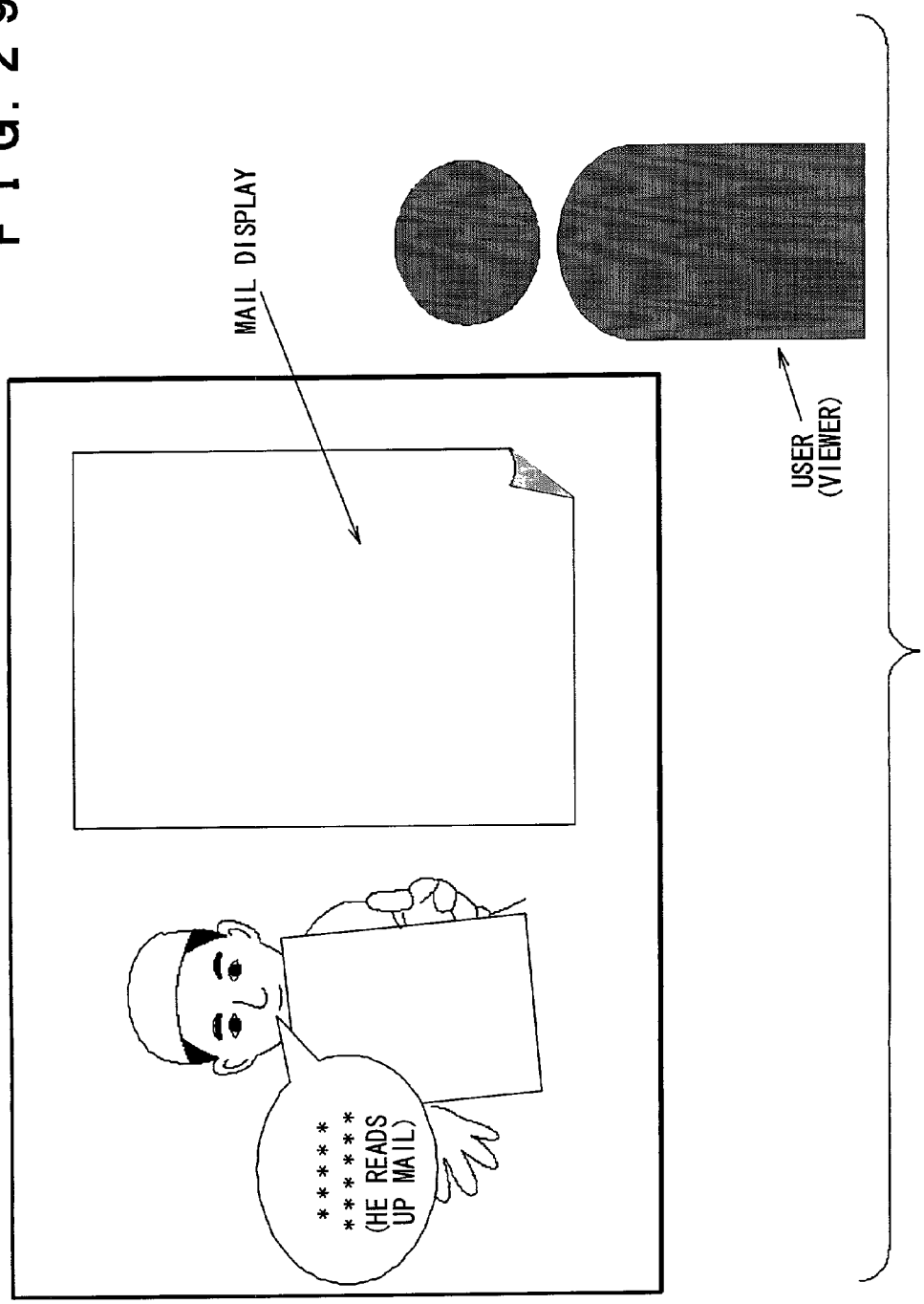
FIG. 29 is a view showing interaction carried on through the medium of the assistant when a mail is accepted according to a preferred embodiment of the present invention.

Then, the envelop icon, when reaching the lower end of the monitor screen, disappears, while an incoming mail icon representing how many mails are accepted appears on the top right-hand side of the screen. In the embodiment shown in FIG. 28, there is shown a case where a piece of mail is accepted.

The user may give a command to open a mailbox by speaking to the assistant in the natural language form like "Show me a mail, Yoshio!", for instance. That is, the input user speech is recognized and then interpreted as a command in the speech recognition unit 13. Then, "Yoshio" as the assistant makes motions to open the mail. The assistant may also be set to read up the text described in the mail after interpreting and speech synthesis.

Incidentally, the system 1 may also be set to convert original text data from Japanese ideograms Kanji into phonetic characters Kana for making it easy for children to read in case of displaying the mail on the monitor screen. Further, the system 1 makes it possible to provide the operational environment simpler than that searching silk printed characters of a button by means of speech control for aged people having difficulties for reading.

Moreover, another preferred embodiment of the present invention may establish conversion of text data from characters or codes of a system to a set of characters or codes of another system, like conversion of codes or characters between different languages or different alphabet systems, for example.

Further, a mail display window wall pattern may be customized for each user. For instance, changing over a mail wall paper pattern depending on whether an out-going source is user's father, mother, child or a friend permits the user to grasp at sight who is an out-going source or sender. As a matter of course, changeover of a character font is sufficient for this purpose as well.

Figure 30:
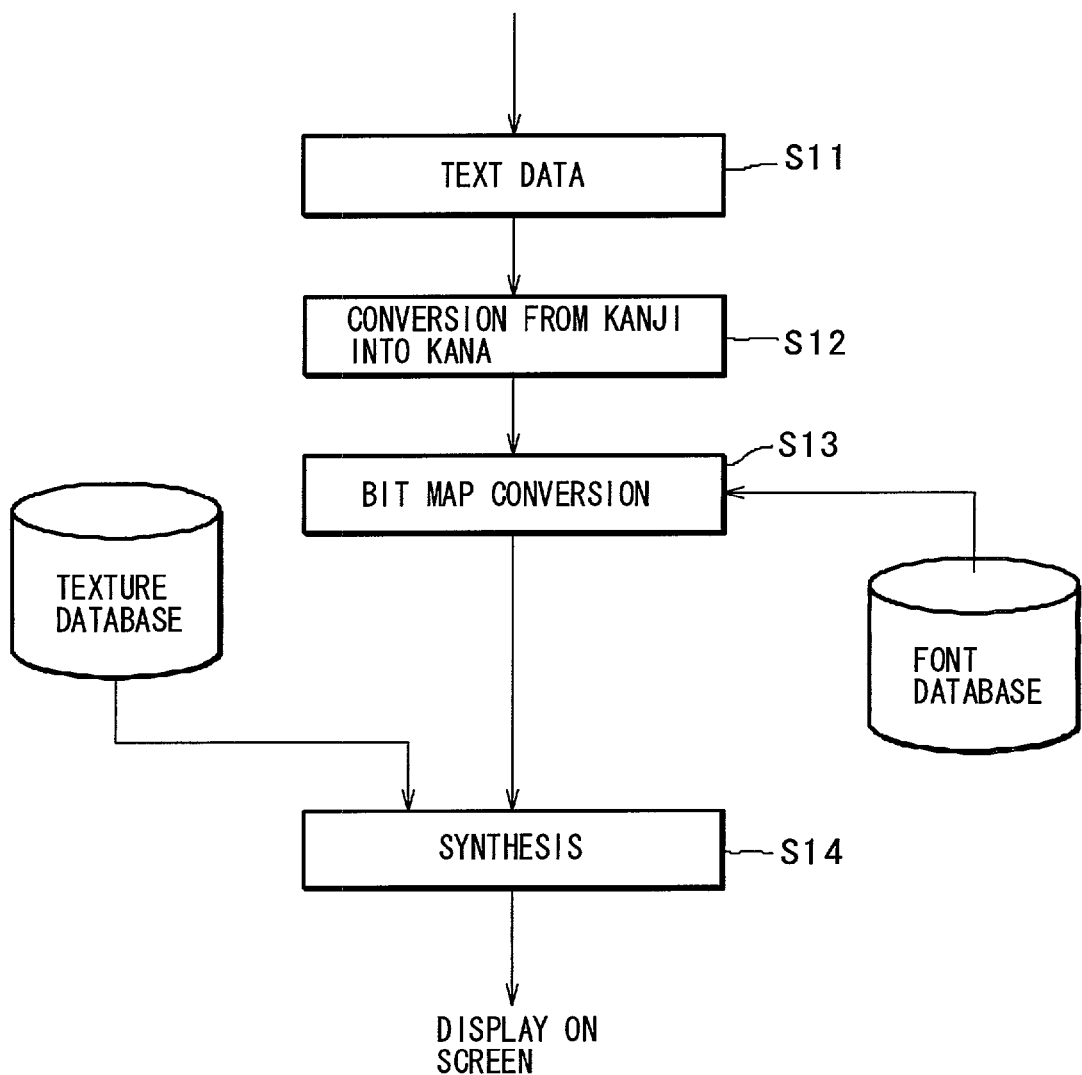
FIG. 30 is a flowchart showing the procedure of displaying an incoming mail image on the monitor screen according to a preferred embodiment of the present invention.

FIG. 30 is a flow chart showing the procedure for displaying the accepted mail on the monitor screen. A description will now be given for the processing of displaying the accepted mail with reference to the flow chart shown in FIG. 30.

Firstly, text data contained in the accepted mail body is extracted, in Step S11.

Subsequently, a ideogram Kanji contained in the text data is converted into corresponding phonetic character(s) Kana, in Step S12. In this stage, all Kanji is not always necessarily converted into Kana. The system 1 may also be set to judge whether conversion into Kana is required based on the user age and other user profiles or preferences, for instance.

Subsequently, the text data converted into Kana is expanded into bit map information by making use of a font database, in Step S13. A plurality of kinds of font databases is stored in the storage device 12, for instance. A required font database may be selected with reference to the user profile.

Then, the text expanded into the bit map information is superposed with a texture serving as a so-called wall pattern for synthesis of a mail display image to be projected onto the monitor screen, in Step S14. A plurality of kinds of texture databases is stored in the storage device 12, for instance. A required texture may also be selected with reference to the user profile.

(7) Message (Bulletin Board)

A message exchange system requiring a computer such as BBS (Bulletin Board System) has been already generalized in information processing/information communication fields.

In the conventional message bulletin board system of this type, each user needs to write a message on a character input base onto a bulletin board provided by a specific server, whereby the system permits the other user to read this message.

On the other hand, according to a message bulletin board provided by the interactive operation support system 1 in the preferred embodiment of the present invention, input of messages and open-to-public of the messages may be performed by means of interaction on a speech base through the medium of the personified assistant. In input of a message from one user, instructions to the assistant that the input message is bound for a particular destination permits the assistant to read up the message for only the particular destination.

Figure 31:
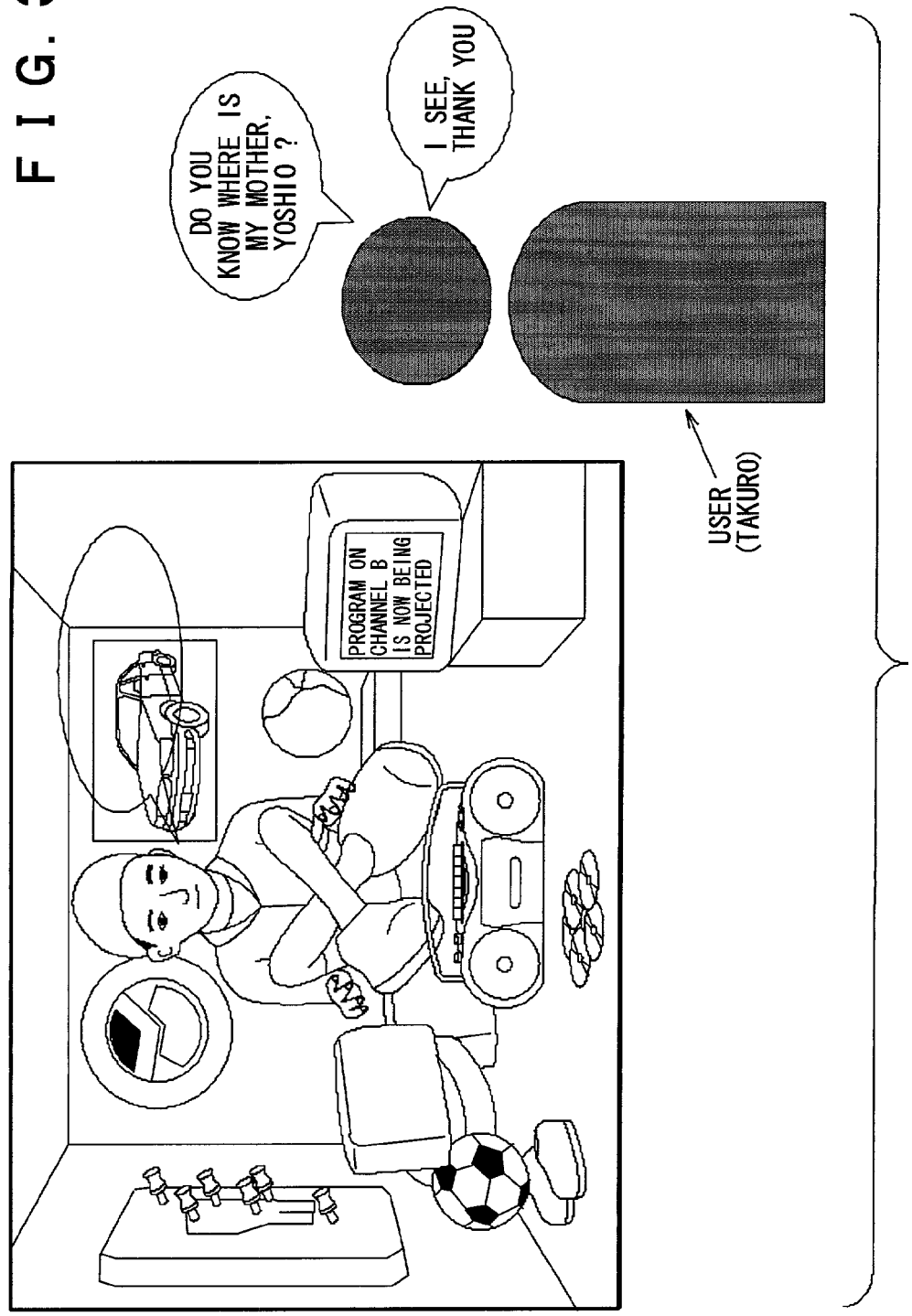
FIG. 31 is a view showing the state of message and bulletin board functions performed through the medium of the assistant according to a preferred embodiment of the present invention.

Some embodiments of scenario of messages according to the message bulletin board performed by the interactive operation support system 1 in the embodiment of the present invention are given in the following (Refer to FIG. 31).

EMBODIMENT

Mother (User 1): "Hi, Yoshio, I will go shopping for a while. I will be back at 6:00."
(She goes out.)
Takuro (User 2): "I'm home. Mother" (Takuro (her child) goes back to home.)
Takuro: "There?" (He understands that his mother is absent.)
Takuro: "Do you know where is my mother? Yoshio!"
"Yoshio" (Assistant): "Your mother is going shopping now. She will be back soon".
Takuro: "I see, thank you."

(8) Services

The interactive operation support system 1 according to the preferred embodiment of the present invention may establish communication with the user by means of interaction on a speech base through the medium of the personified assistant.

The input user speech is not always limited to commands for the system 1 and the equipment such as the video deck externally connected to the system. For instance, interaction in a conversation form is established. Some embodiments of the user-assistant interaction of this type are given in the following.

Embodiment 1

User: "How will be the weather tomorrow?"
"Yoshio": "It will rain (He speaks in a sad tone.)."

Embodiment 2

User: "Do you think there is heavy traffic on Chuo Highway? Yoshio?"
"Yoshio": "Well, so, so (He speaks in a cool tone.)".

Embodiment 3

User: "What time is it now? Yoshio"
"Yoshio": "- - - (He shows his wristwatch to the user in silence.)"

Embodiment 4

User: "What time is it now in San Francisco? Yoshio"
"Yoshio": "- - - (He shows to the user his wristwatch on his glove patterned with Stars and Stripes in silence.)"

Embodiment 5

User: "Hi, Yoshio"
"Yoshio": "What is the matter?"
User: "Don't forget to call me at 6:00 tomorrow morning"
"Yoshio": "Why"
User: "I have to join an important meeting".
"Yoshio I see."
- - - - - - - -
(Television is turned on at 6:00 in the next morning.)
"Yoshio": "Good morning. You will join an important meeting, won't you?"

Embodiment 6

User: "Hi, Yoshio, I'm hungry."
"Yoshio": "I suppose that the Pizza shop is still open. May I ask to place an order?"

(9) Remote control

The interactive operation support system 1 according to the preferred embodiment of the present invention permits an exchange of data to or from the installed telephone or the mobile telephone via the modem 18 or the public telephone line (as already described in the above). Similarly, the system 1 is connected to a wide area network such as internet via the communication interface 18, and therefore, also permits exchange of data to or from a remote information terminal such as a personal computer.

Thus, the personified assistant provided by the interactive operation support system 1 permits establishment of communication with the user by carrying on interaction on a speech base with the user through the remote terminal such as the personal computer and the mobile telephone. For instance, the system may accept an operation command for the external equipment such as the video deck through the mobile telephone.

Figure 32:
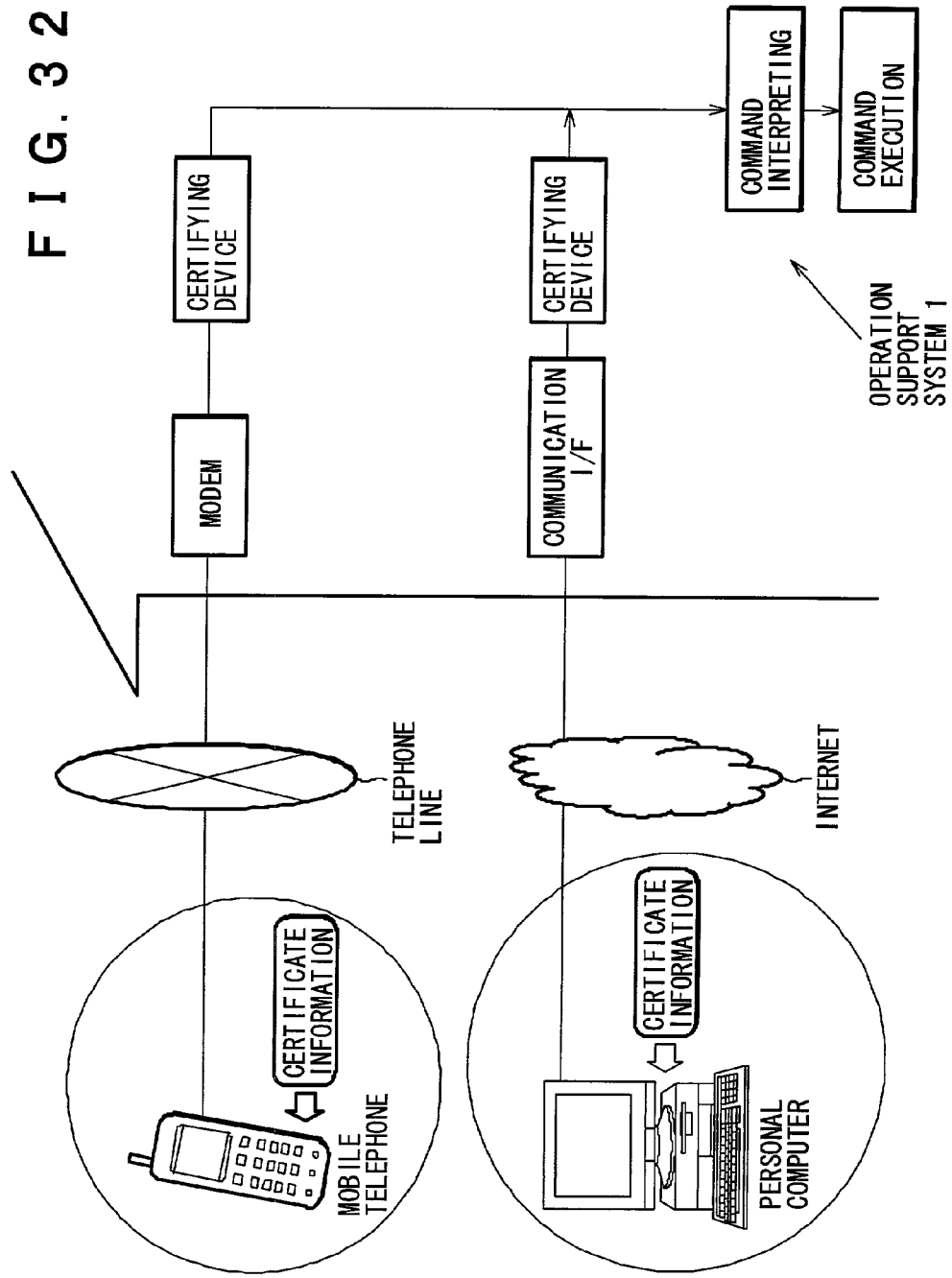
FIG. 32 is a view showing a mechanism of the interactive operation support system 1 according to a preferred embodiment of the present invention for accepting an inputted user command from an information terminal in a remote place.

Provided that acceptance of the inputted user command from the remote place without restriction may be in danger of infringing user's privacy or indoor security. In this connection, the interactive operation support system 1 is set to make a demand for input of certificate information for making sure of the legality of the user on the side of the remote information terminal such as a mobile telephone and a personal computer. A medium such as an ID card, for instance, may be available for input of the certificate information. On the other hand, input of a speech and data accepted to the system 1 through a certifying device is interpreted as commands into execution (Refer to FIG. 32).

Figure 33:
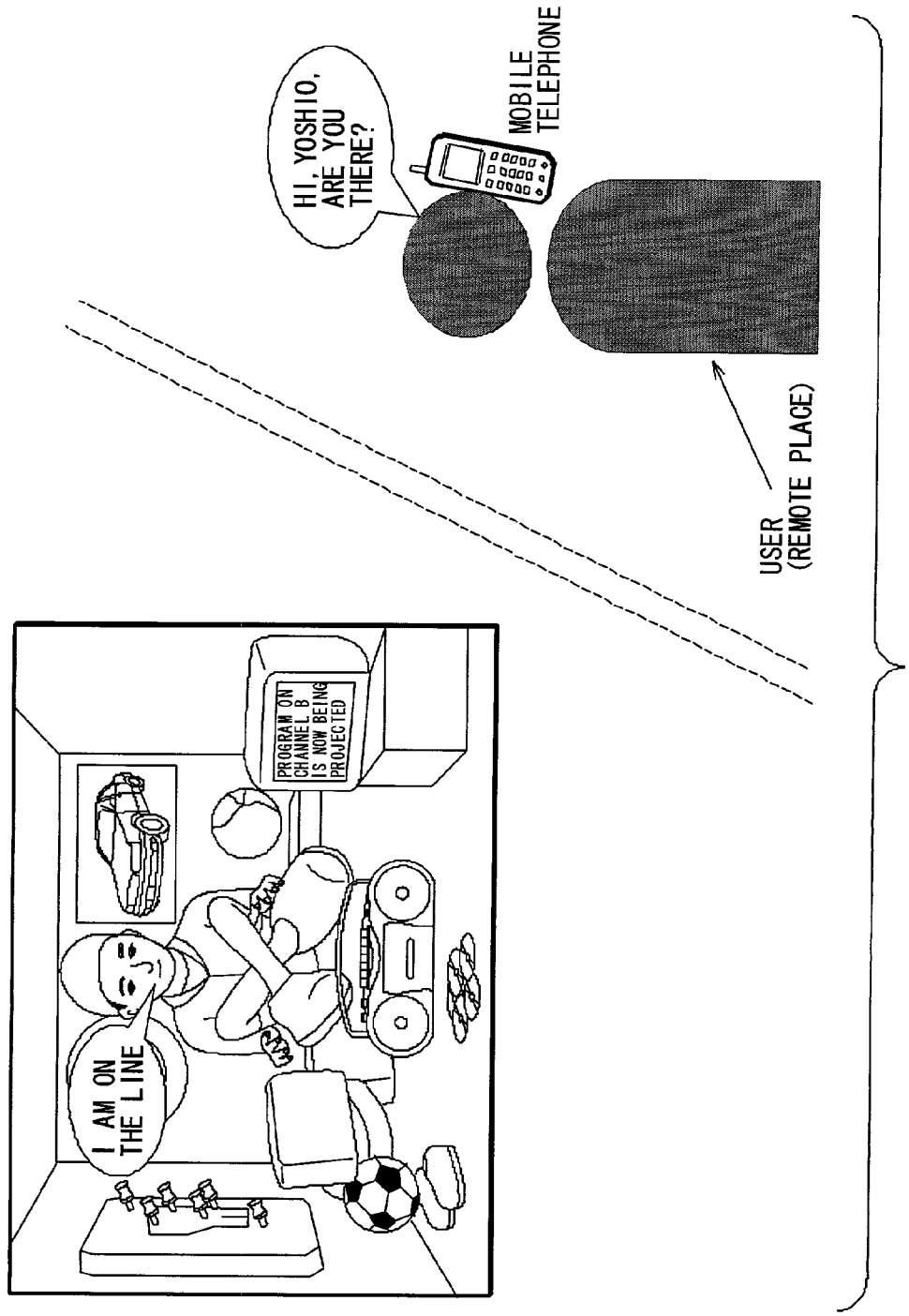
FIG. 33 is a view showing the state, in which remote control from the user is accepted to the interactive operation support system 1 according to a preferred embodiment of the present invention through a personified assistant.
Figure 34:
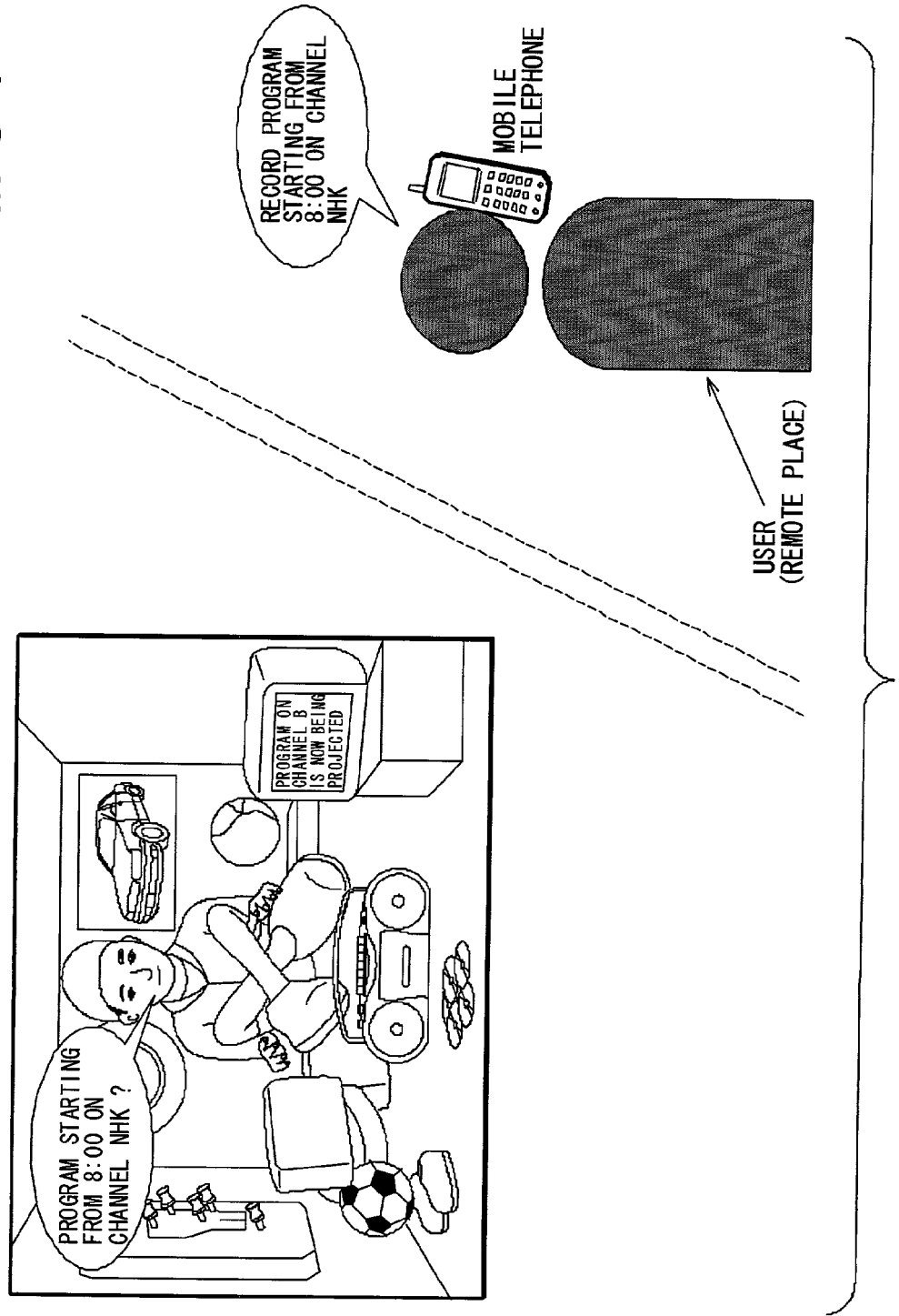
FIG. 34 is a view showing the state, in which remote control from the user is accepted to the interactive operation support system 1 according to a preferred embodiment of the present invention through the personified assistant.
Figure 35:
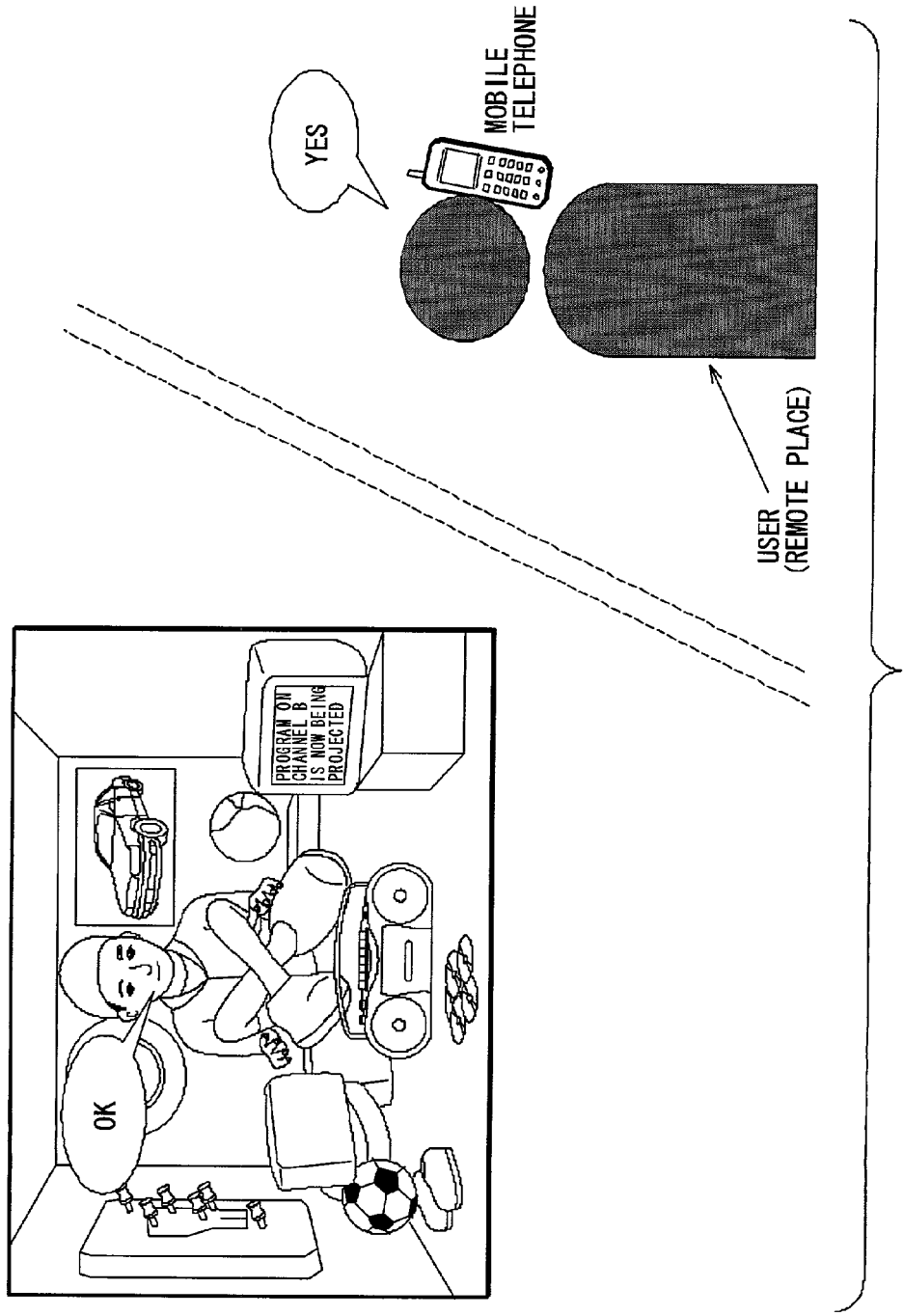
FIG. 35 is a view showing the state, in which remote control from the user is accepted to the interactive operation support system 1 according to a preferred embodiment of the present invention through the personified assistant.

An embodiment of scenario in acceptance of remote control from the user through the personified assistant to the interactive operation support system 1 according to the preferred embodiment of the present invention is given in the following (Refer to FIGS. 33 to 35).

EMBODIMENT

User: "Is Yoshio there? (The user makes a mobile telephone call to user's home.)"
"Yoshio": "Yes, I am on the line."
User: "Record a program starting from 8:00 today on Channel NHK."
"Yoshio": "A program starting from 8:00 on Channel NHK?"
User: "Yes"
"Yoshio": "OK"

(10) Extraction of Text Information From the Content of a Program Currently on the Air The interactive operation support system 1 according to the preferred embodiment of the present invention includes a tuner 15 for channel selection, that is, tuning of the broadcast wave of a predetermined channel. The received broadcast wave is separated into video data portion and audio data portion. The video data is outputted to the monitor 25 through an image processing unit 16 for display on the screen, while the audio data is outputted to a speaker 21 through a speech synthesis unit 14 for production of sounds.

Decoded video data sometimes contains text information such as superimposition annexed to the program content, in addition to the principal content of the program. For instance, information relating to the progress of scoring in a sports event relay program such as a baseball game, a soccer game or the like and time information is included.

For instance, it is assumed that there is a demand for information relating to the progress of a game, when a sports program is currently on the air on a different channel.

The interactive operation support system 1 according to the preferred embodiment of the present invention is provided with a plurality of channel selection functions of the tuner to receive and decode sports program as a program on a different channel by using a channel selection function which is opened while a program on a certain channel is being selected. Then, the decoded video data is measured and recognized for extraction of text information associated with the progress of scoring. The system 1 may also be set to allow the personified assistant to read up the extracted text information or to inform the user of the extracted text information in the form of superimposition or a sub window displayed on the content of the program currently projected on the screen.

Figure 36:
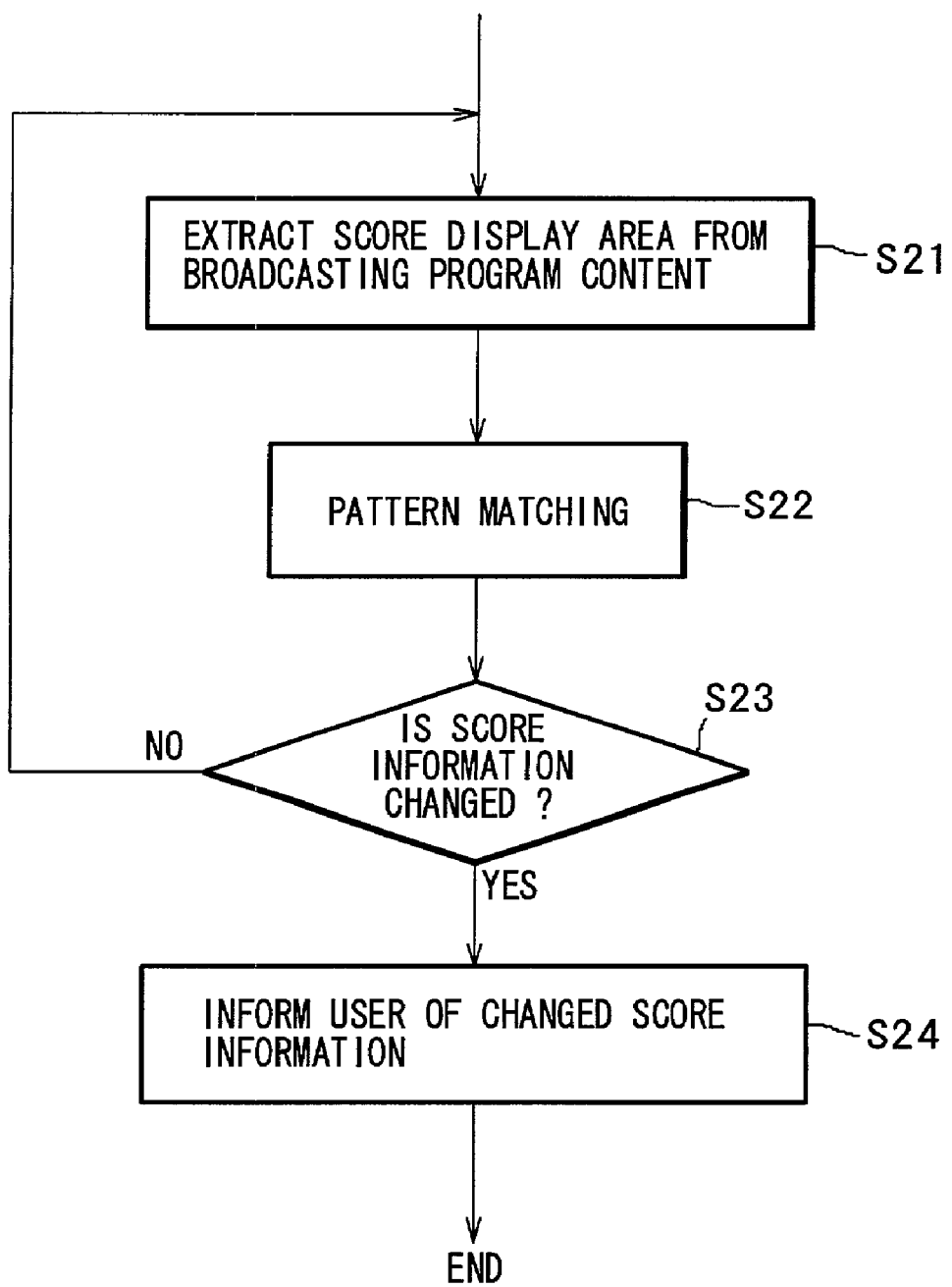
FIG. 36 is a flowchart showing the procedure of informing the user about text information of the content of a program on a different channel according to a preferred embodiment of the present invention.

FIG. 36 is a flow chart showing the procedure of informing the user of the text information contained in a program on the different channel. A description will now be given of the processing of informing the user of the text information with reference to the flow chart of FIG. 36.

Firstly, a score display area is extracted from broadcasting video data, in Step S21.

Subsequently, pattern matching is performed to extract score information from the score display area, Step S22.

Figure 37:
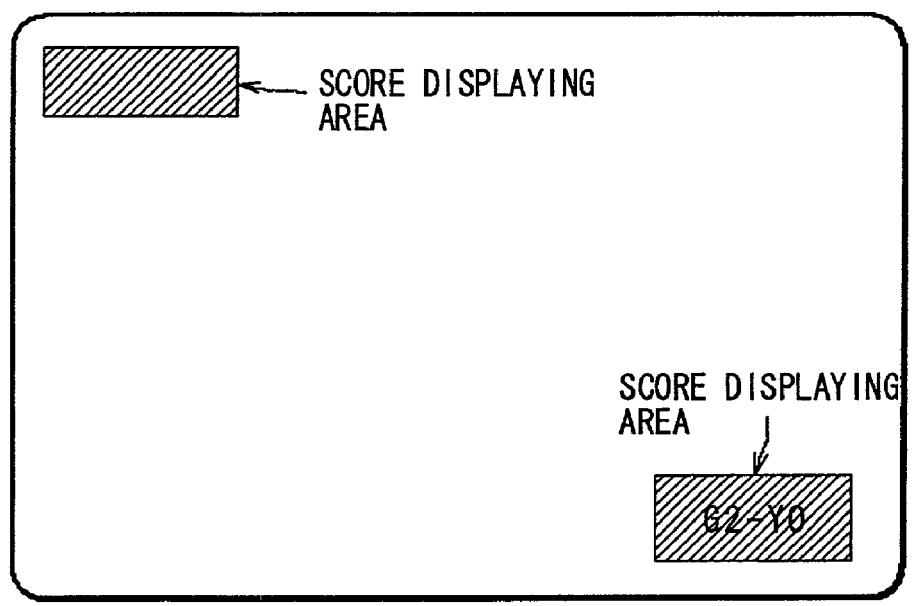
FIG. 37 is a view showing the location of score display areas displayed on the content of a program now being projected on the screen according to a preferred embodiment of the present invention.

Pattern matching of the whole video data is also applicable to search the associated text information. However, as shown in FIG. 37, since the score display area is usually placed at a substantially same location, it is possible to find the displayed score easily and fast with the location of the score display area as a key.

Subsequently, it is decided whether or not the extracted score information is changed from the previous result of extraction, in Step S23.

When a change of score information occurs, the system informs the user about the change of score information, in Step S24. The change of score information may be informed by means of a speech of the personified assistant through the speech synthesis, for instance, or may be displayed on the screen by means of a sub-window, a 3D display, texture and 2-D alpha-blending.

On the other hand, when the score information remains unchanged, the processing is returned to Step S21 to repeatedly execute a similar processing to the above. Incidentally, the system may also be set to inform the user of the score information at a predetermined time interval, even if the score information remains unchanged.

According to the similar method to the above, displayed time information may be extracted from the program content, in addition to the score information of the sports program.

For instance, when the user is watching the television program containing displayed time information, or a plurality of tuners are provided to monitor the program containing displayed time information on the different channel by the use of a spare tuner, time information maybe measured according to an image measurement/recognition technique.

For instance, when a plurality of external equipment is locally connected to the single interactive operation support system 1, or remote-connected through a communication medium such as a home network, the operation of setting time information of all the equipment right is important whereas being complicated. However, no accurate synchronization of current time information with one another among the equipment brings about malfunctions. For instance, when time information on the tuner side is not correct in case of reserved recording of a program, the system may fail to record the program.

On the other hand, according to the interactive operation support system 1 of the preferred embodiment of the present invention, automatic setting of current time information of the television monitor 25 or the other externally connected equipment may be performed by measuring the current time through the image measurement/recognition processing, when the user is watching the television program containing displayed time information, or the tuner is provided with a plurality of channel select functions to decode a program containing displayed time information on the different channel by the use of the spare tuner.

Figure 38:
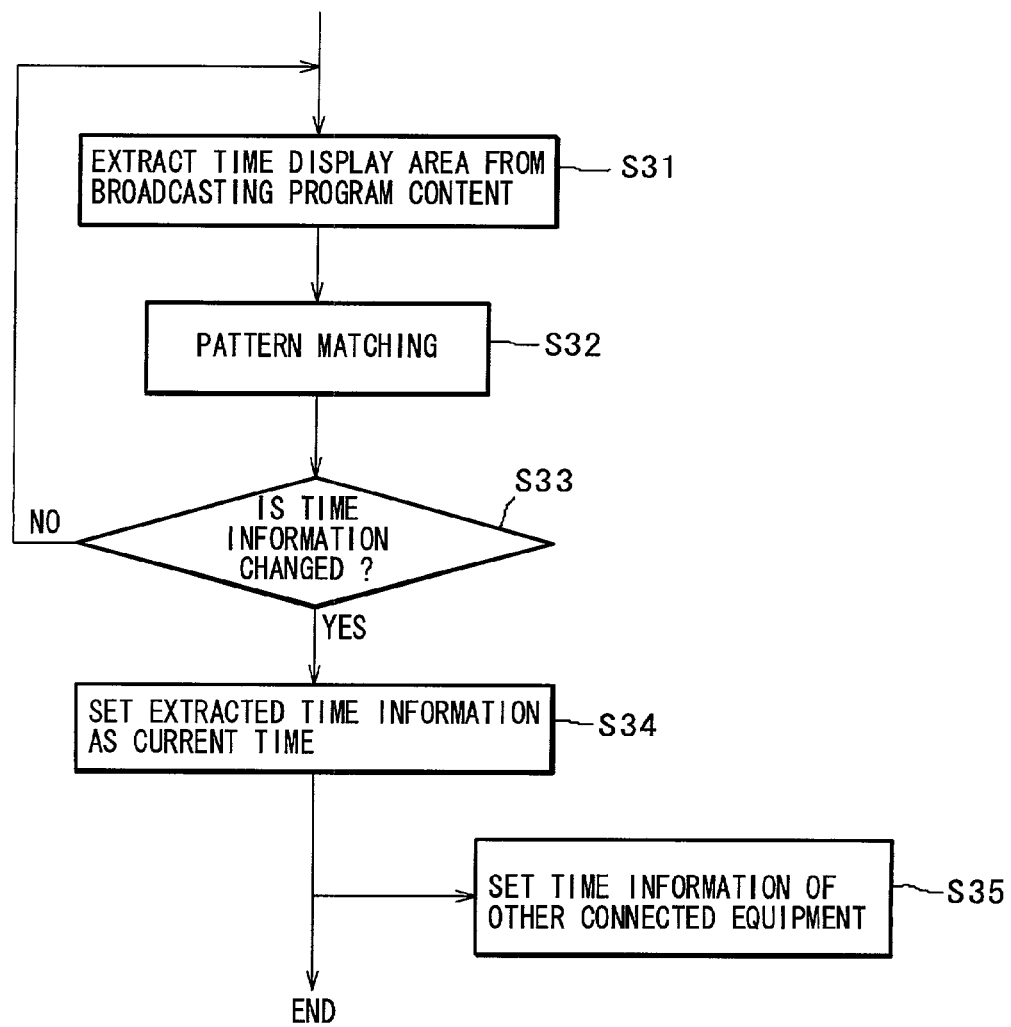
FIG. 38 is a flow chart showing the procedure of setting time information based on time information displayed on the content of a program now being projected on the screen according to a preferred embodiment of the present invention.

FIG. 38 is a flow chart showing the procedure of setting time information based on the time information displayed on the broadcasting program content. A description will now be given of the procedure of setting the time information with reference to the flow chart of FIG. 38.

Firstly, a time display area is extracted from broadcasting video data, in Step S31.

Subsequently, pattern matching is performed to extract time information from the time display area, in Step S32.

Pattern matching of the whole video data is also applicable to search the associated text information. However, as shown in FIG. 39, the time display area is usually placed at the substantially same location in actuality, it is possible to search the displayed time information at high speed with the location of the time display area as a key.

Subsequently, it is decided whether or not extracted time information is changed from the previous result of extraction, in Step S33.

When change of time information occurs, the system sets the extracted time information as the current time, Step S34. The other connected external equipment is also set to display the extracted time information, in Step S35.

On the other hand, when the time data remains unchanged, the processing is returned to Step S31 to repeatedly execute the similar processing to the above.

As has been described in the foregoing, the present invention makes it possible to provide the system and method for supporting operations for input of user commands to the household electric equipment such as the television set/monitor and the information equipment.

The present invention further makes it possible to provide the system and method for supporting interactive operations, permitting input of user commands to the equipment interactively.

The present invention still further makes it possible to provide a system and method for supporting interactive operations, permitting input of user commands to equipment or apparatuses in a nearly naturally human form through the personified assistant.

The present invention yet further makes it possible to provide a system and method for supporting interactive operations, permitting input of user commands by means of the interaction with the personified assistant on the speech input base.

The present invention yet further makes it possible to provide the system and method for supporting interactive operations, permitting feedback of the progress conditions of operations specified by the user commands inputted by means of the interaction with the assistant on the speech input base to the user.

While the present invention has been described in detail with reference to the specific preferred embodiments, it is to be understood that modifications and variations are apparent to those skilled in the art without departing from the scope and spirits of the present invention.

While the description in the present specification has been given based on the preferred embodiments, in which the interactive operation support system according to the present invention is applied to television operations, it is to be understood that the scope of application of the present invention is not limited to the above embodiments. The present invention may also have effects on the same kind of household electric equipment and information equipment having the function of generating and displaying the personified assistant, that of inputting, recognizing and synthesizing speech and that of carrying on a conversation with the user on a speech base.

In other words, the present invention is illustrative in its preferred form and not restrictive.

What is claimed is:

1. An interactive operation supporting system for an apparatus, comprising a display unit, a speech input unit, a speech output unit and an operation control unit, wherein said operation control unit comprises:

an assistant control means for generating a personified assistant and making said assistant appear on a screen of said display unit;

an output speech control means for determining speech required for said assistant to output said assistant's speech to the outside through said speech output unit after speech synthesis;

an input speech recognition means for recognizing user's voice as a speech inputted through said speech input unit;

an interaction management means for managing interaction between said assistant and said user according to said assistant's speech determined by said output speech control means and said user speech recognized by said input speech recognition means;

an ambient state generating means for enabling said personified assistant to act as if urging the user to input commands using the input speech recognition means when the interactive operating system is placed in a wait state;

a connection means for connecting a television set/monitor to said system;

a command interpreting means for specifying a user's intention or specifying said inputted user command based on a content of interaction traced by said interaction management means; and a command execution means for executing function commands, said function commands including a channel selection or channel change command, wherein in response to said command interpreting means interpreting an inputted user command as a channel change command, said assistant control means places respective changeable broadcasting program display windows in the shape of a ring around said assistant, and a part of the ring has a gap with no broadcasting program display window, and a broadcasting program display window of a program on a temporarily selected channel is placed at the forefront of the ring, wherein said output speech control means determines an assistant's speech based on a content of interaction managed by said interaction management means or an inputted user command specified by said command interpreting means, and wherein said output speech control means determines an assistant's speech for leading a user's intention when said command interpreting means fails to specify said user's intention or said inputted user command.

2. The interactive operation supporting system according to claim 1, wherein said assistant control means determines an animation of said assistant based on a content of interaction managed by said interaction management means and/or an inputted user command specified by said command interpreting means.

3. The interactive operation supporting system according to claim 1, further comprising
a connection means for connecting an external apparatus such as a television set/monitor and/or a video deck to said system, wherein said command interpreting means also interprets a command for controlling a function of said external apparatus including selection of a broadcast program channel and/or recording/reproducing of said broadcast program.

4. The interactive operation supporting system according to claim 1, further comprising:
a communication means for connecting said system to a communication medium such as an external network or a telephone line,
wherein said input speech recognition means recognizes audio data received via said communication medium.

5. The interactive operation supporting system according to claim 1, further comprising:
a communication means for connecting said system to a communication medium such as an external network and/or a telephone line; and
a mail exchange means for making an exchange of electronic mails via said communication medium,
wherein said output speech control means determines said assistant's speech based on a content of an incoming mail.

6. The interactive operation supporting system according to claim 1, wherein said interaction management means manages an input speech of a user as a message bound for another user, and said output speech control means determines said assistant's speech based on said message.

7. The interactive operation supporting system according to claim 1, wherein said assistant control means places said personified assistant in a room scattered with various kinds of objects including a link to an information resource.

8. The interactive operation supporting system according to claim 1, wherein said assistant control means places said personified assistant in a room scattered with various kinds of objects including a link to an information resource, and in response to an interest of said user in a recording medium including a link to a music content placed in said room, said command interpreting means interprets an inputted user command as a command for playing back said music content.

9. The interactive operation supporting system according to claim 1, wherein in response to said command interpreting means interpreting an inputted user command, said assistant control means makes said assistant appear on a screen of said display unit.

10. The interactive operation supporting system according to claim 1, further comprising
a connection means for connecting a television set/monitor to said system, and in response to said command interpreting means interpreting an inputted user command as a channel selection command, said assistant control means makes said assistant show a selected broadcasting program display window.

11. The interactive operation supporting system according to claim 1, wherein, in response to selection of a desired channel by moving said display window on said ring upon a channel change command from said user and said assistant control means also zooms up said selected broadcasting program display window.

12. The interactive operation supporting system according to claim 1, further comprising:
a connection means for connecting a secondary storage device for storing and/or reproducing a broadcasting program content to said system,
wherein in response to said command interpreting means interpreting an inputted user command as a recorded program reproduction command, said assistant control means makes said assistant show a binder showing a view of recorded broadcasting program contents.

13. The interactive operation supporting system according to claim 12, wherein in response to a selection for reproducing a recorded broadcasting program content, said assistant control means zooms up said selected recorded broadcasting program content display window.

14. The interactive operation supporting system according to claim 1, further comprising:
a connection means for connecting a television set/monitor to said system;
a communication means for connecting said system to a communication medium such as an external network and/or a telephone line; and
a mail exchange means for making exchange of electronic mails via said communication medium,
wherein said assistant control means makes an incoming mail display image to appear on a screen of said display unit in response to acceptance of mail.

15. The interactive operation supporting system according to claim 1, further comprising:
a text conversion means for converting a Japanese ideogram Kanji related to text data displayed on a screen of said display unit into a corresponding phonetic character Kana.

16. The interactive operation supporting system according to claim 1, further comprising:
a communication means for connecting said system to a communication medium such as an external network or a telephone line; and
a certifying means for certifying an information terminal connected to said system via said communication medium.

17. The interactive operation supporting system according to claim 1, further comprising:
a connection means for connecting a television set/monitor to said system; and
an extraction means for extracting text information from a received broadcasting program content.

18. The interactive operation supporting system according to claim 17, wherein text information extracted by said extraction means is superimposed on a content of another broadcasting program on said screen.

19. The interactive operation supporting system according to claim 1, further comprising:
a code conversion means for converting a character related to text data according to a group or system of characters or codes displayed on said display unit into a corresponding character of another group or system of characters or codes.

20. The interactive operation supporting system according to claim 1, wherein said motions or said act includes a leading question.

21. The interactive operation supporting system according to claim 1, wherein said ambient state generating means enables said personified assistant to enter said wait state with words and/or utterances encouraging a response from said user.

22. The interactive operation supporting system according to claim 21, wherein said words and/or utterances encouraging a response include the words "Ah" and "Well."

23. The interactive operation supporting system according to claim 1, wherein said ambient state generating means enables said personified assistant to enter said wait state with gestures encouraging a response from said user.

24. A method for supporting interactive operation of an apparatus or other externally connected apparatus including a display unit, a speech input unit and a speech output unit, comprising:
- an assistant control step for generating a personified assistant and making said generated assistant appear on a screen of said display unit;
- an output speech control step for determining a speech required for the assistant to output the assistant's speech to the outside through said speech output unit after speech synthesis;
- an input speech recognition step for recognizing a user's voice as a speech inputted through said speech input unit;
- an interaction management step for managing interaction between said assistant and said user according to said assistant's speech determined by said output speech control step and said user speech recognized by said input speech recognition step; an ambient state generating step for enabling said personified assistant to act as if urging the user to input commands using the input speech recognition step when the interactive operating system is placed in a wait state;
- a command interpreting step for specifying said user's intention or specifying said inputted user command based on a content of interaction traced by said interaction management step;
- a connecting step for connecting a television set/monitor to said apparatus;
- a command executing step for executing function commands, said function commands including a channel selection or channel change command;
- a first determining step for determining an assistant's speech based on the content of interaction managed by said interaction management step or an inputted user command specified by said command interpreting step;
- a second determining step for determining an assistant's speech for leading a user's intention when said command interpreting step fails to specify said user's intention or said inputted user command; and
- a positioning step for, in response to interpreting an inputted user command as a channel change command by the command interpreting step, placing respective changeable broadcasting program display windows in the shape of a ring around said assistant, and placing a gap with no broadcasting program display window as a part of the ring, and a placing broadcasting program display window of a program on a temporarily selected channel at the forefront of the ring.

25. The method for supporting interactive operation according to claim 24, wherein said assistant control step determines an animation of said assistant based on a content of interaction managed by said interaction management step and/or an inputted user command specified by said command interpreting step.

26. The method for supporting interactive operation according to claim 24, wherein said apparatus further includes a connection means for connecting an external apparatus such as a television set/monitor and/or a video deck to said apparatus, and said command interpreting step also interprets commands for controlling a function of said external apparatus including selection of a broadcast program and/or recording/reproducing of said broadcast program.

27. The method for supporting interactive operation according to claim 24, wherein said apparatus further includes a communication means for connecting said apparatus to a communication medium such as an external network and/or a telephone line, and said input speech recognition step recognizes audio data received via said communication medium.

28. The method for supporting interactive operation according to claim 24, wherein said apparatus further includes a communication means for connecting said apparatus to a communication medium such as an external network and/or a telephone line, and a mail exchange means for making an exchange of electronic mails via said communication medium, said output speech control step determining said assistant's speech based on a content of an incoming mail.

29. The method for supporting interactive operation according to claim 24, wherein said interaction management step manages an input speech of a user as a message bound for another user, and said output speech control step determines said assistant's speech based on said message.

30. The method for supporting interactive operation according to claim 24, wherein said assistant control step places said personified assistant in a room scattered with various kinds of objects including a link to an information resource.

31. The method for supporting interactive operation according to claim 24, wherein said assistant control step places said personified assistant in a room scattered with various kinds of objects including a link to an information resource, and in response an interest of said user in a recording medium including a link to a music content placed in said room, said command interpreting step interprets an inputted command as a command for playing back said music content.

32. The method for supporting interactive operation according to claim 24, wherein in response to said command interpreting step interpreting an inputted user command, said assistant control step makes said assistant appear on a screen of said display unit.

33. The method for supporting interactive operation according to claim 24, wherein said apparatus further includes a connection means for connecting a television set/monitor to said apparatus, and in response to said command interpreting step interpreting an inputted user command as a channel select command, said assistant control step makes said assistant show a selected broadcasting program display window.

34. The method for supporting interactive operation according to claim 24, wherein, in response to selection of a desired channel by moving said display window on said ring upon a channel change command from said user and said assistant control step also zooms up said selected broadcasting program display window.

35. The method for supporting interactive operation according to claim 24, wherein said apparatus further includes a connection means for connecting a secondary storage device for storing and/or reproducing a broadcasting program content to said apparatus, and in response to said command interpreting step interpreting an inputted user command as a recorded program reproduction command, said assistant control step makes said assistant show a binder showing a view of recorded broadcasting program contents.

36. The method for supporting interactive operation according to claim 35, wherein in response to a selection for reproducing a recorded broadcasting program content, said assistant control step zooms up said selected recorded broadcasting program content display window.

37. The method for supporting interactive operation according to claim 24, wherein said apparatus further includes:
- a connection means for connecting a television set/monitor to said apparatus, a communication means for connecting said apparatus to a communication medium such as an external network and/or a telephone line, and a mail exchange means for making exchange of electronic mails via said communication medium, and said assistant control step makes an incoming mail display image to appear on a screen of said display unit in response to acceptance of mail.

38. The method for supporting interactive operation according to claim 24, further comprising:
- a text conversion step for converting a Japanese ideogram Kanji related to text data displayed on a screen of said display unit into a corresponding phonetic character Kana.

39. The method for supporting interactive operation according to claim 24, further comprising:
- a communication step for connecting said apparatus to a communication medium such as an external network or a telephone line; and
- a certifying step for certifying an information terminal connected to said apparatus via said communication medium.

40. The method for supporting interactive operation according to claim 24, wherein said apparatus further includes:
- a connection means for connecting a television set/monitor to said apparatus; and
- an extraction step for extracting text information from a received broadcasting program content.

41. The method for supporting interactive operation according to claim 40, wherein text information extracted by said extraction step is superimposed on a content of another broadcasting program on said screen.

42. The method for supporting interactive operation according to claim 24, further comprising:
- a code conversion step for converting a character related to text data according to a group or system of characters or codes displayed on said display unit into a corresponding character of another group or system of characters or codes.

* * * * *